(12) United States Patent
Zhang et al.

(10) Patent No.: US 11,958,183 B2
(45) Date of Patent: Apr. 16, 2024

(54) NEGOTIATION-BASED HUMAN-ROBOT COLLABORATION VIA AUGMENTED REALITY

(71) Applicant: The Research Foundation for The State University of new York, Binghamton, NY (US)

(72) Inventors: Shiqi Zhang, Vestal, NY (US); Kishan Dhananjay Chandan, Binghamton, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 821 days.

(21) Appl. No.: 17/025,314

(22) Filed: Sep. 18, 2020

(65) Prior Publication Data

US 2021/0086370 A1  Mar. 25, 2021

Related U.S. Application Data

(60) Provisional application No. 62/902,830, filed on Sep. 19, 2019.

(51) Int. Cl.
*B25J 9/16* (2006.01)
*B25J 9/00* (2006.01)
(Continued)

(52) U.S. Cl.
CPC ............. *B25J 13/08* (2013.01); *B25J 9/0084* (2013.01); *B25J 9/1664* (2013.01); *G06F 3/011* (2013.01);
(Continued)

(58) Field of Classification Search
USPC .................................................. 700/245–264
See application file for complete search history.

(56) References Cited

U.S. PATENT DOCUMENTS

| 4,163,183 A | 7/1979 | Engelberger et al. |
| 4,260,940 A | 4/1981 | Engelberger et al. |
| (Continued) | | |

FOREIGN PATENT DOCUMENTS

| CA | 2982575 A1 * | 6/2018 | ......... G05B 19/0423 |
| CA | 3071332 A1 * | 1/2019 | ............. B25J 9/162 |
| WO | WO-2019173396 A1 * | 9/2019 | ............. B25J 13/00 |

OTHER PUBLICATIONS

U.S. Appl. No. 10/001,499, filed Jun. 19, 2018, Mellars et al.
(Continued)

*Primary Examiner* — Jonathan L Sample
(74) *Attorney, Agent, or Firm* — Hoffberg & Associates; Steven M. Hoffberg

(57) ABSTRACT

Effective human-robot collaboration (HRC) requires extensive communication among the human and robot teammates, because their actions can potentially produce conflicts, synergies, or both. An augmented reality-driven, negotiation-based (ARN) framework is provided for HRC, where ARN supports planning-phase negotiations within human-robot teams. Experiments in an office environment, where multiple mobile robots work on delivery tasks, where the robots could not complete the tasks on their own, but sometimes need help from their human teammate, making human-robot collaboration necessary. In comparison to a non-AR baseline, ARN significantly improved the human users' work efficiency, and their cognitive load, while reducing the overall task completion time of the whole team.

20 Claims, 13 Drawing Sheets

(51) Int. Cl.
  *B25J 13/08* (2006.01)
  *G06F 3/01* (2006.01)
  *G06T 1/00* (2006.01)
  *G06T 19/00* (2011.01)

(52) U.S. Cl.
  CPC .......... *G06T 1/0014* (2013.01); *G06T 19/006* (2013.01); *G06T 2200/24* (2013.01)

(56) References Cited

U.S. PATENT DOCUMENTS

| | | | |
|---|---|---|---|
| 4,260,941 A | 4/1981 | Engelberger et al. |
| 4,754,402 A | 6/1988 | Wand |
| 4,789,940 A | 12/1988 | Christian |
| 4,940,925 A | 7/1990 | Wand et al. |
| 4,982,329 A | 1/1991 | Tabata et al. |
| 5,046,022 A | 9/1991 | Conway et al. |
| 5,280,431 A | 1/1994 | Summerville et al. |
| 5,342,283 A | 8/1994 | Good |
| 5,375,059 A | 12/1994 | Kyrtsos et al. |
| 5,390,125 A | 2/1995 | Sennott et al. |
| 5,438,517 A | 8/1995 | Sennott et al. |
| 5,548,516 A | 8/1996 | Gudat et al. |
| 5,555,503 A | 9/1996 | Kyrtsos et al. |
| 5,579,444 A | 11/1996 | Dalziel et al. |
| 5,610,815 A | 3/1997 | Gudat et al. |
| 5,612,883 A | 3/1997 | Shaffer et al. |
| 5,615,116 A | 3/1997 | Gudat et al. |
| 5,629,855 A | 5/1997 | Kyrtsos et al. |
| 5,640,323 A | 6/1997 | Kleimenhagen et al. |
| 5,646,843 A | 7/1997 | Gudat et al. |
| 5,646,845 A | 7/1997 | Gudat et al. |
| 5,648,901 A | 7/1997 | Gudat et al. |
| 5,657,226 A | 8/1997 | Shin et al. |
| 5,680,306 A | 10/1997 | Shin et al. |
| 5,680,313 A | 10/1997 | Whittaker et al. |
| 5,684,696 A | 11/1997 | Rao et al. |
| 5,838,562 A | 11/1998 | Gudat et al. |
| 5,956,250 A | 9/1999 | Gudat et al. |
| 5,969,973 A | 10/1999 | Bourne et al. |
| 5,983,161 A | 11/1999 | Lemelson et al. |
| 5,985,214 A | 11/1999 | Stylli et al. |
| 6,042,555 A | 3/2000 | Kramer et al. |
| 6,099,457 A | 8/2000 | Good |
| 6,122,572 A | 9/2000 | Yavnai |
| 6,169,981 B1 | 1/2001 | Werbos |
| 6,233,545 B1 | 5/2001 | Datig |
| 6,252,544 B1 | 6/2001 | Hoffberg |
| 6,275,773 B1 | 8/2001 | Lemelson et al. |
| 6,292,830 B1 | 9/2001 | Taylor et al. |
| 6,341,243 B1 | 1/2002 | Bourne et al. |
| 6,341,372 B1 | 1/2002 | Datig |
| 6,360,193 B1 | 3/2002 | Stoyen |
| 6,413,229 B1 | 7/2002 | Kramer et al. |
| 6,429,812 B1 | 8/2002 | Hoffberg |
| 6,468,800 B1 | 10/2002 | Stylli et al. |
| 6,472,218 B1 | 10/2002 | Stylli et al. |
| 6,487,500 B2 | 11/2002 | Lemelson et al. |
| 6,507,767 B2 | 1/2003 | Bourne et al. |
| 6,574,628 B1 | 6/2003 | Kahn et al. |
| 6,580,967 B2 | 6/2003 | Jevtic et al. |
| 6,581,048 B1 | 6/2003 | Werbos |
| 6,666,811 B1 | 12/2003 | Good |
| 6,678,577 B1 | 1/2004 | Stylli et al. |
| 6,685,884 B2 | 2/2004 | Stylli et al. |
| 6,748,325 B1 | 6/2004 | Fujisaki |
| 6,791,472 B1 | 9/2004 | Hoffberg |
| 6,842,674 B2 | 1/2005 | Solomon |
| 6,842,692 B2 | 1/2005 | Fehr et al. |
| 6,845,294 B2 | 1/2005 | Jevtic et al. |
| 6,890,485 B1 | 5/2005 | Stylli et al. |
| 6,898,484 B2 | 5/2005 | Lemelson et al. |
| 6,904,335 B2 | 6/2005 | Solomon |
| 6,965,816 B2 | 11/2005 | Walker |
| 6,988,026 B2 | 1/2006 | Breed et al. |
| 7,033,781 B1 | 4/2006 | Short |
| 7,047,861 B2 | 5/2006 | Solomon |
| 7,054,718 B2 | 5/2006 | Miyamoto et al. |
| 7,072,764 B2 | 7/2006 | Donath et al. |
| 7,099,747 B2 | 8/2006 | Mikami et al. |
| 7,103,460 B1 | 9/2006 | Breed |
| 7,168,748 B2 | 1/2007 | Townsend et al. |
| 7,236,861 B2 | 6/2007 | Paradis et al. |
| 7,268,700 B1 | 9/2007 | Hoffberg |
| 7,269,479 B2 | 9/2007 | Okamoto et al. |
| 7,271,737 B1 | 9/2007 | Hoffberg |
| 7,298,289 B1 | 11/2007 | Hoffberg |
| 7,330,844 B2 | 2/2008 | Stoyen |
| 7,343,222 B2 | 3/2008 | Solomon |
| 7,383,107 B2 | 6/2008 | Fehr et al. |
| 7,386,163 B2 | 6/2008 | Sabe et al. |
| 7,415,321 B2 | 8/2008 | Okazaki et al. |
| 7,421,321 B2 | 9/2008 | Breed et al. |
| 7,528,835 B2 | 5/2009 | Templeman |
| 7,558,156 B2 | 7/2009 | Vook et al. |
| 7,590,589 B2 | 9/2009 | Hoffberg |
| 7,649,331 B2 | 1/2010 | Hosoda et al. |
| 7,662,128 B2 | 2/2010 | Salcudean et al. |
| 7,706,918 B2 | 4/2010 | Sato et al. |
| 7,714,895 B2 * | 5/2010 | Pretlove ............. G06F 3/1454  348/222.1 |
| 7,720,777 B2 | 5/2010 | Ducheneaut et al. |
| 7,742,845 B2 | 6/2010 | Fink et al. |
| 7,751,928 B1 | 7/2010 | Antony et al. |
| 7,756,615 B2 | 7/2010 | Barfoot et al. |
| 7,765,029 B2 | 7/2010 | Fleischer et al. |
| 7,765,038 B2 | 7/2010 | Appleby et al. |
| 7,774,243 B1 | 8/2010 | Antony et al. |
| 7,835,778 B2 | 11/2010 | Foley et al. |
| 7,865,267 B2 | 1/2011 | Sabe et al. |
| 7,873,471 B2 | 1/2011 | Gieseke |
| 7,881,824 B2 | 2/2011 | Nagasaka et al. |
| 7,904,182 B2 | 3/2011 | Hosek et al. |
| 7,949,428 B2 | 5/2011 | Endo et al. |
| 7,970,476 B2 | 6/2011 | Chapin et al. |
| 7,991,576 B2 | 8/2011 | Roumeliotis |
| 8,010,180 B2 | 8/2011 | Quaid et al. |
| 8,052,857 B2 | 11/2011 | Townsend |
| 8,112,176 B2 | 2/2012 | Solomon |
| 8,121,618 B2 | 2/2012 | Rhoads et al. |
| 8,126,642 B2 | 2/2012 | Trepagnier et al. |
| 8,139,109 B2 | 3/2012 | Schmiedel et al. |
| 8,145,295 B2 | 3/2012 | Boyden et al. |
| 8,157,205 B2 | 4/2012 | McWhirk |
| 8,160,680 B2 | 4/2012 | Boyden et al. |
| 8,180,436 B2 | 5/2012 | Boyden et al. |
| 8,195,343 B2 | 6/2012 | Lin |
| 8,195,358 B2 | 6/2012 | Anderson |
| 8,195,599 B2 | 6/2012 | Boddy et al. |
| 8,200,428 B2 | 6/2012 | Anderson |
| 8,213,261 B2 | 7/2012 | Imhof et al. |
| 8,221,322 B2 | 7/2012 | Wang et al. |
| 8,229,163 B2 | 7/2012 | Coleman et al. |
| 8,229,618 B2 | 7/2012 | Tolstedt et al. |
| 8,237,775 B2 | 8/2012 | Givon |
| 8,244,327 B2 | 8/2012 | Fichtinger et al. |
| 8,244,469 B2 | 8/2012 | Cheung et al. |
| 8,255,092 B2 | 8/2012 | Phillips et al. |
| 8,280,623 B2 | 10/2012 | Trepagnier et al. |
| 8,306,650 B1 | 11/2012 | Antony et al. |
| 8,340,823 B2 | 12/2012 | Ohno et al. |
| 8,373,582 B2 | 2/2013 | Hoffberg |
| 8,374,721 B2 | 2/2013 | Halloran et al. |
| 8,392,065 B2 | 3/2013 | Tolstedt et al. |
| 8,412,449 B2 | 4/2013 | Trepagnier et al. |
| 8,414,356 B2 | 4/2013 | Boyden et al. |
| 8,419,804 B2 | 4/2013 | Herr et al. |
| 8,422,994 B2 | 4/2013 | Rhoads et al. |
| 8,447,440 B2 | 5/2013 | Phillips et al. |
| 8,447,524 B2 | 5/2013 | Chen et al. |
| 8,457,830 B2 | 6/2013 | Goulding |
| 8,467,779 B2 | 6/2013 | Helfrich |
| 8,467,928 B2 | 6/2013 | Anderson |
| 8,478,493 B2 | 7/2013 | Anderson |

(56) References Cited

U.S. PATENT DOCUMENTS

| | | |
|---|---|---|
| 8,483,876 B2 | 7/2013 | Ohno |
| 8,485,861 B2 | 7/2013 | Boyden et al. |
| 8,489,115 B2 | 7/2013 | Rodriguez et al. |
| 8,512,219 B2 | 8/2013 | Ferren et al. |
| 8,512,415 B2 | 8/2013 | Herr et al. |
| 8,518,031 B2 | 8/2013 | Boyden et al. |
| 8,521,257 B2 | 8/2013 | Whitcomb et al. |
| 8,538,673 B2 | 9/2013 | Sislak et al. |
| 8,568,363 B2 | 10/2013 | Boyden et al. |
| 8,577,126 B2 | 11/2013 | Jones et al. |
| 8,577,538 B2 | 11/2013 | Lenser et al. |
| 8,583,286 B2 | 11/2013 | Fleischer et al. |
| 8,583,313 B2 | 11/2013 | Mian |
| 8,600,830 B2 | 12/2013 | Hoffberg |
| 8,612,052 B2 | 12/2013 | Nagasaka et al. |
| 8,629,789 B2 | 1/2014 | Hoffberg |
| 8,630,763 B2 | 1/2014 | Goulding |
| 8,660,642 B2 | 2/2014 | Ferren et al. |
| 8,666,587 B2 | 3/2014 | Anderson |
| 8,682,309 B2 | 3/2014 | Helfrich |
| 8,682,726 B2 | 3/2014 | Hoffberg |
| 8,694,092 B2 | 4/2014 | Ferren et al. |
| 8,706,185 B2 | 4/2014 | Foley et al. |
| 8,706,186 B2 | 4/2014 | Fichtinger et al. |
| 8,706,298 B2 | 4/2014 | Goulding |
| 8,706,394 B2 | 4/2014 | Trepagnier et al. |
| 8,711,206 B2 | 4/2014 | Newcombe et al. |
| 8,712,686 B2 | 4/2014 | Bandyopadhyay et al. |
| 8,725,292 B2 | 5/2014 | Perlin et al. |
| 8,727,987 B2 | 5/2014 | Chauhan |
| 8,737,986 B2 | 5/2014 | Rhoads et al. |
| 8,761,931 B2 | 6/2014 | Halloran et al. |
| 8,781,629 B2 | 7/2014 | Ota |
| 8,784,384 B2 | 7/2014 | Boyden et al. |
| 8,784,385 B2 | 7/2014 | Boyden et al. |
| 8,798,932 B2 | 8/2014 | Boyden et al. |
| 8,798,933 B2 | 8/2014 | Boyden et al. |
| 8,803,951 B2 | 8/2014 | Gay et al. |
| 8,817,078 B2 | 8/2014 | Gay et al. |
| 8,818,567 B2 | 8/2014 | Anderson |
| 8,822,924 B2 | 9/2014 | Valentino et al. |
| 8,831,863 B2 | 9/2014 | Soulie et al. |
| 8,834,488 B2 | 9/2014 | Farritor et al. |
| 8,842,176 B2 | 9/2014 | Schofield et al. |
| 8,849,441 B2 | 9/2014 | Boyden et al. |
| 8,858,912 B2 | 10/2014 | Boyden et al. |
| 8,864,846 B2 | 10/2014 | Herr et al. |
| 8,874,162 B2 | 10/2014 | Schrader et al. |
| 8,874,477 B2 | 10/2014 | Hoffberg |
| 8,885,022 B2 | 11/2014 | Gay et al. |
| 8,900,325 B2 | 12/2014 | Herr et al. |
| 8,911,499 B2 | 12/2014 | Quaid et al. |
| 8,914,182 B2 | 12/2014 | Casado et al. |
| 8,918,209 B2 | 12/2014 | Rosenstein et al. |
| 8,920,332 B2 | 12/2014 | Hong et al. |
| 8,930,019 B2 | 1/2015 | Allen et al. |
| 8,935,119 B2 | 1/2015 | Yuen |
| 8,936,629 B2 | 1/2015 | Boyden et al. |
| 8,939,056 B1 | 1/2015 | Neal, III et al. |
| 8,945,017 B2 | 2/2015 | Venkatraman et al. |
| 8,947,531 B2 | 2/2015 | Fischer et al. |
| 8,948,832 B2 | 2/2015 | Hong et al. |
| 8,956,303 B2 | 2/2015 | Hong et al. |
| 8,965,677 B2 | 2/2015 | Breed et al. |
| 8,965,688 B2 | 2/2015 | Bandyopadhyay et al. |
| 8,965,730 B2 | 2/2015 | Yuen |
| 8,968,332 B2 | 3/2015 | Farritor et al. |
| 8,972,177 B2 | 3/2015 | Zheng et al. |
| 8,989,972 B2 | 3/2015 | Anderson |
| 8,998,815 B2 | 4/2015 | Venkatraman et al. |
| 9,002,426 B2 | 4/2015 | Quaid et al. |
| 9,005,129 B2 | 4/2015 | Venkatraman et al. |
| 9,008,962 B2 | 4/2015 | Bandyopadhyay et al. |
| 9,014,790 B2 | 4/2015 | Richards et al. |
| 9,014,848 B2 | 4/2015 | Farlow et al. |
| 9,020,617 B2 | 4/2015 | Hosek et al. |
| 9,021,024 B1 | 4/2015 | Tang et al. |
| 9,040,087 B2 | 5/2015 | Boyden et al. |
| 9,044,149 B2 | 6/2015 | Richards et al. |
| 9,044,171 B2 | 6/2015 | Venkatraman et al. |
| 9,046,373 B2 | 6/2015 | Bandyopadhyay et al. |
| 9,046,892 B2 | 6/2015 | Jang et al. |
| 9,056,676 B1 | 6/2015 | Wang |
| 9,060,678 B2 | 6/2015 | Larkin et al. |
| 9,066,211 B2 | 6/2015 | Helfrich |
| 9,075,146 B1 | 7/2015 | Valentino et al. |
| 9,079,060 B2 | 7/2015 | Hong et al. |
| 9,089,968 B2 | 7/2015 | Goulding |
| 9,092,698 B2 | 7/2015 | Buehler et al. |
| 9,098,079 B2 | 8/2015 | Masoud |
| 9,113,794 B2 | 8/2015 | Hong et al. |
| 9,113,795 B2 | 8/2015 | Hong et al. |
| 9,129,532 B2 | 9/2015 | Rubin et al. |
| 9,131,529 B1 | 9/2015 | Ayyagari et al. |
| 9,139,310 B1 | 9/2015 | Wang |
| 9,151,633 B2 | 10/2015 | Hoffberg |
| 9,168,392 B1 | 10/2015 | Balakin |
| 9,168,419 B2 | 10/2015 | Hong et al. |
| 9,177,476 B2 | 11/2015 | Breed |
| 9,183,560 B2 | 11/2015 | Abelow |
| 9,188,980 B2 | 11/2015 | Anderson |
| 9,198,563 B2 | 12/2015 | Ferren et al. |
| 9,198,604 B2 | 12/2015 | Venkatraman et al. |
| 9,199,725 B2 | 12/2015 | Yelland et al. |
| 9,211,201 B2 | 12/2015 | Herr et al. |
| 9,220,086 B2 | 12/2015 | Wang et al. |
| 9,220,917 B2 | 12/2015 | Boyden et al. |
| 9,221,177 B2 | 12/2015 | Herr et al. |
| 9,228,859 B2 | 1/2016 | Ranky et al. |
| 9,234,744 B2 | 1/2016 | Rhoads et al. |
| 9,237,855 B2 | 1/2016 | Hong et al. |
| 9,238,304 B1 * | 1/2016 | Bradski .............. B65G 47/50 |
| 9,248,982 B2 | 2/2016 | Eberhardt et al. |
| 9,251,393 B2 | 2/2016 | Pollack |
| 9,253,753 B2 | 2/2016 | Rubin et al. |
| 9,261,376 B2 | 2/2016 | Zheng et al. |
| 9,282,902 B2 | 3/2016 | Richards et al. |
| 9,292,936 B2 | 3/2016 | Bronshtein |
| 9,300,423 B2 | 3/2016 | Rubin et al. |
| 9,302,122 B2 | 4/2016 | Balakin |
| 9,302,783 B2 | 4/2016 | Wang |
| 9,307,917 B2 | 4/2016 | Hong et al. |
| 9,311,670 B2 | 4/2016 | Hoffberg |
| 9,333,042 B2 | 5/2016 | Diolaiti et al. |
| 9,345,387 B2 | 5/2016 | Larkin |
| 9,345,592 B2 | 5/2016 | Herr et al. |
| 9,346,560 B2 | 5/2016 | Wang |
| 9,351,106 B2 | 5/2016 | Markham et al. |
| 9,351,856 B2 | 5/2016 | Herr et al. |
| 9,358,975 B1 | 6/2016 | Watts |
| 9,361,797 B1 | 6/2016 | Chen et al. |
| 9,383,752 B2 | 7/2016 | Mian |
| 9,389,085 B2 | 7/2016 | Khorashadi et al. |
| 9,392,920 B2 | 7/2016 | Halloran et al. |
| 9,400,503 B2 | 7/2016 | Kearns et al. |
| 9,402,552 B2 | 8/2016 | Richards et al. |
| 9,408,530 B2 | 8/2016 | Ferren et al. |
| 9,410,979 B2 | 8/2016 | Yuen et al. |
| 9,412,278 B1 | 8/2016 | Gong et al. |
| 9,413,852 B2 | 8/2016 | Lawson et al. |
| 9,420,203 B2 | 8/2016 | Broggi et al. |
| 9,420,432 B2 | 8/2016 | Matthews, III et al. |
| 9,429,657 B2 | 8/2016 | Sidhu et al. |
| 9,429,661 B2 | 8/2016 | Valentino et al. |
| 9,431,006 B2 | 8/2016 | Bellegarda |
| 9,434,072 B2 | 9/2016 | Buehler et al. |
| 9,440,545 B2 | 9/2016 | Wang |
| 9,443,192 B1 | 9/2016 | Cosic |
| 9,445,711 B2 | 9/2016 | Sitti et al. |
| 9,448,072 B2 | 9/2016 | Bandyopadhyay et al. |
| 9,456,787 B2 | 10/2016 | Venkatraman et al. |
| 9,457,915 B2 | 10/2016 | Wang |
| 9,459,273 B2 | 10/2016 | Moix et al. |
| 9,459,626 B2 | 10/2016 | Chen et al. |

(56) References Cited

U.S. PATENT DOCUMENTS

| | | |
|---|---|---|
| 9,465,390 B2 | 10/2016 | Mason et al. |
| 9,467,834 B2 | 10/2016 | Guday et al. |
| 9,468,349 B2 | 10/2016 | Fong et al. |
| 9,470,529 B2 | 10/2016 | Sidhu et al. |
| 9,470,702 B2 | 10/2016 | Pollack |
| 9,477,230 B2 | 10/2016 | Sastre I Sastre |
| 9,480,534 B2 | 11/2016 | Bowling et al. |
| 9,486,921 B1 | 11/2016 | Straszheim et al. |
| 9,488,987 B2 | 11/2016 | Goulding |
| 9,489,655 B1 | 11/2016 | Lecky |
| 9,491,589 B2 | 11/2016 | Schrader et al. |
| 9,494,432 B2 | 11/2016 | Pakzad et al. |
| 9,497,380 B1 | 11/2016 | Jannard et al. |
| 9,498,649 B2 | 11/2016 | Balakin |
| 9,504,408 B2 | 11/2016 | Hong et al. |
| 9,507,346 B1 | 11/2016 | Levinson et al. |
| 9,511,799 B2 | 12/2016 | Lavoie |
| 9,513,132 B2 | 12/2016 | Fowe |
| 9,517,668 B2 | 12/2016 | Lavoie |
| 9,517,767 B1 | 12/2016 | Kentley et al. |
| 9,519,882 B2 | 12/2016 | Galluzzo et al. |
| 9,520,638 B2 | 12/2016 | Baringer et al. |
| 9,527,586 B2 | 12/2016 | Levien et al. |
| 9,527,587 B2 | 12/2016 | Levien et al. |
| 9,538,892 B2 | 1/2017 | Fong et al. |
| 9,539,117 B2 | 1/2017 | Herr et al. |
| 9,540,043 B2 | 1/2017 | Lavoie |
| 9,540,102 B2 | 1/2017 | Levien et al. |
| 9,541,383 B2 | 1/2017 | Abovitz et al. |
| 9,542,600 B2 | 1/2017 | Buchanan et al. |
| 9,543,636 B2 | 1/2017 | Baringer et al. |
| 9,551,582 B2 | 1/2017 | Hoffberg |
| 9,554,922 B2 | 1/2017 | Casler et al. |
| 9,557,742 B2 | 1/2017 | Paduano et al. |
| 9,561,794 B2 | 2/2017 | Watts |
| 9,561,941 B1 | 2/2017 | Watts |
| 9,567,074 B2 | 2/2017 | Levien et al. |
| 9,568,492 B2 | 2/2017 | Yuen |
| 9,572,533 B2 | 2/2017 | Venkatraman et al. |
| 9,574,883 B2 | 2/2017 | Watts et al. |
| 9,582,720 B2 | 2/2017 | Gupta et al. |
| 9,586,316 B1 | 3/2017 | Swilling |
| 9,588,195 B2 | 3/2017 | Fichtinger et al. |
| 9,592,851 B2 | 3/2017 | Lavoie et al. |
| 9,593,957 B2 | 3/2017 | Zheng et al. |
| 9,597,014 B2 | 3/2017 | Venkatraman et al. |
| 9,599,632 B2 | 3/2017 | Yuen |
| 9,599,990 B2 | 3/2017 | Halloran et al. |
| 9,600,138 B2 | 3/2017 | Thomas et al. |
| 9,605,952 B2 | 3/2017 | Rose et al. |
| 9,606,539 B1 | 3/2017 | Kentley et al. |
| 9,609,107 B2 | 3/2017 | Rodriguez et al. |
| 9,612,123 B1 | 4/2017 | Levinson et al. |
| 9,612,403 B2 | 4/2017 | Abovitz et al. |
| 9,616,252 B2 | 4/2017 | Balakin |
| 9,623,562 B1 | 4/2017 | Watts |
| 9,630,619 B1 | 4/2017 | Kentley et al. |
| 9,632,502 B1 | 4/2017 | Levinson et al. |
| 9,638,829 B2 | 5/2017 | Davoodi et al. |
| 9,641,239 B2 | 5/2017 | Panther et al. |
| 9,643,316 B2 | 5/2017 | Krasny et al. |
| 9,645,159 B2 | 5/2017 | Pollack et al. |
| 9,645,577 B1 | 5/2017 | Frazzoli et al. |
| 9,646,614 B2 | 5/2017 | Bellegarda et al. |
| 9,649,767 B2 | 5/2017 | Nusser et al. |
| 9,651,368 B2 | 5/2017 | Abovitz et al. |
| 9,655,548 B2 | 5/2017 | Hong et al. |
| 9,658,239 B2 | 5/2017 | Eberhardt et al. |
| 9,661,827 B1 | 5/2017 | Shen et al. |
| 9,662,053 B2 | 5/2017 | Richards et al. |
| 9,669,544 B2 | 6/2017 | Buehler et al. |
| 9,671,418 B2 | 6/2017 | Mellars et al. |
| 9,671,566 B2 | 6/2017 | Abovitz et al. |
| 9,682,481 B2 | 6/2017 | Lutz et al. |
| 9,683,858 B2 | 6/2017 | Zheng et al. |
| 9,687,301 B2 * | 6/2017 | Lee ................... A61B 6/032 |
| 9,687,377 B2 | 6/2017 | Han et al. |
| 9,701,015 B2 | 7/2017 | Buehler et al. |
| 9,701,239 B2 | 7/2017 | Kentley et al. |
| 9,703,295 B1 | 7/2017 | Neal, III et al. |
| 9,714,954 B2 | 7/2017 | Gelbman |
| 9,720,415 B2 | 8/2017 | Levinson et al. |
| 9,721,471 B2 | 8/2017 | Chen et al. |
| 9,726,686 B2 | 8/2017 | Mellars et al. |
| 9,731,853 B2 | 8/2017 | Akdogan et al. |
| 9,734,220 B2 | 8/2017 | Karpištšenko et al. |
| 9,734,367 B1 | 8/2017 | Lecky et al. |
| 9,734,455 B2 | 8/2017 | Levinson et al. |
| 9,734,632 B2 | 8/2017 | Thomas et al. |
| 9,736,655 B2 | 8/2017 | Schrader et al. |
| 9,744,672 B2 | 8/2017 | Sun et al. |
| 9,746,330 B2 | 8/2017 | Lacaze et al. |
| 9,747,809 B2 | 8/2017 | Levien et al. |
| 9,750,977 B2 | 9/2017 | Yuen et al. |
| 9,751,015 B2 | 9/2017 | Gay et al. |
| 9,754,226 B2 | 9/2017 | Zheng et al. |
| 9,754,419 B2 | 9/2017 | Petrovskaya et al. |
| 9,754,490 B2 | 9/2017 | Kentley et al. |
| 9,760,093 B2 | 9/2017 | Perlin et al. |
| 9,767,608 B2 | 9/2017 | Lee et al. |
| 9,769,365 B1 | 9/2017 | Jannard |
| 9,775,681 B2 | 10/2017 | Quaid et al. |
| 9,776,326 B2 | 10/2017 | Zevenbergen et al. |
| 9,776,716 B2 | 10/2017 | Levien et al. |
| 9,785,911 B2 | 10/2017 | Galluzzo et al. |
| 9,786,202 B2 | 10/2017 | Huang et al. |
| 9,791,866 B2 | 10/2017 | Paduano et al. |
| 9,792,613 B2 | 10/2017 | Gong et al. |
| 9,794,541 B2 | 10/2017 | Gay et al. |
| 9,795,445 B2 | 10/2017 | Bowling |
| 9,798,329 B2 | 10/2017 | Shattil |
| 9,801,527 B2 | 10/2017 | Ferren et al. |
| 9,802,661 B1 | 10/2017 | Kentley-Klay |
| 9,804,599 B2 | 10/2017 | Kentley-Klay et al. |
| 9,805,372 B2 | 10/2017 | Gong et al. |
| 9,805,607 B2 | 10/2017 | Gong et al. |
| 9,818,136 B1 | 11/2017 | Hoffberg |
| 9,827,683 B1 | 11/2017 | Hance et al. |
| 9,830,485 B1 | 11/2017 | Lecky |
| 9,832,749 B2 | 11/2017 | Schlesinger et al. |
| 9,835,637 B2 | 12/2017 | Pollack et al. |
| 9,839,552 B2 | 12/2017 | Han et al. |
| 9,840,003 B2 | 12/2017 | Szatmary et al. |
| 9,857,170 B2 | 1/2018 | Abovitz et al. |
| 9,860,129 B2 | 1/2018 | Zinger et al. |
| 9,861,075 B2 | 1/2018 | Shen et al. |
| 9,869,484 B2 | 1/2018 | Hester et al. |
| 9,870,566 B2 | 1/2018 | Gong et al. |
| 9,873,196 B2 | 1/2018 | Szatmary et al. |
| 9,878,664 B2 | 1/2018 | Kentley-Klay et al. |
| 9,880,561 B2 | 1/2018 | Russell |
| 9,881,497 B2 | 1/2018 | Chen et al. |
| 9,888,105 B2 | 2/2018 | Rhoads |
| 9,901,408 B2 | 2/2018 | Larkin |
| 9,902,069 B2 | 2/2018 | Farlow et al. |
| 9,907,721 B2 | 3/2018 | Morbi et al. |
| 9,910,441 B2 | 3/2018 | Levinson et al. |
| 9,911,020 B1 | 3/2018 | Liu et al. |
| 9,916,002 B2 | 3/2018 | Petrovskaya et al. |
| 9,916,006 B2 | 3/2018 | Maltz |
| 9,916,010 B2 | 3/2018 | Harris et al. |
| 9,916,703 B2 | 3/2018 | Levinson et al. |
| 9,919,360 B2 | 3/2018 | Buller et al. |
| 9,927,807 B1 | 3/2018 | Ganjoo |
| 9,928,649 B2 | 3/2018 | Hu et al. |
| 9,931,573 B2 | 4/2018 | Fang et al. |
| 9,931,697 B2 | 4/2018 | Levin et al. |
| 9,937,621 B2 | 4/2018 | Zevenbergen et al. |
| 9,939,817 B1 | 4/2018 | Kentley-Klay et al. |
| 9,940,553 B2 | 4/2018 | Shotton et al. |
| 9,940,604 B2 | 4/2018 | Galluzzo et al. |
| 9,945,677 B1 | 4/2018 | Watts |
| 9,947,230 B2 | 4/2018 | Hu et al. |
| 9,952,042 B2 | 4/2018 | Abovitz et al. |

(56) References Cited

U.S. PATENT DOCUMENTS

| | | |
|---|---|---|
| 9,952,591 B2 | 4/2018 | Parekh et al. |
| 9,958,864 B2 | 5/2018 | Kentley-Klay et al. |
| 9,958,875 B2 | 5/2018 | Paduano et al. |
| 9,964,765 B2 | 5/2018 | Gardiner |
| 9,965,730 B2 | 5/2018 | Hance et al. |
| 9,968,280 B2 | 5/2018 | Whitcomb et al. |
| 9,972,137 B2 | 5/2018 | Petrovskaya et al. |
| 9,975,249 B2 | 5/2018 | Herr et al. |
| 9,977,496 B2 | 5/2018 | Maltz |
| 9,978,013 B2 | 5/2018 | Kaufhold |
| 9,980,630 B2 | 5/2018 | Larkin et al. |
| 9,983,584 B2 | 5/2018 | Bruggemann et al. |
| 9,984,339 B2 | 5/2018 | Hance et al. |
| 9,985,786 B1 | 5/2018 | Bhabbur et al. |
| 10,449,673 B2 * | 10/2019 | Hill ............... B25J 9/1666 |
| 10,884,430 B2 * | 1/2021 | Kumar ............. G05D 1/104 |
| 2002/0005614 A1 | 1/2002 | Krull et al. |
| 2002/0012611 A1 | 1/2002 | Stylli et al. |
| 2002/0016647 A1 | 2/2002 | Bourne et al. |
| 2002/0022927 A1 | 2/2002 | Lemelson |
| 2002/0073101 A1 | 6/2002 | Stoyen |
| 2002/0184236 A1 | 12/2002 | Donath et al. |
| 2002/0198623 A1 | 12/2002 | Jevtic et al. |
| 2002/0198697 A1 | 12/2002 | Datig |
| 2003/0093187 A1 | 5/2003 | Walker |
| 2003/0179308 A1 | 9/2003 | Zamorano et al. |
| 2003/0199944 A1 | 10/2003 | Chapin et al. |
| 2003/0208302 A1 | 11/2003 | Lemelson et al. |
| 2004/0006422 A1 | 1/2004 | Fehr et al. |
| 2004/0006566 A1 | 1/2004 | Taylor et al. |
| 2004/0013295 A1 | 1/2004 | Sabe et al. |
| 2004/0019402 A1 | 1/2004 | Bourne et al. |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0030741 A1 | 2/2004 | Wolton et al. |
| 2004/0068351 A1 | 4/2004 | Solomon |
| 2004/0068415 A1 | 4/2004 | Solomon |
| 2004/0068416 A1 | 4/2004 | Solomon |
| 2004/0077090 A1 | 4/2004 | Short |
| 2004/0103740 A1 | 6/2004 | Townsend et al. |
| 2004/0107021 A1 | 6/2004 | Jevtic et al. |
| 2004/0128028 A1 | 7/2004 | Miyamoto et al. |
| 2004/0130442 A1 | 7/2004 | Breed et al. |
| 2004/0133168 A1 | 7/2004 | Salcudean et al. |
| 2004/0134336 A1 | 7/2004 | Solomon |
| 2004/0134337 A1 | 7/2004 | Solomon |
| 2004/0162638 A1 | 8/2004 | Solomon |
| 2004/0242953 A1 | 12/2004 | Good |
| 2004/0267442 A1 | 12/2004 | Fehr et al. |
| 2005/0005266 A1 | 1/2005 | Datig |
| 2005/0065649 A1 | 3/2005 | Rosenfeld et al. |
| 2005/0071043 A1 | 3/2005 | Jevtic et al. |
| 2005/0125099 A1 | 6/2005 | Mikami et al. |
| 2005/0131581 A1 | 6/2005 | Sabe et al. |
| 2005/0149251 A1 | 7/2005 | Donath et al. |
| 2005/0183569 A1 | 8/2005 | Solomon |
| 2005/0187677 A1 | 8/2005 | Walker |
| 2005/0191670 A1 | 9/2005 | Stylli et al. |
| 2005/0192727 A1 | 9/2005 | Shostak et al. |
| 2005/0215764 A1 | 9/2005 | Tuszynski et al. |
| 2005/0237188 A1 | 10/2005 | Tani |
| 2005/0240253 A1 | 10/2005 | Tyler et al. |
| 2005/0240307 A1 | 10/2005 | Kuroki et al. |
| 2005/0249667 A1 | 11/2005 | Tuszynski et al. |
| 2005/0251291 A1 | 11/2005 | Solomon |
| 2005/0273218 A1 | 12/2005 | Breed et al. |
| 2006/0064202 A1 | 3/2006 | Gutmann et al. |
| 2006/0095171 A1 | 5/2006 | Whittaker et al. |
| 2006/0097683 A1 | 5/2006 | Hosoda et al. |
| 2006/0142657 A1 | 6/2006 | Quaid et al. |
| 2006/0161218 A1 | 7/2006 | Danilov |
| 2006/0161405 A1 | 7/2006 | Munirajan |
| 2006/0167784 A1 | 7/2006 | Hoffberg |
| 2006/0184272 A1 | 8/2006 | Okazaki et al. |
| 2006/0229801 A1 | 10/2006 | Fink et al. |
| 2006/0241368 A1 | 10/2006 | Fichtinger et al. |
| 2006/0241718 A1 | 10/2006 | Tyler et al. |
| 2007/0007384 A1 | 1/2007 | Sliwa |
| 2007/0010898 A1 | 1/2007 | Hosek et al. |
| 2007/0018890 A1 | 1/2007 | Kulyukin |
| 2007/0027612 A1 | 2/2007 | Barfoot et al. |
| 2007/0039831 A1 | 2/2007 | Townsend |
| 2007/0055662 A1 | 3/2007 | Edelman et al. |
| 2007/0063875 A1 | 3/2007 | Hoffberg |
| 2007/0070072 A1 | 3/2007 | Templeman |
| 2007/0087756 A1 | 4/2007 | Hoffberg |
| 2007/0100780 A1 | 5/2007 | Fleischer et al. |
| 2007/0124024 A1 | 5/2007 | Okamoto et al. |
| 2007/0150565 A1 | 6/2007 | Ayyagari et al. |
| 2007/0159924 A1 | 7/2007 | Vook et al. |
| 2007/0217586 A1 * | 9/2007 | Marti ............. H04M 19/04 379/201.01 |
| 2007/0219933 A1 | 9/2007 | Datig |
| 2007/0220637 A1 | 9/2007 | Endo et al. |
| 2007/0239315 A1 | 10/2007 | Sato et al. |
| 2007/0250119 A1 | 10/2007 | Tyler et al. |
| 2007/0262860 A1 | 11/2007 | Salinas et al. |
| 2008/0009772 A1 | 1/2008 | Tyler et al. |
| 2008/0027591 A1 | 1/2008 | Lenser et al. |
| 2008/0059015 A1 | 3/2008 | Whittaker et al. |
| 2008/0072139 A1 | 3/2008 | Salinas et al. |
| 2008/0167771 A1 | 7/2008 | Whittaker et al. |
| 2008/0226498 A1 | 9/2008 | Stylli et al. |
| 2008/0228239 A1 | 9/2008 | Tyler et al. |
| 2008/0270097 A1 | 10/2008 | Solomon |
| 2008/0300777 A1 | 12/2008 | Fehr et al. |
| 2008/0312561 A1 | 12/2008 | Chauhan |
| 2009/0000626 A1 | 1/2009 | Quaid et al. |
| 2009/0000627 A1 | 1/2009 | Quaid et al. |
| 2009/0012531 A1 | 1/2009 | Quaid et al. |
| 2009/0012532 A1 | 1/2009 | Quaid et al. |
| 2009/0037033 A1 | 2/2009 | Phillips et al. |
| 2009/0043504 A1 | 2/2009 | Bandyopadhyay et al. |
| 2009/0073034 A1 * | 3/2009 | Lin ................ G01S 19/49 342/357.57 |
| 2009/0087029 A1 | 4/2009 | Coleman et al. |
| 2009/0148035 A1 | 6/2009 | Ohno et al. |
| 2009/0152391 A1 | 6/2009 | McWhirk |
| 2009/0178597 A1 | 7/2009 | Sliwa, Jr. |
| 2009/0306741 A1 | 12/2009 | Hogle et al. |
| 2009/0312808 A1 | 12/2009 | Tyler et al. |
| 2009/0312817 A1 | 12/2009 | Hogle et al. |
| 2009/0326604 A1 | 12/2009 | Tyler et al. |
| 2010/0017046 A1 | 1/2010 | Cheung et al. |
| 2010/0042258 A1 | 2/2010 | Perlin et al. |
| 2010/0056900 A1 | 3/2010 | Whitcomb et al. |
| 2010/0076631 A1 | 3/2010 | Mian |
| 2010/0076737 A1 | 3/2010 | Boddy et al. |
| 2010/0106356 A1 | 4/2010 | Trepagnier et al. |
| 2010/0114633 A1 | 5/2010 | Sislak et al. |
| 2010/0149917 A1 | 6/2010 | Imhof et al. |
| 2010/0161232 A1 | 6/2010 | Chen et al. |
| 2010/0235285 A1 | 9/2010 | Hoffberg |
| 2010/0268382 A1 | 10/2010 | Ohno |
| 2010/0286791 A1 | 11/2010 | Goldsmith |
| 2010/0286824 A1 | 11/2010 | Solomon |
| 2010/0312387 A1 | 12/2010 | Jang et al. |
| 2010/0312388 A1 | 12/2010 | Jang et al. |
| 2010/0317420 A1 | 12/2010 | Hoffberg |
| 2011/0002194 A1 | 1/2011 | Imhof et al. |
| 2011/0004513 A1 | 1/2011 | Hoffberg |
| 2011/0022230 A1 | 1/2011 | Fleischer et al. |
| 2011/0077775 A1 | 3/2011 | Nagasaka et al. |
| 2011/0082717 A1 | 4/2011 | Saad et al. |
| 2011/0118855 A1 | 5/2011 | Hosek et al. |
| 2011/0128300 A1 | 6/2011 | Gay et al. |
| 2011/0130114 A1 | 6/2011 | Boudville |
| 2011/0164030 A1 | 7/2011 | Gay et al. |
| 2011/0164116 A1 | 7/2011 | Gay et al. |

(56) References Cited

U.S. PATENT DOCUMENTS

| | | |
|---|---|---|
| 2011/0185110 A1* | 7/2011 | Smigelski .............. G11C 7/24 |
| | | 711/E12.008 |
| 2011/0196564 A1* | 8/2011 | Coulmeau ........... G08G 5/0039 |
| | | 701/26 |
| 2011/0231016 A1 | 9/2011 | Goulding |
| 2011/0231050 A1 | 9/2011 | Goulding |
| 2011/0288684 A1 | 11/2011 | Farlow et al. |
| 2011/0306986 A1 | 12/2011 | Lee et al. |
| 2012/0069131 A1 | 3/2012 | Abelow |
| 2012/0072023 A1 | 3/2012 | Ota |
| 2012/0075072 A1 | 3/2012 | Pappu |
| 2012/0084839 A1 | 4/2012 | Ayyagari et al. |
| 2012/0101680 A1 | 4/2012 | Trepagnier et al. |
| 2012/0109150 A1 | 5/2012 | Quaid et al. |
| 2012/0130632 A1 | 5/2012 | Bandyopadhyay et al. |
| 2012/0149353 A1 | 6/2012 | Helfrich |
| 2012/0166024 A1 | 6/2012 | Phillips et al. |
| 2012/0173018 A1 | 7/2012 | Allen et al. |
| 2012/0182392 A1 | 7/2012 | Kearns et al. |
| 2012/0185094 A1 | 7/2012 | Rosenstein et al. |
| 2012/0194644 A1 | 8/2012 | Newcombe et al. |
| 2012/0209432 A1 | 8/2012 | Fleischer et al. |
| 2012/0215354 A1 | 8/2012 | Krasny et al. |
| 2012/0274775 A1 | 11/2012 | Reiffel |
| 2012/0290152 A1 | 11/2012 | Cheung et al. |
| 2012/0310112 A1 | 12/2012 | Fichtinger et al. |
| 2012/0316725 A1 | 12/2012 | Trepagnier et al. |
| 2013/0079693 A1 | 3/2013 | Ranky et al. |
| 2013/0131985 A1 | 5/2013 | Weiland et al. |
| 2013/0165070 A1 | 6/2013 | Hoffberg |
| 2013/0166195 A1 | 6/2013 | Bandyopadhyay et al. |
| 2013/0166202 A1 | 6/2013 | Bandyopadhyay et al. |
| 2013/0166387 A1 | 6/2013 | Hoffberg |
| 2013/0196300 A1 | 8/2013 | Huang et al. |
| 2013/0212420 A1 | 8/2013 | Lawson et al. |
| 2013/0238183 A1 | 9/2013 | Goulding |
| 2013/0252586 A1 | 9/2013 | Helfrich |
| 2013/0274986 A1 | 10/2013 | Trepagnier et al. |
| 2013/0279392 A1 | 10/2013 | Rubin et al. |
| 2013/0279393 A1 | 10/2013 | Rubin et al. |
| 2013/0279491 A1 | 10/2013 | Rubin et al. |
| 2013/0303847 A1 | 11/2013 | Sitti et al. |
| 2013/0320212 A1 | 12/2013 | Valentino et al. |
| 2013/0335273 A1 | 12/2013 | Pakzad et al. |
| 2013/0343640 A1 | 12/2013 | Buehler et al. |
| 2013/0345870 A1* | 12/2013 | Buehler ............. G06V 30/1914 |
| | | 901/47 |
| 2013/0346348 A1* | 12/2013 | Buehler ............... G05B 19/423 |
| | | 901/31 |
| 2014/0039298 A1 | 2/2014 | Whitcomb et al. |
| 2014/0067188 A1 | 3/2014 | Mian |
| 2014/0081459 A1 | 3/2014 | Dubois et al. |
| 2014/0100693 A1 | 4/2014 | Fong et al. |
| 2014/0100697 A1 | 4/2014 | Goulding |
| 2014/0155087 A1 | 6/2014 | Helfrich |
| 2014/0155098 A1 | 6/2014 | Markham et al. |
| 2014/0156806 A1 | 6/2014 | Karpistsenko et al. |
| 2014/0163664 A1 | 6/2014 | Goldsmith |
| 2014/0187913 A1 | 7/2014 | Fichtinger et al. |
| 2014/0193040 A1 | 7/2014 | Bronshtein |
| 2014/0214259 A1 | 7/2014 | Trepagnier et al. |
| 2014/0241612 A1 | 8/2014 | Rhemann et al. |
| 2014/0241617 A1 | 8/2014 | Shotton et al. |
| 2014/0244035 A1 | 8/2014 | Perlin et al. |
| 2014/0263989 A1 | 9/2014 | Valentino et al. |
| 2014/0264047 A1 | 9/2014 | Valentino et al. |
| 2014/0266939 A1 | 9/2014 | Baringer et al. |
| 2014/0268601 A1 | 9/2014 | Valentino et al. |
| 2014/0273858 A1 | 9/2014 | Panther et al. |
| 2014/0275760 A1 | 9/2014 | Lee et al. |
| 2014/0275850 A1 | 9/2014 | Venkatraman et al. |
| 2014/0275852 A1 | 9/2014 | Hong et al. |
| 2014/0275854 A1 | 9/2014 | Venkatraman et al. |
| 2014/0276119 A1 | 9/2014 | Venkatraman et al. |
| 2014/0277737 A1 | 9/2014 | Sekiyama et al. |
| 2014/0278220 A1 | 9/2014 | Yuen |
| 2014/0278229 A1 | 9/2014 | Hong et al. |
| 2014/0278634 A1 | 9/2014 | Horvitz et al. |
| 2014/0288390 A1 | 9/2014 | Hong et al. |
| 2014/0288391 A1 | 9/2014 | Hong et al. |
| 2014/0288392 A1 | 9/2014 | Hong et al. |
| 2014/0288435 A1 | 9/2014 | Richards et al. |
| 2014/0288436 A1 | 9/2014 | Venkatraman et al. |
| 2014/0288438 A1 | 9/2014 | Venkatraman et al. |
| 2014/0293014 A1 | 10/2014 | Gay et al. |
| 2014/0297217 A1 | 10/2014 | Yuen |
| 2014/0297218 A1 | 10/2014 | Yuen |
| 2014/0303486 A1 | 10/2014 | Baumgartner et al. |
| 2014/0305204 A1 | 10/2014 | Hong et al. |
| 2014/0316305 A1 | 10/2014 | Venkatraman et al. |
| 2014/0316570 A1 | 10/2014 | Sun et al. |
| 2014/0333668 A1 | 11/2014 | Gay et al. |
| 2014/0347265 A1 | 11/2014 | Aimone et al. |
| 2014/0356817 A1 | 12/2014 | Brooks et al. |
| 2014/0358012 A1 | 12/2014 | Richards et al. |
| 2014/0374480 A1 | 12/2014 | Pollack |
| 2014/0378999 A1 | 12/2014 | Crawford et al. |
| 2015/0010437 A1 | 1/2015 | Mellars et al. |
| 2015/0016777 A1 | 1/2015 | Abovitz et al. |
| 2015/0019013 A1 | 1/2015 | Rose et al. |
| 2015/0019124 A1 | 1/2015 | Bandyopadhyay et al. |
| 2015/0025393 A1 | 1/2015 | Hong et al. |
| 2015/0025394 A1 | 1/2015 | Hong et al. |
| 2015/0032164 A1 | 1/2015 | Crawford et al. |
| 2015/0032252 A1 | 1/2015 | Galluzzo et al. |
| 2015/0037437 A1 | 2/2015 | Gill et al. |
| 2015/0051519 A1 | 2/2015 | Morbi et al. |
| 2015/0073646 A1 | 3/2015 | Rosenstein et al. |
| 2015/0081156 A1 | 3/2015 | Trepagnier et al. |
| 2015/0081444 A1 | 3/2015 | Hoffberg |
| 2015/0094096 A1 | 4/2015 | Tang et al. |
| 2015/0106427 A1 | 4/2015 | Tang et al. |
| 2015/0118756 A1 | 4/2015 | Pollack et al. |
| 2015/0122018 A1 | 5/2015 | Yuen |
| 2015/0127141 A1 | 5/2015 | Kawada et al. |
| 2015/0158182 A1 | 6/2015 | Farlow et al. |
| 2015/0168939 A1 | 6/2015 | Masoud |
| 2015/0173631 A1 | 6/2015 | Richards et al. |
| 2015/0192682 A1 | 7/2015 | Valentino et al. |
| 2015/0196256 A1 | 7/2015 | Venkatraman et al. |
| 2015/0201853 A1 | 7/2015 | Hong et al. |
| 2015/0201854 A1 | 7/2015 | Hong et al. |
| 2015/0202770 A1 | 7/2015 | Patron et al. |
| 2015/0223708 A1 | 8/2015 | Richards et al. |
| 2015/0230735 A1 | 8/2015 | Venkatraman et al. |
| 2015/0234477 A1 | 8/2015 | Abovitz et al. |
| 2015/0235088 A1 | 8/2015 | Abovitz et al. |
| 2015/0235370 A1 | 8/2015 | Abovitz et al. |
| 2015/0235441 A1 | 8/2015 | Abovitz et al. |
| 2015/0235447 A1 | 8/2015 | Abovitz et al. |
| 2015/0241458 A1 | 8/2015 | Pollack |
| 2015/0241705 A1 | 8/2015 | Abovitz et al. |
| 2015/0241959 A1 | 8/2015 | Abovitz et al. |
| 2015/0242575 A1 | 8/2015 | Abovitz et al. |
| 2015/0242943 A1 | 8/2015 | Abovitz et al. |
| 2015/0243100 A1 | 8/2015 | Abovitz et al. |
| 2015/0243105 A1 | 8/2015 | Abovitz et al. |
| 2015/0243106 A1 | 8/2015 | Abovitz et al. |
| 2015/0247723 A1 | 9/2015 | Abovitz et al. |
| 2015/0247975 A1 | 9/2015 | Abovitz et al. |
| 2015/0247976 A1 | 9/2015 | Abovitz et al. |
| 2015/0248169 A1 | 9/2015 | Abovitz et al. |
| 2015/0248170 A1 | 9/2015 | Abovitz et al. |
| 2015/0248787 A1 | 9/2015 | Abovitz et al. |
| 2015/0248788 A1 | 9/2015 | Abovitz et al. |
| 2015/0248789 A1 | 9/2015 | Abovitz et al. |
| 2015/0248791 A1 | 9/2015 | Abovitz et al. |
| 2015/0248792 A1 | 9/2015 | Abovitz et al. |
| 2015/0248793 A1 | 9/2015 | Abovitz et al. |
| 2015/0256401 A1 | 9/2015 | Zinger et al. |
| 2015/0268355 A1 | 9/2015 | Valentino et al. |
| 2015/0273242 A1 | 10/2015 | Balakin |
| 2015/0273691 A1 | 10/2015 | Pollack |
| 2015/0276775 A1 | 10/2015 | Mellars et al. |

(56) References Cited

U.S. PATENT DOCUMENTS

| | | |
|---|---|---|
| 2015/0286221 A1 | 10/2015 | Goulding |
| 2015/0290453 A1 | 10/2015 | Tyler et al. |
| 2015/0290454 A1 | 10/2015 | Tyler et al. |
| 2015/0290802 A1 | 10/2015 | Buehler et al. |
| 2015/0290803 A1 | 10/2015 | Buehler et al. |
| 2015/0301072 A1 | 10/2015 | Gelbman |
| 2015/0308839 A1 | 10/2015 | Jiang et al. |
| 2015/0309263 A2 | 10/2015 | Abovitz et al. |
| 2015/0309264 A1 | 10/2015 | Abovitz et al. |
| 2015/0314166 A1 | 11/2015 | Hong et al. |
| 2015/0323990 A1 | 11/2015 | Maltz |
| 2015/0332213 A1 | 11/2015 | Galluzzo et al. |
| 2015/0343238 A1 | 12/2015 | Balakin |
| 2015/0353206 A1 | 12/2015 | Wang |
| 2015/0355207 A1 | 12/2015 | Pollack et al. |
| 2015/0355211 A1 | 12/2015 | Mellars et al. |
| 2015/0360057 A1 | 12/2015 | Balakin |
| 2015/0369864 A1 | 12/2015 | Marlow et al. |
| 2016/0004306 A1 | 1/2016 | Maltz |
| 2016/0018816 A1 | 1/2016 | Hosek et al. |
| 2016/0023762 A1 | 1/2016 | Wang |
| 2016/0025500 A1 | 1/2016 | Hoffberg |
| 2016/0025502 A1 | 1/2016 | Lacaze et al. |
| 2016/0026253 A1 | 1/2016 | Bradski et al. |
| 2016/0036118 A1 | 2/2016 | Baringer et al. |
| 2016/0039540 A1 | 2/2016 | Wang |
| 2016/0039553 A1 | 2/2016 | Akdogan et al. |
| 2016/0039621 A1 | 2/2016 | Akdogan et al. |
| 2016/0042151 A1 | 2/2016 | Akdogan et al. |
| 2016/0045841 A1 | 2/2016 | Kaplan et al. |
| 2016/0051169 A1 | 2/2016 | Hong et al. |
| 2016/0054135 A1 | 2/2016 | Fowe |
| 2016/0055677 A1 | 2/2016 | Kuffner |
| 2016/0066844 A1 | 3/2016 | Venkatraman et al. |
| 2016/0070436 A1 | 3/2016 | Thomas et al. |
| 2016/0081575 A1 | 3/2016 | Wu |
| 2016/0082597 A1 | 3/2016 | Gorshechnikov et al. |
| 2016/0084869 A1 | 3/2016 | Yuen et al. |
| 2016/0086108 A1 | 3/2016 | Abelow |
| 2016/0109954 A1 | 4/2016 | Harris et al. |
| 2016/0129592 A1 | 5/2016 | Saboo et al. |
| 2016/0132059 A1 | 5/2016 | Mason et al. |
| 2016/0136284 A1 | 5/2016 | Gill et al. |
| 2016/0140729 A1 | 5/2016 | Soatto et al. |
| 2016/0143500 A1 | 5/2016 | Fong et al. |
| 2016/0148433 A1 | 5/2016 | Petrovskaya et al. |
| 2016/0158937 A1 | 6/2016 | Kamoi et al. |
| 2016/0167582 A1 | 6/2016 | Chen et al. |
| 2016/0170414 A1 | 6/2016 | Chen et al. |
| 2016/0171884 A1 | 6/2016 | Chen et al. |
| 2016/0171893 A1 | 6/2016 | Chen et al. |
| 2016/0183818 A1 | 6/2016 | Richards et al. |
| 2016/0187166 A1 | 6/2016 | Ranky et al. |
| 2016/0201933 A1 | 7/2016 | Hester et al. |
| 2016/0201934 A1 | 7/2016 | Hester et al. |
| 2016/0212402 A1 | 7/2016 | Maruyama et al. |
| 2016/0216117 A9 | 7/2016 | Bandyopadhyay et al. |
| 2016/0236582 A1 | 8/2016 | Wang |
| 2016/0253844 A1 | 9/2016 | Petrovskaya et al. |
| 2016/0260322 A1 | 9/2016 | Chen et al. |
| 2016/0282126 A1 | 9/2016 | Watts et al. |
| 2016/0283774 A1 | 9/2016 | Buchanan et al. |
| 2016/0288905 A1 | 10/2016 | Gong et al. |
| 2016/0291593 A1 | 10/2016 | Hammond et al. |
| 2016/0292403 A1 | 10/2016 | Gong et al. |
| 2016/0292696 A1 | 10/2016 | Gong et al. |
| 2016/0292869 A1 | 10/2016 | Hammond et al. |
| 2016/0292872 A1 | 10/2016 | Hammond et al. |
| 2016/0297429 A1 | 10/2016 | Watts |
| 2016/0299506 A1 | 10/2016 | Bruggeman et al. |
| 2016/0302706 A1 | 10/2016 | Richards et al. |
| 2016/0311116 A1* | 10/2016 | Hill .................. B25J 9/1666 |
| 2016/0313739 A1 | 10/2016 | Mian |
| 2016/0325143 A1 | 11/2016 | Yuen et al. |
| 2016/0332748 A1 | 11/2016 | Wang |
| 2016/0375592 A1 | 12/2016 | Szatmary et al. |
| 2016/0375779 A1 | 12/2016 | Wang |
| 2016/0377381 A1 | 12/2016 | Lyren |
| 2016/0377508 A1 | 12/2016 | Perrone et al. |
| 2016/0378111 A1 | 12/2016 | Lenser et al. |
| 2016/0378117 A1 | 12/2016 | Szatmary et al. |
| 2016/0378861 A1 | 12/2016 | Eledath et al. |
| 2016/0379074 A1 | 12/2016 | Nielsen et al. |
| 2017/0011210 A1 | 1/2017 | Cheong et al. |
| 2017/0021497 A1 | 1/2017 | Tseng et al. |
| 2017/0021502 A1 | 1/2017 | Nusser et al. |
| 2017/0027523 A1 | 2/2017 | Venkatraman et al. |
| 2017/0031369 A1 | 2/2017 | Liu et al. |
| 2017/0038579 A1 | 2/2017 | Yeoh et al. |
| 2017/0039764 A1 | 2/2017 | Hu et al. |
| 2017/0039859 A1 | 2/2017 | Hu et al. |
| 2017/0045893 A1 | 2/2017 | Goulding |
| 2017/0045894 A1 | 2/2017 | Canoy et al. |
| 2017/0069214 A1 | 3/2017 | Dupray et al. |
| 2017/0075116 A1 | 3/2017 | Gardiner |
| 2017/0084983 A1 | 3/2017 | Baringer et al. |
| 2017/0086698 A1 | 3/2017 | Wu |
| 2017/0087301 A1 | 3/2017 | Wu |
| 2017/0087381 A1 | 3/2017 | Balakin |
| 2017/0090478 A1 | 3/2017 | Blayvas et al. |
| 2017/0097506 A1 | 4/2017 | Schowengerdt et al. |
| 2017/0097507 A1 | 4/2017 | Yeoh et al. |
| 2017/0100837 A1 | 4/2017 | Zevenbergen et al. |
| 2017/0102711 A1 | 4/2017 | Watts |
| 2017/0105592 A1 | 4/2017 | Fong et al. |
| 2017/0108871 A1 | 4/2017 | Watts |
| 2017/0111223 A1 | 4/2017 | Matni et al. |
| 2017/0112392 A1 | 4/2017 | Wu |
| 2017/0112407 A1 | 4/2017 | Wu |
| 2017/0113352 A1 | 4/2017 | Lutz et al. |
| 2017/0116477 A1 | 4/2017 | Chen et al. |
| 2017/0127652 A1 | 5/2017 | Shen et al. |
| 2017/0129603 A1 | 5/2017 | Raptopoulos et al. |
| 2017/0132931 A1 | 5/2017 | Hoffberg |
| 2017/0148213 A1 | 5/2017 | Thomas et al. |
| 2017/0160398 A1 | 6/2017 | Venkatraman et al. |
| 2017/0165841 A1 | 6/2017 | Kamoi |
| 2017/0169713 A1 | 6/2017 | Gong et al. |
| 2017/0182657 A1 | 6/2017 | Rose et al. |
| 2017/0182664 A1 | 6/2017 | Watts |
| 2017/0188864 A1 | 7/2017 | Drury |
| 2017/0188893 A1 | 7/2017 | Venkatraman et al. |
| 2017/0203446 A1 | 7/2017 | Dooley et al. |
| 2017/0212511 A1 | 7/2017 | Paiva Ferreira et al. |
| 2017/0215086 A1 | 7/2017 | Priest |
| 2017/0215381 A1 | 8/2017 | Shen et al. |
| 2017/0223034 A1 | 8/2017 | Singh et al. |
| 2017/0223037 A1 | 8/2017 | Singh et al. |
| 2017/0223046 A1 | 8/2017 | Singh |
| 2017/0225321 A1 | 8/2017 | Deyle et al. |
| 2017/0225332 A1 | 8/2017 | Deyle et al. |
| 2017/0225334 A1 | 8/2017 | Deyle et al. |
| 2017/0225336 A1 | 8/2017 | Deyle et al. |
| 2017/0227965 A1 | 8/2017 | Decenzo et al. |
| 2017/0232615 A1 | 8/2017 | Hammock |
| 2017/0235316 A1 | 8/2017 | Shattil |
| 2017/0239719 A1 | 8/2017 | Buller et al. |
| 2017/0239720 A1 | 8/2017 | Levin et al. |
| 2017/0239721 A1 | 8/2017 | Buller et al. |
| 2017/0239752 A1 | 8/2017 | Buller et al. |
| 2017/0239891 A1 | 8/2017 | Buller et al. |
| 2017/0239892 A1 | 8/2017 | Buller et al. |
| 2017/0248966 A1 | 8/2017 | Lutz et al. |
| 2017/0257162 A1 | 9/2017 | Panther et al. |
| 2017/0257778 A1 | 9/2017 | Priest |
| 2017/0270361 A1 | 9/2017 | Puttagunta et al. |
| 2017/0277193 A1 | 9/2017 | Frazzoli et al. |
| 2017/0277194 A1 | 9/2017 | Frazzoli et al. |
| 2017/0277195 A1 | 9/2017 | Frazzoli et al. |
| 2017/0287337 A1 | 10/2017 | Chen et al. |
| 2017/0291093 A1 | 10/2017 | Janssen |
| 2017/0300540 A1 | 10/2017 | Karpistsenko et al. |
| 2017/0305015 A1 | 10/2017 | Krasny et al. |
| 2017/0309069 A1 | 10/2017 | Thomas et al. |

(56) References Cited

U.S. PATENT DOCUMENTS

| | | |
|---|---|---|
| 2017/0318360 A1 | 11/2017 | Tran et al. |
| 2017/0318477 A1 | 11/2017 | Priest |
| 2017/0323563 A1 | 11/2017 | Pundurs |
| 2017/0329347 A1 | 11/2017 | Passot et al. |
| 2017/0337826 A1 | 11/2017 | Moran et al. |
| 2017/0341231 A1 | 11/2017 | Tan et al. |
| 2017/0343695 A1 | 11/2017 | Stetson et al. |
| 2017/0352192 A1 | 12/2017 | Petrovskaya et al. |
| 2017/0357270 A1 | 12/2017 | Russell |
| 2017/0366751 A1 | 12/2017 | Terry et al. |
| 2017/0368684 A1 | 12/2017 | Zevenbergen et al. |
| 2017/0372618 A1 | 12/2017 | Xu et al. |
| 2018/0001476 A1 | 1/2018 | Tan et al. |
| 2018/0004213 A1 | 1/2018 | Absmeier et al. |
| 2018/0009059 A1 | 1/2018 | Aoki |
| 2018/0015347 A1 | 1/2018 | Janssen |
| 2018/0021097 A1 | 1/2018 | Quaid et al. |
| 2018/0032949 A1 | 2/2018 | Galluzzo et al. |
| 2018/0039287 A1 | 2/2018 | Shattil |
| 2018/0041907 A1 | 2/2018 | Terry et al. |
| 2018/0042526 A1 | 2/2018 | Hong et al. |
| 2018/0043547 A1 | 2/2018 | Hance et al. |
| 2018/0048876 A1 | 2/2018 | Gay et al. |
| 2018/0052276 A1 | 2/2018 | Klienman et al. |
| 2018/0052277 A1 | 2/2018 | Schowengerdt et al. |
| 2018/0052320 A1 | 2/2018 | Curtis et al. |
| 2018/0052451 A1 | 2/2018 | Billi-Duran et al. |
| 2018/0052501 A1 | 2/2018 | Jones, Jr. et al. |
| 2018/0055312 A1 | 3/2018 | Jung |
| 2018/0055326 A1 | 3/2018 | Jung |
| 2018/0059297 A1 | 3/2018 | Peroz et al. |
| 2018/0059304 A1 | 3/2018 | Bhargava et al. |
| 2018/0059672 A1 | 3/2018 | Li et al. |
| 2018/0060764 A1 | 3/2018 | Hance et al. |
| 2018/0060765 A1 | 3/2018 | Hance et al. |
| 2018/0061137 A1 | 3/2018 | Jung |
| 2018/0061243 A1 | 3/2018 | Shloosh |
| 2018/0068255 A1 | 3/2018 | Hance et al. |
| 2018/0068358 A1 | 3/2018 | Hoffberg |
| 2018/0068567 A1 | 3/2018 | Gong et al. |
| 2018/0071949 A1 | 3/2018 | Giles |
| 2018/0075302 A1 | 3/2018 | Udell et al. |
| 2018/0075649 A1 | 3/2018 | Godwin et al. |
| 2018/0077902 A1 | 3/2018 | Shen et al. |
| 2018/0081439 A1 | 3/2018 | Daniels |
| 2018/0082308 A1 | 3/2018 | Gong et al. |
| 2018/0084242 A1 | 3/2018 | Rublee et al. |
| 2018/0085616 A1 | 3/2018 | Makiyama et al. |
| 2018/0085914 A1* | 3/2018 | Kuffner, Jr. ........ G05B 19/4187 |
| 2018/0091791 A1 | 3/2018 | Jiang et al. |
| 2018/0091869 A1 | 3/2018 | Krishna et al. |
| 2018/0096495 A1 | 4/2018 | Jiang et al. |
| 2018/0104829 A1 | 4/2018 | Altman et al. |
| 2018/0109223 A1 | 4/2018 | Panas et al. |
| 2018/0113468 A1 | 4/2018 | Russell |
| 2018/0116898 A1 | 5/2018 | Morbi et al. |
| 2018/0119534 A1 | 5/2018 | Jamison et al. |
| 2018/0120856 A1 | 5/2018 | Gabardos et al. |
| 2018/0123291 A1 | 5/2018 | Brandwijk |
| 2018/0126460 A1 | 5/2018 | Murphree et al. |
| 2018/0126461 A1 | 5/2018 | Buller et al. |
| 2018/0126462 A1 | 5/2018 | Murphree et al. |
| 2018/0126649 A1 | 5/2018 | Romano et al. |
| 2018/0126650 A1 | 5/2018 | Murphree et al. |
| 2018/0133801 A1 | 5/2018 | Buller et al. |
| 2018/0139364 A1 | 5/2018 | Jannard |
| 2018/0144558 A1 | 5/2018 | Priest |
| 2018/0153084 A1 | 6/2018 | Calleija et al. |
| 2018/0157336 A1 | 6/2018 | Harris et al. |
| 2018/0158236 A1 | 6/2018 | Priest |
| 2018/0165974 A1 | 6/2018 | Bonkoski et al. |
| 2018/0170392 A1 | 6/2018 | Yang et al. |
| 2018/0172450 A1 | 6/2018 | Lalonde et al. |
| 2018/0173242 A1 | 6/2018 | Lalonde et al. |
| 2018/0174357 A1 | 6/2018 | Priest et al. |
| 2018/0178376 A1 | 6/2018 | Lalonde et al. |
| 2018/0178382 A1 | 6/2018 | Lalonde et al. |
| 2018/0178663 A9 | 6/2018 | Wang |
| 2018/0180421 A1 | 6/2018 | Holz |
| 2018/0186067 A1 | 7/2018 | Buller et al. |
| 2018/0186080 A1 | 7/2018 | Milshtein et al. |
| 2018/0186081 A1 | 7/2018 | Milshtein et al. |
| 2018/0186082 A1 | 7/2018 | Randhawa |
| 2018/0196404 A1* | 7/2018 | Stilwell ................ G05D 1/0295 |
| 2018/0204111 A1 | 7/2018 | Zadeh et al. |
| 2018/0207791 A1 | 7/2018 | Szatmary et al. |
| 2018/0211263 A1 | 7/2018 | Gong et al. |
| 2018/0211441 A1 | 7/2018 | Priest et al. |
| 2018/0215039 A1 | 8/2018 | Sinyavskiy et al. |
| 2018/0218619 A1 | 8/2018 | Brown et al. |
| 2018/0225597 A1 | 8/2018 | Hance et al. |
| 2018/0231972 A1 | 8/2018 | Woon et al. |
| 2018/0232668 A1 | 8/2018 | Hance et al. |
| 2018/0233054 A1 | 8/2018 | Woon et al. |
| 2018/0233856 A1 | 8/2018 | Brandwijk |
| 2018/0238164 A1 | 8/2018 | Jamison et al. |
| 2018/0249343 A1 | 8/2018 | Priest et al. |
| 2018/0251135 A1 | 9/2018 | Luo et al. |
| 2018/0251234 A1 | 9/2018 | Wang |
| 2018/0252535 A1 | 9/2018 | Bhimavarapu et al. |
| 2018/0255465 A1 | 9/2018 | Priest et al. |
| 2018/0259976 A1 | 9/2018 | Williams et al. |
| 2018/0261023 A1 | 9/2018 | Blayvas et al. |
| 2018/0263170 A1 | 9/2018 | Aghai et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0276891 A1 | 9/2018 | Craner |
| 2018/0278920 A1 | 9/2018 | Stefan |
| 2018/0281191 A1 | 10/2018 | Sinyavskiy et al. |
| 2018/0282065 A1 | 10/2018 | Wagner et al. |
| 2018/0282066 A1 | 10/2018 | Wagner et al. |
| 2018/0284735 A1 | 10/2018 | Cella et al. |
| 2018/0284736 A1 | 10/2018 | Cella et al. |
| 2018/0284737 A1 | 10/2018 | Cella et al. |
| 2018/0284741 A1 | 10/2018 | Cella et al. |
| 2018/0284742 A1 | 10/2018 | Cella et al. |
| 2018/0284743 A1 | 10/2018 | Cella et al. |
| 2018/0284744 A1 | 10/2018 | Cella et al. |
| 2018/0284745 A1 | 10/2018 | Cella et al. |
| 2018/0284746 A1 | 10/2018 | Cella et al. |
| 2018/0284747 A1 | 10/2018 | Cella et al. |
| 2018/0284749 A1 | 10/2018 | Cella et al. |
| 2018/0284752 A1 | 10/2018 | Cella et al. |
| 2018/0284753 A1 | 10/2018 | Cella et al. |
| 2018/0284754 A1 | 10/2018 | Cella et al. |
| 2018/0284755 A1 | 10/2018 | Cella et al. |
| 2018/0284756 A1 | 10/2018 | Cella et al. |
| 2018/0284757 A1 | 10/2018 | Cella et al. |
| 2018/0284758 A1 | 10/2018 | Cella et al. |
| 2018/0284786 A1 | 10/2018 | Moshkina-Martinson et al. |
| 2018/0285697 A1 | 10/2018 | Shotton et al. |
| 2018/0288303 A1 | 10/2018 | Wang et al. |
| 2018/0288586 A1 | 10/2018 | Tran et al. |
| 2018/0293536 A1 | 10/2018 | Galluzzo et al. |
| 2018/0296916 A1 | 10/2018 | Chung et al. |
| 2018/0299878 A1 | 10/2018 | Cella et al. |
| 2018/0299882 A1 | 10/2018 | Kichkaylo |
| 2018/0300835 A1 | 10/2018 | Saboo et al. |
| 2018/0304461 A1 | 10/2018 | Shaw |
| 2018/0304468 A1 | 10/2018 | Holz |
| 2018/0306587 A1 | 10/2018 | Holz |
| 2018/0306589 A1 | 10/2018 | Holz |
| 2018/0306591 A1 | 10/2018 | Jose et al. |
| 2018/0307241 A1 | 10/2018 | Holz |
| 2018/0307941 A1 | 10/2018 | Holz et al. |
| 2018/0311822 A1 | 11/2018 | Kaminka et al. |
| 2018/0312824 A1 | 11/2018 | Zhang et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2018/0322197 A1 | 11/2018 | Hesterman |
| 2018/0322779 A1 | 11/2018 | Pundurs |
| 2018/0329425 A1 | 11/2018 | Watts |

(56) References Cited

U.S. PATENT DOCUMENTS

| | | |
|---|---|---|
| 2018/0330293 A1 | 11/2018 | Kulkarni et al. |
| 2018/0335502 A1 | 11/2018 | Lowe et al. |
| 2018/0348761 A1 | 12/2018 | Zhu et al. |
| 2018/0348764 A1 | 12/2018 | Zhang et al. |
| 2018/0361586 A1 | 12/2018 | Tan et al. |
| 2018/0362158 A1 | 12/2018 | Zhang et al. |
| 2018/0362190 A1 | 12/2018 | Chambers et al. |
| 2018/0364724 A1 | 12/2018 | Ibarz Gabardos et al. |
| 2018/0365603 A1 | 12/2018 | Hance et al. |
| 2018/0370046 A1 | 12/2018 | Hance et al. |
| 2018/0373320 A1 | 12/2018 | Petrovskaya et al. |
| 2018/0374266 A1 | 12/2018 | Schowengerdt et al. |
| 2019/0001492 A1 | 1/2019 | Rose et al. |
| 2019/0011921 A1 | 1/2019 | Wang et al. |
| 2019/0011932 A1 | 1/2019 | McGrath |
| 2019/0015167 A1 | 1/2019 | Draelos et al. |
| 2019/0020530 A1 | 1/2019 | Au et al. |
| 2019/0023438 A1 | 1/2019 | Akdogan et al. |
| 2019/0025805 A1 | 1/2019 | Cella et al. |
| 2019/0025806 A1 | 1/2019 | Cella et al. |
| 2019/0025812 A1 | 1/2019 | Cella et al. |
| 2019/0025813 A1 | 1/2019 | Cella et al. |
| 2019/0033845 A1 | 1/2019 | Cella et al. |
| 2019/0033846 A1 | 1/2019 | Cella et al. |
| 2019/0033847 A1 | 1/2019 | Cella et al. |
| 2019/0033848 A1 | 1/2019 | Cella et al. |
| 2019/0033849 A1 | 1/2019 | Cella et al. |
| 2019/0033888 A1 | 1/2019 | Bosworth et al. |
| 2019/0034728 A1 | 1/2019 | Puttagunta et al. |
| 2019/0034729 A1 | 1/2019 | Puttagunta et al. |
| 2019/0034730 A1 | 1/2019 | Puttagunta et al. |
| 2019/0034839 A1 | 1/2019 | Hance et al. |
| 2019/0041223 A1 | 2/2019 | Yang et al. |
| 2019/0041835 A1 | 2/2019 | Cella et al. |
| 2019/0041836 A1 | 2/2019 | Cella et al. |
| 2019/0041840 A1 | 2/2019 | Cella et al. |
| 2019/0041841 A1 | 2/2019 | Cella et al. |
| 2019/0041842 A1 | 2/2019 | Cella et al. |
| 2019/0041843 A1 | 2/2019 | Cella et al. |
| 2019/0041844 A1 | 2/2019 | Cella et al. |
| 2019/0041845 A1 | 2/2019 | Cella et al. |
| 2019/0041846 A1 | 2/2019 | Cella et al. |
| 2019/0041852 A1 | 2/2019 | Schubert et al. |
| 2019/0049968 A1 | 2/2019 | Dean et al. |
| 2019/0051054 A1 | 2/2019 | Jovanovic et al. |
| 2019/0051178 A1 | 2/2019 | Priev |
| 2019/0051198 A1 | 2/2019 | Nimmagadda et al. |
| 2019/0056693 A1 | 2/2019 | Gelman et al. |
| 2019/0060741 A1 | 2/2019 | Contreras |
| 2019/0064791 A1 | 2/2019 | Cella et al. |
| 2019/0064792 A1 | 2/2019 | Cella et al. |
| 2019/0073760 A1 | 3/2019 | Wang et al. |
| 2019/0077510 A1 | 3/2019 | Panas et al. |
| 2019/0079509 A1 | 3/2019 | Bosworth |
| 2019/0079523 A1 | 3/2019 | Zhu et al. |
| 2019/0079524 A1 | 3/2019 | Zhu et al. |
| 2019/0079526 A1 | 3/2019 | Vallespi-Gonzalez et al. |
| 2019/0079528 A1 | 3/2019 | Zhu et al. |
| 2019/0080266 A1 | 3/2019 | Zhu et al. |
| 2019/0080515 A1 | 3/2019 | Geri et al. |
| 2019/0080516 A1 | 3/2019 | Petrovskaya et al. |
| 2019/0082985 A1 | 3/2019 | Hong et al. |
| 2019/0086919 A1 | 3/2019 | Zhang et al. |
| 2019/0086925 A1 | 3/2019 | Fan et al. |
| 2019/0086930 A1 | 3/2019 | Fan et al. |
| 2019/0086932 A1 | 3/2019 | Fan et al. |
| 2019/0086934 A1 | 3/2019 | Canoso et al. |
| 2019/0086938 A1 | 3/2019 | Shattil |
| 2019/0088133 A1 | 3/2019 | Alieiev et al. |
| 2019/0088162 A1 | 3/2019 | Meglan |
| 2019/0089760 A1 | 3/2019 | Zhang et al. |
| 2019/0092179 A1 | 3/2019 | Kwa et al. |
| 2019/0092183 A1 | 3/2019 | Sussman et al. |
| 2019/0092184 A1 | 3/2019 | Sussman et al. |
| 2019/0094870 A1 | 3/2019 | Afrouzi et al. |
| 2019/0094981 A1 | 3/2019 | Bradski et al. |
| 2019/0097443 A1 | 3/2019 | Kwa et al. |
| 2019/0100196 A1 | 4/2019 | Ueda et al. |
| 2019/0101394 A1 | 4/2019 | van der Meijden et al. |
| 2019/0104919 A1 | 4/2019 | Shelton et al. |
| 2019/0105200 A1 | 4/2019 | Hipsley |
| 2019/0107845 A1 | 4/2019 | Kaine |
| 2019/0113351 A1 | 4/2019 | Antony |
| 2019/0113918 A1 | 4/2019 | Englard et al. |
| 2019/0113919 A1 | 4/2019 | Englard et al. |
| 2019/0113920 A1 | 4/2019 | Englard et al. |
| 2019/0113927 A1 | 4/2019 | Englard et al. |
| 2019/0116758 A1 | 4/2019 | Shen et al. |
| 2019/0118104 A1 | 4/2019 | Su |
| 2019/0120639 A1 | 4/2019 | Song et al. |
| 2019/0120967 A1 | 4/2019 | Smits |
| 2019/0121333 A1 | 4/2019 | Cella et al. |
| 2019/0121338 A1 | 4/2019 | Cella et al. |
| 2019/0121339 A1 | 4/2019 | Cella et al. |
| 2019/0121340 A1 | 4/2019 | Cella et al. |
| 2019/0121341 A1 | 4/2019 | Cella et al. |
| 2019/0121342 A1 | 4/2019 | Cella et al. |
| 2019/0121343 A1 | 4/2019 | Cella et al. |
| 2019/0121344 A1 | 4/2019 | Cella et al. |
| 2019/0121345 A1 | 4/2019 | Cella et al. |
| 2019/0121346 A1 | 4/2019 | Cella et al. |
| 2019/0121347 A1 | 4/2019 | Cella et al. |
| 2019/0121348 A1 | 4/2019 | Cella et al. |
| 2019/0121349 A1 | 4/2019 | Cella et al. |
| 2019/0121350 A1 | 4/2019 | Cella et al. |
| 2019/0121365 A1 | 4/2019 | Passot et al. |
| 2019/0125126 A1 | 5/2019 | Cohen |
| 2019/0125361 A1 | 5/2019 | Shelton et al. |
| 2019/0125454 A1 | 5/2019 | Stokes et al. |
| 2019/0125455 A1 | 5/2019 | Shelton et al. |
| 2019/0125456 A1 | 5/2019 | Shelton et al. |
| 2019/0125457 A1 | 5/2019 | Parihar et al. |
| 2019/0125458 A1 | 5/2019 | Shelton et al. |
| 2019/0125459 A1 | 5/2019 | Shelton et al. |
| 2019/0128390 A1 | 5/2019 | Williams |
| 2019/0129404 A1 | 5/2019 | Cella et al. |
| 2019/0129405 A1 | 5/2019 | Cella et al. |
| 2019/0129406 A1 | 5/2019 | Cella et al. |
| 2019/0129407 A1 | 5/2019 | Cella et al. |
| 2019/0129408 A1 | 5/2019 | Cella et al. |
| 2019/0129409 A1 | 5/2019 | Cella et al. |
| 2019/0129410 A1 | 5/2019 | Cella et al. |
| 2019/0130182 A1 | 5/2019 | Zang et al. |
| 2019/0130637 A1 | 5/2019 | Parmar et al. |
| 2019/0135296 A1 | 5/2019 | Hummelshoj |
| 2019/0137985 A1 | 5/2019 | Cella et al. |
| 2019/0137986 A1 | 5/2019 | Cella et al. |
| 2019/0137987 A1 | 5/2019 | Cella et al. |
| 2019/0137988 A1 | 5/2019 | Cella et al. |
| 2019/0137989 A1 | 5/2019 | Cella et al. |
| 2019/0143412 A1 | 5/2019 | Buller et al. |
| 2019/0145239 A1 | 5/2019 | Yu et al. |
| 2019/0145765 A1 | 5/2019 | Luo et al. |
| 2019/0145784 A1 | 5/2019 | Ma et al. |
| 2019/0146451 A1 | 5/2019 | Bhatt et al. |
| 2019/0146472 A1 | 5/2019 | Cella et al. |
| 2019/0146473 A1 | 5/2019 | Cella et al. |
| 2019/0146474 A1 | 5/2019 | Cella et al. |
| 2019/0146475 A1 | 5/2019 | Cella et al. |
| 2019/0146476 A1 | 5/2019 | Cella et al. |
| 2019/0146477 A1 | 5/2019 | Cella et al. |
| 2019/0146478 A1 | 5/2019 | Cella et al. |
| 2019/0146479 A1 | 5/2019 | Cella et al. |
| 2019/0146480 A1 | 5/2019 | Cella et al. |
| 2019/0146481 A1 | 5/2019 | Cella et al. |
| 2019/0146482 A1 | 5/2019 | Cella et al. |
| 2019/0146515 A1 | 5/2019 | De Salvo et al. |
| 2019/0147253 A1 | 5/2019 | Bai et al. |
| 2019/0147254 A1 | 5/2019 | Bai et al. |
| 2019/0147255 A1 | 5/2019 | Homayounfar et al. |
| 2019/0147260 A1 | 5/2019 | May |
| 2019/0149725 A1* | 5/2019 | Adato .............. H04N 1/00 348/158 |
| 2019/0155263 A1 | 5/2019 | Cella et al. |

(56) References Cited

U.S. PATENT DOCUMENTS

| | | |
|---|---|---|
| 2019/0155272 A1 | 5/2019 | Cella et al. |
| 2019/0155295 A1 | 5/2019 | Moore et al. |
| 2019/0155296 A1 | 5/2019 | Moore et al. |
| 2019/0156128 A1 | 5/2019 | Zhang et al. |
| 2019/0159848 A1 | 5/2019 | Quaid et al. |
| 2019/0160675 A1 | 5/2019 | Paschall, II et al. |
| 2019/0161274 A1 | 5/2019 | Paschall et al. |
| 2019/0162575 A1 | 5/2019 | Cozzens et al. |
| 2019/0163206 A1 | 5/2019 | Zhu et al. |
| 2019/0164346 A1 | 5/2019 | Kim et al. |
| 2019/0170521 A1 | 6/2019 | Elhoushi et al. |
| 2019/0171187 A1 | 6/2019 | Cella et al. |
| 2019/0171912 A1 | 6/2019 | Vallespi-Gonzalez et al. |
| 2019/0176328 A1 | 6/2019 | Kichkaylo et al. |
| 2019/0176329 A1 | 6/2019 | Swilling |
| 2019/0178638 A1 | 6/2019 | Abovitz et al. |
| 2019/0179290 A1 | 6/2019 | Yoshida et al. |
| 2019/0179300 A1 | 6/2019 | Cella et al. |
| 2019/0179301 A1 | 6/2019 | Cella et al. |
| 2019/0179329 A1 | 6/2019 | Keivan et al. |
| 2019/0179976 A1 | 6/2019 | Stroila et al. |
| 2019/0180499 A1 | 6/2019 | Caulfield et al. |
| 2019/0187680 A1 | 6/2019 | Cella et al. |
| 2019/0187681 A1 | 6/2019 | Cella et al. |
| 2019/0187682 A1 | 6/2019 | Cella et al. |
| 2019/0187683 A1 | 6/2019 | Cella et al. |
| 2019/0187684 A1 | 6/2019 | Cella et al. |
| 2019/0187685 A1 | 6/2019 | Cella et al. |
| 2019/0187686 A1 | 6/2019 | Cella et al. |
| 2019/0187687 A1 | 6/2019 | Cella et al. |
| 2019/0187688 A1 | 6/2019 | Cella et al. |
| 2019/0187689 A1 | 6/2019 | Cella et al. |
| 2019/0187690 A1 | 6/2019 | Cella et al. |
| 2019/0187703 A1 | 6/2019 | Millard et al. |
| 2019/0187715 A1 | 6/2019 | Zhang et al. |
| 2019/0188632 A1 | 6/2019 | Galluzzo et al. |
| 2019/0188766 A1 | 6/2019 | Cho et al. |
| 2019/0188788 A1 | 6/2019 | Baker et al. |
| 2019/0188895 A1 | 6/2019 | Marshall et al. |
| 2019/0188913 A1 | 6/2019 | Cho et al. |
| 2019/0188917 A1 | 6/2019 | Cho et al. |
| 2019/0189160 A1 | 6/2019 | Huang |
| 2019/0191125 A1 | 6/2019 | Fink et al. |
| 2019/0193276 A1 | 6/2019 | Deyle et al. |
| 2019/0193629 A1 | 6/2019 | Zevenbergen et al. |
| 2019/0196472 A1 | 6/2019 | Korner et al. |
| 2019/0196480 A1 | 6/2019 | Taylor |
| 2019/0196485 A1 | 6/2019 | Li et al. |
| 2019/0197788 A1 | 6/2019 | Forbes et al. |
| 2019/0200844 A1 | 7/2019 | Shelton et al. |
| 2019/0200977 A1 | 7/2019 | Shelton et al. |
| 2019/0201037 A1 | 7/2019 | Houser et al. |
| 2019/0201038 A1 | 7/2019 | Yates et al. |
| 2019/0201040 A1 | 7/2019 | Messerly et al. |
| 2019/0201042 A1 | 7/2019 | Nott et al. |
| 2019/0201046 A1 | 7/2019 | Shelton et al. |
| 2019/0201127 A1 | 7/2019 | Shelton et al. |
| 2019/0201136 A1 | 7/2019 | Shelton et al. |
| 2019/0204201 A1 | 7/2019 | Shelton et al. |
| 2019/0206045 A1 | 7/2019 | Wang et al. |
| 2019/0206562 A1 | 7/2019 | Shelton et al. |
| 2019/0206565 A1 | 7/2019 | Shelton |
| 2019/0208979 A1* | 7/2019 | Bassa ............... G06V 30/19173 |
| 2019/0212106 A1 | 7/2019 | Bortz et al. |
| 2019/0212901 A1 | 7/2019 | Garrison et al. |
| 2019/0213212 A1 | 7/2019 | Adato et al. |
| 2019/0213390 A1 | 7/2019 | Adato et al. |
| 2019/0213418 A1 | 7/2019 | Adato et al. |
| 2019/0213421 A1 | 7/2019 | Adato et al. |
| 2019/0213441 A1 | 7/2019 | Adato et al. |
| 2019/0213523 A1 | 7/2019 | Adato et al. |
| 2019/0213534 A1 | 7/2019 | Adato et al. |
| 2019/0213535 A1 | 7/2019 | Adato et al. |
| 2019/0213545 A1 | 7/2019 | Adato et al. |
| 2019/0213546 A1 | 7/2019 | Adato et al. |
| 2019/0213752 A1 | 7/2019 | Adato et al. |
| 2019/0213755 A1 | 7/2019 | Bassa et al. |
| 2019/0215424 A1 | 7/2019 | Adato et al. |
| 2019/0219409 A1 | 7/2019 | Tan et al. |
| 2019/0219995 A1 | 7/2019 | Cella et al. |
| 2019/0219996 A1 | 7/2019 | Cella et al. |
| 2019/0220012 A1 | 7/2019 | Zhang et al. |
| 2019/0220863 A1 | 7/2019 | Novick et al. |
| 2019/0222986 A1 | 7/2019 | Aitken et al. |
| 2019/0223958 A1 | 7/2019 | Kohli et al. |
| 2019/0227536 A1 | 7/2019 | Cella et al. |
| 2019/0227537 A1 | 7/2019 | Cella et al. |
| 2019/0228266 A1 | 7/2019 | Habibian et al. |
| 2019/0228495 A1 | 7/2019 | Tremblay et al. |
| 2019/0228573 A1 | 7/2019 | Sen et al. |
| 2019/0228854 A1 | 7/2019 | Jain et al. |
| 2019/0229802 A1 | 7/2019 | Panther et al. |
| 2019/0231162 A1 | 8/2019 | Lu et al. |
| 2019/0231436 A1 | 8/2019 | Panse et al. |
| 2019/0232498 A1 | 8/2019 | Tan et al. |
| 2019/0232992 A1 | 8/2019 | Bondaryk et al. |
| 2019/0235486 A1 | 8/2019 | Way et al. |
| 2019/0235492 A1 | 8/2019 | Kueny et al. |
| 2019/0235498 A1 | 8/2019 | Li et al. |
| 2019/0235505 A1 | 8/2019 | Li et al. |
| 2019/0235512 A1 | 8/2019 | Sinyavskiy et al. |
| 2019/0235516 A1 | 8/2019 | Zhang et al. |
| 2019/0235531 A1 | 8/2019 | Liu et al. |
| 2019/0236399 A1 | 8/2019 | Soatto et al. |
| 2019/0236531 A1 | 8/2019 | Adato et al. |
| 2019/0236844 A1 | 8/2019 | Balasian et al. |
| 2019/0238638 A1 | 8/2019 | Way et al. |
| 2019/0240840 A1 | 8/2019 | Gorshechnikov et al. |
| 2019/0243370 A1 | 8/2019 | Li et al. |
| 2019/0247050 A1 | 8/2019 | Goldsmith |
| 2019/0247122 A1 | 8/2019 | D'Amelio et al. |
| 2019/0248002 A1 | 8/2019 | Deyle et al. |
| 2019/0248007 A1 | 8/2019 | Duffy et al. |
| 2019/0248013 A1 | 8/2019 | Deyle et al. |
| 2019/0248014 A1 | 8/2019 | Deyle et al. |
| 2019/0248016 A1 | 8/2019 | Deyle et al. |
| 2019/0250000 A1 | 8/2019 | Zhang et al. |
| 2019/0253580 A1 | 8/2019 | Kodimer |
| 2019/0253835 A1 | 8/2019 | Jones |
| 2019/0254753 A1 | 8/2019 | Johnson et al. |
| 2019/0254754 A1 | 8/2019 | Johnson et al. |
| 2019/0255434 A1 | 8/2019 | Wilson |
| 2019/0258251 A1 | 8/2019 | Ditty et al. |
| 2019/0258878 A1 | 8/2019 | Koivisto et al. |
| 2019/0261565 A1 | 8/2019 | Robertson et al. |
| 2019/0261566 A1 | 8/2019 | Robertson et al. |
| 2019/0265366 A1 | 8/2019 | Venkatraman et al. |
| 2019/0265705 A1 | 8/2019 | Zhang et al. |
| 2019/0266418 A1 | 8/2019 | Xu et al. |
| 2019/0269353 A1 | 9/2019 | Venkatraman et al. |
| 2019/0270197 A1 | 9/2019 | Wagner et al. |
| 2019/0272348 A1 | 9/2019 | Booij et al. |
| 2019/0274716 A1 | 9/2019 | Nott et al. |
| 2019/0277869 A1 | 9/2019 | Stein et al. |
| 2019/0277962 A1 | 9/2019 | Ingram et al. |
| 2019/0278276 A1 | 9/2019 | Zhang et al. |
| 2019/0278284 A1 | 9/2019 | Zhang et al. |
| 2019/0278290 A1 | 9/2019 | Zhang et al. |
| 2019/0369641 A1* | 12/2019 | Gillett ............... G05D 1/0027 |

OTHER PUBLICATIONS

U.S. Appl. No. 10/001,780, filed Jun. 19, 2018, Gabardos et al.
U.S. Appl. No. 10/002,442, filed Jun. 19, 2018, Dagley et al.
U.S. Appl. No. 10/002,471, filed Jun. 19, 2018, Blayvas et al.
U.S. Appl. No. 10/002,537, filed Jun. 19, 2018, Chen et al.
U.S. Appl. No. 10/008,045, filed Jun. 26, 2018, Dagley et al.
U.S. Appl. No. 10/011,012, filed Jul. 3, 2018, Krasny et al.
U.S. Appl. No. 10/012,996, filed Jul. 3, 2018, Canoso et al.
U.S. Appl. No. 10/013,610, filed Jul. 3, 2018, Chen et al.
U.S. Appl. No. 10/015,466, filed Jul. 3, 2018, Maruyama et al.
U.S. Appl. No. 10/022,867, filed Jul. 17, 2018, Saboo et al.
U.S. Appl. No. 10/023,393, filed Jul. 17, 2018, Brazeau et al.

(56) References Cited

OTHER PUBLICATIONS

U.S. Appl. No. 10/025,886, filed Jul. 17, 2018, Rublee et al.
U.S. Appl. No. 10/026,209, filed Jul. 17, 2018, Dagley et al.
U.S. Appl. No. 10/030,988, filed Jul. 24, 2018, Brush et al.
U.S. Appl. No. 10/034,066, filed Jul. 24, 2018, Tran et al.
U.S. Appl. No. 10/048,683, filed Aug. 14, 2018, Levinson et al.
U.S. Appl. No. 10/051,411, filed Aug. 14, 2018, Breed.
U.S. Appl. No. 10/052,765, filed Aug. 21, 2018, Kamoi et al.
U.S. Appl. No. 10/059,467, filed Aug. 28, 2018, Wang.
U.S. Appl. No. 10/061,325, filed Aug. 28, 2018, Watts.
U.S. Appl. No. 10/061,328, filed Aug. 28, 2018, Canoy et al.
U.S. Appl. No. 10/062,177, filed Aug. 28, 2018, Dagley et al.
U.S. Appl. No. 10/065,309, filed Sep. 4, 2018, Rose et al.
U.S. Appl. No. 10/065,317, filed Sep. 4, 2018, Tan et al.
U.S. Appl. No. 10/068,470, filed Sep. 4, 2018, Pundurs.
U.S. Appl. No. 10/070,974, filed Sep. 11, 2018, Herr et al.
U.S. Appl. No. 10/078,136, filed Sep. 18, 2018, Kimchi et al.
U.S. Appl. No. 10/078,921, filed Sep. 18, 2018, Dagley et al.
U.S. Appl. No. 10/080,672, filed Sep. 25, 2018, Casler et al.
U.S. Appl. No. 10/081,104, filed Sep. 25, 2018, Swilling.
U.S. Appl. No. 10/082,397, filed Sep. 25, 2018, Sidhu et al.
U.S. Appl. No. 10/083,406, filed Sep. 25, 2018, Hance et al.
U.S. Appl. No. 10/099,391, filed Oct. 16, 2018, Hance et al.
U.S. Appl. No. 10/105,244, filed Oct. 23, 2018, Herr et al.
U.S. Appl. No. 10/106,283, filed Oct. 23, 2018, Akdogan et al.
U.S. Appl. No. 10/108,194, filed Oct. 23, 2018, Russell.
U.S. Appl. No. 10/122,995, filed Nov. 6, 2018, Rublee et al.
U.S. Appl. No. 10/123,181, filed Nov. 6, 2018, Huang et al.
U.S. Appl. No. 10/126,136, filed Nov. 13, 2018, Iagnemma.
U.S. Appl. No. 10/126,757, filed Nov. 13, 2018, Goulding.
U.S. Appl. No. 10/127,816, filed Nov. 13, 2018, Hoffberg.
U.S. Appl. No. 10/133,990, filed Nov. 20, 2018, Hance et al.
U.S. Appl. No. 10/137,011, filed Nov. 27, 2018, Herr et al.
U.S. Appl. No. 10/144,591, filed Dec. 4, 2018, Brazeau et al.
U.S. Appl. No. 10/147,069, filed Dec. 4, 2018, Galluzzo et al.
U.S. Appl. No. 10/153,537, filed Dec. 11, 2018, Baringer et al.
U.S. Appl. No. 10/159,218, filed Dec. 25, 2018, Shen et al.
U.S. Appl. No. 10/162,353, filed Dec. 25, 2018, Hammond et al.
U.S. Appl. No. 10/162,355, filed Dec. 25, 2018, Hayon et al.
U.S. Appl. No. 10/168,704, filed Jan. 1, 2019, Zhang et al.
U.S. Appl. No. 10/172,409, filed Jan. 8, 2019, Andon.
U.S. Appl. No. 10/178,445, filed Jan. 8, 2019, Lubranski et al.
U.S. Appl. No. 10/178,973, filed Jan. 15, 2019, Venkatraman et al.
U.S. Appl. No. 10/188,472, filed Jan. 29, 2019, Diolaiti et al.
U.S. Appl. No. 10/191,495, filed Jan. 29, 2019, Bobda.
U.S. Appl. No. 10/192,113, filed Jan. 29, 2019, Liu et al.
U.S. Appl. No. 10/194,836, filed Feb. 5, 2019, Venkatraman et al.
U.S. Appl. No. 10/194,858, filed Feb. 5, 2019, Marquez Chin et al.
U.S. Appl. No. 10/203,762, filed Feb. 12, 2019, Bradski et al.
U.S. Appl. No. 10/207,404, filed Feb. 19, 2019, Khansari Zadeh.
U.S. Appl. No. 10/209,365, filed Feb. 19, 2019, Venkatraman et al.
U.S. Appl. No. 10/212,876, filed Feb. 26, 2019, Aghai et al.
U.S. Appl. No. 10/216,195, filed Feb. 26, 2019, Switkes et al.
U.S. Appl. No. 10/217,488, filed Feb. 26, 2019, Huang.
U.S. Appl. No. 10/218,433, filed Feb. 26, 2019, Panther et al.
U.S. Appl. No. 10/222,215, filed Mar. 5, 2019, Holz.
U.S. Appl. No. 10/225,025, filed Mar. 5, 2019, Henry et al.
U.S. Appl. No. 10/228,242, filed Mar. 12, 2019, Abovitz et al.
U.S. Appl. No. 10/230,745, filed Mar. 12, 2019, Singh et al.
U.S. Appl. No. 10/231,790, filed Mar. 19, 2019, Quaid et al.
U.S. Appl. No. 10/239,208, filed Mar. 26, 2019, Swilling.
U.S. Appl. No. 10/239,740, filed Mar. 26, 2019, McHale et al.
U.S. Appl. No. 10/243,379, filed Mar. 26, 2019, Kwa et al.
U.S. Appl. No. 10/248,119, filed Apr. 2, 2019, Kentley-Klay et al.
U.S. Appl. No. 10/251,805, filed Apr. 9, 2019, Morbi et al.
U.S. Appl. No. 10/252,335, filed Apr. 9, 2019, Buller et al.
U.S. Appl. No. 10/254,499, filed Apr. 9, 2019, Cohen et al.
U.S. Appl. No. 10/254,536, filed Apr. 9, 2019, Yeoh et al.
U.S. Appl. No. 10/255,719, filed Apr. 9, 2019, Priest.
U.S. Appl. No. 10/255,723, filed Apr. 9, 2019, Thomas et al.
U.S. Appl. No. 10/259,514, filed Apr. 16, 2019, Kentley-Klay.
U.S. Appl. No. 10/260,890, filed Apr. 16, 2019, Jose et al.
U.S. Appl. No. 10/262,213, filed Apr. 16, 2019, Chen et al.
U.S. Appl. No. 10/262,437, filed Apr. 16, 2019, Ter Beest III.
U.S. Appl. No. 10/264,586, filed Apr. 16, 2019, Beattie Jr. et al.
U.S. Appl. No. 10/265,859, filed Apr. 23, 2019, Deyle et al.
U.S. Appl. No. 10/265,871, filed Apr. 23, 2019, Hance et al.
U.S. Appl. No. 10/267,970, filed Apr. 23, 2019, Jones Jr. et al.
U.S. Appl. No. 10/269,108, filed Apr. 23, 2019, Wang et al.
U.S. Appl. No. 10/270,789, filed Apr. 23, 2019, Singh.
U.S. Appl. No. 10/277,885, filed Apr. 30, 2019, Jannard et al.
U.S. Appl. No. 10/279,906, filed May 7, 2019, Levien et al.
U.S. Appl. No. 10/283,110, filed May 7, 2019, Bellegarda.
U.S. Appl. No. 10/285,828, filed May 14, 2019, Herr et al.
U.S. Appl. No. 10/288,419, filed May 14, 2019, Abovitz et al.
U.S. Appl. No. 10/290,049, filed May 14, 2019, Xu et al.
U.S. Appl. No. 10/291,334, filed May 14, 2019, Henry et al.
U.S. Appl. No. 10/293,485, filed May 21, 2019, Sinyavskiy et al.
U.S. Appl. No. 10/295,338, filed May 21, 2019, Abovitz et al.
U.S. Appl. No. 10/296,012, filed May 21, 2019, Lalonde et al.
U.S. Appl. No. 10/296,080, filed May 21, 2019, Ord et al.
U.S. Appl. No. 10/296,995, filed May 21, 2019, Saboo et al.
U.S. Appl. No. 10/300,601, filed May 28, 2019, Tan et al.
U.S. Appl. No. 10/300,603, filed May 28, 2019, Gorshechnikov et al.
U.S. Appl. No. 10/303,166, filed May 28, 2019, Iagnemma.
U.S. Appl. No. 10/303,174, filed May 28, 2019, Kentley-Klay et al.
U.S. Appl. No. 10/304,254, filed May 28, 2019, Jovanovic et al.
U.S. Appl. No. 10/307,199, filed Jun. 4, 2019, Farritor et al.
U.S. Appl. No. 10/307,272, filed Jun. 4, 2019, Herr et al.
U.S. Appl. No. 10/309,792, filed Jun. 4, 2019, Iagnemma.
U.S. Appl. No. 10/310,517, filed Jun. 4, 2019, Paduano et al.
U.S. Appl. No. 10/311,731, filed Jun. 4, 2019, Li et al.
U.S. Appl. No. 10/320,610, filed Jun. 11, 2019, Matni et al.
U.S. Appl. No. 10/325,411, filed Jun. 18, 2019, Laney et al.
U.S. Appl. No. 10/326,689, filed Jun. 18, 2019, Liu et al.
U.S. Appl. No. 10/327,674, filed Jun. 25, 2019, Hong et al.
U.S. Appl. No. 10/328,575, filed Jun. 25, 2019, Garcia et al.
U.S. Appl. No. 10/328,578, filed Jun. 25, 2019, Holz.
U.S. Appl. No. 10/330,440, filed Jun. 25, 2019, Lyren.
U.S. Appl. No. 10/331,129, filed Jun. 25, 2019, Iagnemma et al.
U.S. Appl. No. 10/332,245, filed Jun. 25, 2019, Price et al.
U.S. Appl. No. 10/334,050, filed Jun. 25, 2019, Kentley-Klay et al.
U.S. Appl. No. 10/334,164, filed Jun. 25, 2019, Terry et al.
U.S. Appl. No. 10/334,906, filed Jul. 2, 2019, Andon et al.
U.S. Appl. No. 10/335,004, filed Jul. 2, 2019, Fong et al.
U.S. Appl. No. 10/336,543, filed Jul. 2, 2019, Sills et al.
U.S. Appl. No. 10/338,391, filed Jul. 2, 2019, Yeoh et al.
U.S. Appl. No. 10/338,594, filed Jul. 2, 2019, Long.
U.S. Appl. No. 10/339,721, filed Jul. 2, 2019, Dascola et al.
U.S. Appl. No. 10/352,693, filed Jul. 16, 2019, Abovitz et al.
U.S. Appl. No. 10/353,388, filed Jul. 16, 2019, Schubert et al.
U.S. Appl. No. 10/353,532, filed Jul. 16, 2019, Holz et al.
U.S. Appl. No. 10/354,441, filed Jul. 16, 2019, Godwin et al.
U.S. Appl. No. 10/358,057, filed Jul. 23, 2019, Breed.
U.S. Appl. No. 10/359,783, filed Jul. 23, 2019, Williams et al.
U.S. Appl. No. 10/360,799, filed Jul. 23, 2019, Priev.
U.S. Appl. No. 10/362,057, filed Jul. 23, 2019, Wu.
U.S. Appl. No. 10/363,657, filed Jul. 30, 2019, Lalonde et al.
U.S. Appl. No. 10/363,826, filed Jul. 30, 2019, Wang.
U.S. Appl. No. 10/365,656, filed Jul. 30, 2019, Moore et al.
U.S. Appl. No. 10/365,716, filed Jul. 30, 2019, Aimone et al.
U.S. Appl. No. 10/366,289, filed Jul. 30, 2019, Puttagunta et al.
U.S. Appl. No. 10/366,508, filed Jul. 30, 2019, Liu et al.
U.S. Appl. No. 10/366,510, filed Jul. 30, 2019, Malti et al.
U.S. Appl. No. 10/368,249, filed Jul. 30, 2019, Priest.
U.S. Appl. No. 10/368,784, filed Aug. 6, 2019, Marlow et al.
U.S. Appl. No. 10/369,974, filed Aug. 6, 2019, Carlson et al.
U.S. Appl. No. 10/372,132, filed Aug. 6, 2019, Herz et al.
U.S. Appl. No. 10/372,721, filed Aug. 6, 2019, Karpistsenko et al.
U.S. Appl. No. 10/373,389, filed Aug. 6, 2019, Jung.
U.S. Appl. No. 10/375,289, filed Aug. 6, 2019, Wang et al.
U.S. Appl. No. 10/375,517, filed Aug. 6, 2019, Shen et al.

(56) References Cited

OTHER PUBLICATIONS

U.S. Appl. No. 10/377,040, filed Aug. 13, 2019, Sinyavskiy et al.
U.S. Appl. No. 10/377,375, filed Aug. 13, 2019, Jones et al.
U.S. Appl. No. 10/379,007, filed Aug. 13, 2019, Perrone et al.
U.S. Appl. No. 10/379,539, filed Aug. 13, 2019, Ibarz Gabardos et al.
U.S. Appl. No. 10/382,889, filed Aug. 13, 2019, Ajmeri et al.
U.S. Appl. No. 10/382,975, filed Aug. 13, 2019, Priest.
U.S. Appl. No. 10/384,351, filed Aug. 20, 2019, Deyle et al.
U.S. Appl. No. 10/386,857, filed Aug. 20, 2019, McGrath.
U.S. Appl. No. 10/389,037, filed Aug. 20, 2019, Johnson et al.
U.S. Appl. No. 10/391,408, filed Aug. 27, 2019, Ord et al.
U.S. Appl. No. 10/391,632, filed Aug. 27, 2019, Khansari Zadeh.
U.S. Appl. No. 10/394,246, filed Aug. 27, 2019, Moshkina-Martinson et al.
U.S. Appl. No. 10/395,117, filed Aug. 27, 2019, Zhang et al.
U.S. Appl. No. 10/395,434, filed Aug. 27, 2019, Priest.
U.S. Appl. No. 10/397,802, filed Aug. 27, 2019, Priest.
U.S. Appl. No. 10/398,520, filed Sep. 3, 2019, Larkin et al.
U.S. Appl. No. 10/399,443, filed Sep. 3, 2019, Kwa et al.
U.S. Appl. No. 10/401,852, filed Sep. 3, 2019, Levinson et al.
U.S. Appl. No. 10/401,864, filed Sep. 3, 2019, Sussman et al.
U.S. Appl. No. 10/402,731, filed Sep. 3, 2019, Cosic.
U.S. Appl. No. 10/406,687, filed Sep. 10, 2019, Lalonde et al.
U.S. Appl. No. 10/408,613, filed Sep. 10, 2019, Abovitz et al.
U.S. Appl. No. 10/409,284, filed Sep. 10, 2019, Kentley-Klay et al.
U.S. Appl. No. 10/410,328, filed Sep. 10, 2019, Liu et al.
U.S. Appl. No. 10/411,356, filed Sep. 10, 2019, Johnson et al.
U.S. Appl. No. 10/413,994, filed Sep. 17, 2019, Aoki.
U.S. Appl. No. 10/414,052, filed Sep. 17, 2019, Deyle et al.
U.S. Appl. No. 10/414,395, filed Sep. 17, 2019, Sapp et al.
U.S. Appl. No. 10/416,668, filed Sep. 17, 2019, Hammond et al.
U.S. Appl. No. 10/417,829, filed Sep. 17, 2019, Kim et al.

\* cited by examiner

NEGOTIATION-BASED HUMAN-ROBOT COLLABORATION VIA AUGMENTED REALITY

CROSS REFERENCE TO RELATED APPLICATIONS

The present application is a non-provisional of, and claims benefit of priority under 35 U.S.C. § 119(e) from, U.S. Provisional Patent Application No. 62/902,830, filed Sep. 19, 2019, the entirety of which is expressly incorporated herein by reference.

FIELD OF THE INVENTION

The present application relates to the field of robotics, and more particularly to a system and method for controlling a robot using an augmented reality user interface.

BACKGROUND OF THE INVENTION

Robots are increasingly ubiquitous in everyday environments, but few of them collaborate or even communicate with people in their work time. For instance, the work zones for Amazon's warehouse robots and people are completely separated in their fulfillment centers, and there is no direct human-robot communication at runtime except for object handovers or people wearing a "Tech Vest" (Wurman, D'Andrea, and Mountz 2008).

Another notable example is the Relay robots from Savioke that have completed more than 300,000 deliveries in hotels, hospitals, and logistics facilities (Ivanov, Webster, and Berezina 2017). Their robots work in human presence, but the human-robot interaction does not go beyond avoiding each other as obstacles until the moment of delivery. Despite the significant achievements in multi-agent systems (Wooldridge 2009), human-robot collaboration (HRC), as a kind of multi-agent system, is still rare in practice.

Augmented Reality (AR) focuses on overlaying information in an augmented layer over the real environment to make objects interactive (Azuma et al. 2001). On the one hand, AR has promising applications in robotics, and people can visualize the state of the robot in a visually enhanced form while giving feedback at runtime (Green et al. 2007). On the other hand, there are a number of collaboration algorithms developed for multiagent systems (MAS) (Wooldridge 2009; Stone and Veloso 2000), where a human-robot team is a kind of MAS. Despite the existing research on AR in robotics and multiagent systems, few have leveraged AR for HRC.

See, US 20190254754; 20190254753; 20190236399; 20190235492; 20190231436; 20190088162; 20180304461; 20180285697; 20180085616; 20180081439; 20180061137; 20180055326; 20180055312; 20180048876; 20180009059; 20170232615; 20170165841; 20170075116; 20160158937; 20160140729; 20160055677; 20160004306; 20150369864; 20150323990; 20150290803; 20150290802; 20140333668; 20140293014; 20140277737; 20140275760; 20140241617; 20140241612; 20140081459; 20130346348; 20130345870; 20130343640; 20120194644; 20110306986; 20110164116; 20110164030; 20110128300; 20030179308; U.S. Pat. Nos. 10,413,994; 10,373,389; 10,368,784; 10,366,510; 10,052,765; 9,977,496; 9,964,765; 9,940,553; 9,916,006; 9,794,541; 9,767,608; 9,751,015; 9,701,015; 9,669,544; 9,434,072; 9,092,698; 8,885,022; 8,817,078; 8,803,951; 8,711,206.

When humans and robots work in a shared environment, it is vital that they communicate with each other to avoid conflicts, leverage complementary capabilities, and facilitate the smooth accomplishment of tasks. However, humans and robots prefer different modalities for communication. While humans employ natural language, body language, gestures, written communication, etc., the robots need information in a digital form, e.g., text-based commands. Researchers developed algorithms to bridge the human-robot communication gap using natural language (Tellex et al. 2011; Chai et al. 2014; Thomason et al. 2015; Matuszek et al. 2013), and vision (Waldherr, Romero, and Thrun 2000; Nickel and Stiefelhagen 2007; Yang, Park, and Lee 2007). Despite those successes, AR has its unique advantages on elevating coordination through communicating spatial information, e.g., through which door a robot is coming into a room and how (i.e., the planned trajectory), when people and robots share a physical environment (Azuma 1997).

One way of delivering spatial information related to the local environment is through projecting robot's state and motion intent to humans using visual cues (Park and Kim 2009; Watanabe et al. 2015; Reinhart, Vogl, and Kresse 2007). For instance, researchers used an LED projector attached to the robot to show its planned motion trajectory, allowing the human partner to respond to the robot's plan to avoid possible collisions (Chadalavada et al. 2015). While such systems facilitate human-robot communication about spatial information, they have the requirement that the human must be in close proximity to the robot. Also, bidirectional communication is difficult in projection-based systems.

Early research on AR for human-robot interaction (HRI) produced a system called ARGOS that allows a human operator to interactively plan, and optimize robot trajectories (Milgram et al. 1993). More recently, researchers have developed frameworks to help human operators to visualize the motion-level intentions of unmanned aerial vehicles (UAVs) using AR (Walker et al. 2018; Hedayati, Walker, and Szafir 2018). In another line of research, people used an AR interface to help humans visualize a robot arm's planned actions in the car assembly tasks (Amor et al. 2018). However, the communication of those systems is unidirectional, i.e., their methods only convey robot intention to the human and do not support the communication the other way around.

See, U.S. Pat. Nos. 4,163,183; 4,260,940; 4,260,941; 4,754,402; 4,789,940; 4,940,925; 4,982,329; 5,046,022; 5,280,431; 5,342,283; 5,375,059; 5,390,125; 5,438,517; 5,548,516; 5,555,503; 5,579,444; 5,610,815; 5,612,883; 5,615,116; 5,629,855; 5,640,323; 5,646,843; 5,646,845; 5,648,901; 5,657,226; 5,680,306; 5,680,313; 5,684,696; 5,838,562; 5,956,250; 5,969,973; 5,983,161; 5,985,214; 6,042,555; 6,099,457; 6,122,572; 6,169,981; 6,233,545; 6,252,544; 6,275,773; 6,292,830; 6,341,243; 6,341,372; 6,360,193; 6,413,229; 6,429,812; 6,468,800; 6,472,218; 6,487,500; 6,507,767; 6,574,628; 6,580,967; 6,581,048; 6,666,811; 6,678,577; 6,685,884; 6,748,325; 6,791,472; 6,842,674; 6,842,692; 6,845,294; 6,890,485; 6,898,484; 6,904,335; 6,965,816; 6,988,026; 7,033,781; 7,047,861; 7,054,718; 7,072,764; 7,099,747; 7,103,460; 7,168,748; 7,236,861; 7,268,700; 7,269,479; 7,271,737; 7,298,289; 7,330,844; 7,343,222; 7,383,107; 7,386,163; 7,415,321; 7,421,321; 7,528,835; 7,558,156; 7,590,589; 7,649,331; 7,662,128; 7,706,918; 7,720,777; 7,742,845; 7,751,928; 7,756,615; 7,765,029; 7,765,038; 7,774,243; 7,835,778; 7,865,267; 7,873,471; 7,881,824; 7,904,182; 7,949,428; 7,970,476; 7,991,576; 8,010,180; 8,052,857; 8,112,176;

8,121,618; 8,126,642; 8,139,109; 8,145,295; 8,157,205; 8,160,680; 8,180,436; 8,195,343; 8,195,358; 8,195,599; 8,200,428; 8,213,261; 8,221,322; 8,229,163; 8,229,618; 8,237,775; 8,244,327; 8,244,469; 8,255,092; 8,280,623; 8,306,650; 8,340,823; 8,373,582; 8,374,721; 8,392,065; 8,412,449; 8,414,356; 8,419,804; 8,422,994; 8,447,440; 8,447,524; 8,457,830; 8,467,779; 8,467,928; 8,478,493; 8,483,876; 8,485,861; 8,489,115; 8,512,219; 8,512,415; 8,518,031; 8,521,257; 8,538,673; 8,568,363; 8,577,126; 8,577,538; 8,583,286; 8,583,313; 8,600,830; 8,612,052; 8,629,789; 8,630,763; 8,660,642; 8,666,587; 8,682,309; 8,682,726; 8,694,092; 8,706,185; 8,706,186; 8,706,298; 8,706,394; 8,712,686; 8,725,292; 8,727,987; 8,737,986; 8,761,931; 8,781,629; 8,784,384; 8,784,385; 8,798,932; 8,798,933; 8,818,567; 8,822,924; 8,831,863; 8,834,488; 8,842,176; 8,849,441; 8,858,912; 8,864,846; 8,874,162; 8,874,477; 8,900,325; 8,911,499; 8,914,182; 8,918,209; 8,920,332; 8,930,019; 8,935,119; 8,936,629; 8,939,056; 8,945,017; 8,947,531; 8,948,832; 8,956,303; 8,965,677; 8,965,688; 8,965,730; 8,968,332; 8,972,177; 8,989,972; 8,998,815; 9,002,426; 9,005,129; 9,008,962; 9,014,790; 9,014,848; 9,020,617; 9,021,024; 9,040,087; 9,044,149; 9,044,171; 9,046,373; 9,046,892; 9,056,676; 9,060,678; 9,066,211; 9,075,146; 9,079,060; 9,089,968; 9,098,079; 9,113,794; 9,113,795; 9,129,532; 9,131,529; 9,139,310; 9,151,633; 9,168,392; 9,168,419; 9,177,476; 9,183,560; 9,188,980; 9,198,563; 9,198,604; 9,199,725; 9,211,201; 9,220,086; 9,220,917; 9,221,177; 9,228,859; 9,234,744; 9,237,855; 9,248,982; 9,251,393; 9,253,753; 9,261,376; 9,282,902; 9,292,936; 9,300,423; 9,302,122; 9,302,783; 9,307,917; 9,311,670; 9,333,042; 9,345,387; 9,345,592; 9,346,560; 9,351,106; 9,351,856; 9,358,975; 9,361,797; 9,383,752; 9,389,085; 9,392,920; 9,400,503; 9,402,552; 9,408,530; 9,410,979; 9,412,278; 9,413,852; 9,420,203; 9,420,432; 9,429,657; 9,429,661; 9,431,006; 9,440,545; 9,443,192; 9,445,711; 9,448,072; 9,456,787; 9,457,915; 9,459,273; 9,459,626; 9,465,390; 9,467,834; 9,468,349; 9,470,529; 9,470,702; 9,477,230; 9,480,534; 9,486,921; 9,488,987; 9,489,655; 9,491,589; 9,494,432; 9,497,380; 9,498,649; 9,504,408; 9,507,346; 9,511,799; 9,513,132; 9,517,668; 9,517,767; 9,519,882; 9,520,638; 9,527,586; 9,527,587; 9,538,892; 9,539,117; 9,540,043; 9,540,102; 9,541,383; 9,542,600; 9,543,636; 9,551,582; 9,554,922; 9,557,742; 9,561,794; 9,561,941; 9,567,074; 9,568,492; 9,572,533; 9,574,883; 9,582,720; 9,586,316; 9,588,195; 9,592,851; 9,593,957; 9,597,014; 9,599,632; 9,599,990; 9,600,138; 9,605,952; 9,606,539; 9,609,107; 9,612,123; 9,612,403; 9,616,252; 9,623,562; 9,630,619; 9,632,502; 9,638,829; 9,641,239; 9,643,316; 9,645,159; 9,645,577; 9,646,614; 9,649,767; 9,651,368; 9,655,548; 9,658,239; 9,661,827; 9,662,053; 9,671,418; 9,671,566; 9,682,481; 9,683,858; 9,687,377; 9,701,239; 9,703,295; 9,714,954; 9,720,415; 9,721,471; 9,726,686; 9,731,853; 9,734,220; 9,734,367; 9,734,455; 9,734,632; 9,736,655; 9,744,672; 9,746,330; 9,747,809; 9,750,977; 9,754,226; 9,754,419; 9,754,490; 9,760,093; 9,769,365; 9,775,681; 9,776,326; 9,776,716; 9,785,911; 9,786,202; 9,791,866; 9,792,613; 9,795,445; 9,798,329; 9,801,527; 9,802,661; 9,804,599; 9,805,372; 9,805,607; 9,818,136; 9,827,683; 9,830,485; 9,832,749; 9,835,637; 9,839,552; 9,840,003; 9,857,170; 9,860,129; 9,861,075; 9,869,484; 9,870,566; 9,873,196; 9,878,664; 9,880,561; 9,881,497; 9,888,105; 9,901,408; 9,902,069; 9,907,721; 9,910,441; 9,911,020; 9,916,002; 9,916,010; 9,916,703; 9,919,360; 9,927,807; 9,928,649; 9,931,573; 9,931,697; 9,937,621; 9,939,817; 9,940,604; 9,945,677; 9,947,230; 9,952,042; 9,952,591; 9,958,864; 9,958,875; 9,965,730; 9,968,280; 9,972,137; 9,975,249; 9,978,013; 9,980,630; 9,983,584; 9,984,339; 10001499; 10,001,780; 10,002,471; 10,002,537; 10,011,012; 10,012,996; 10,013,610; 10,015,466; 10,022,867; 10,023,393; 10,025,886; 10,030,988; 10,034,066; 10,048,683; 10,051,411; 10,059,467; 10,061,325; 10,061,328; 10,065,309; 10,065,317; 10,068,470; 10,070,974; 10,078,136; 10,080,672; 10,081,104; 10,082,397; 10,083,406; 10,099,391; 10,105,244; 10,106,283; 10,108,194; 10,122,995; 10,123,181; 10,126,136; 10,126,757; 10,127,816; 10,133,990; 10,137,011; 10,144,591; 10,147,069; 10,153,537; 10,159,218; 10,162,353; 10,162,355; 10,168,704; 10,172,409; 10,178,445; 10,178,973; 10,188,472; 10,191,495; 10,192,113; 10,194,836; 10,194,858; 10,203,762; 10,207,404; 10,209,365; 10,212,876; 10,216,195; 10,218,433; 10,222,215; 10,225,025; 10,228,242; 10,230,745; 10,231,790; 10,239,208; 10,239,740; 10,243,379; 10,248,119; 10,251,805; 10,252,335; 10,254,499; 10,254,536; 10,255,719; 10,255,723; 10,259,514; 10,260,890; 10,262,213; 10,264,586; 10,265,859; 10,265,871; 10,267,970; 10,269,108; 10,270,789; 10,277,885; 10,279,906; 10,283,110; 10,285,828; 10,288,419; 10,291,334; 10,293,485; 10,295,338; 10,296,012; 10,296,995; 10,300,601; 10,300,603; 10,303,166; 10,303,174; 10,307,199; 10,307,272; 10,309,792; 10,310,517; 10,311,731; 10,320,610; 10,326,689; 10,327,674; 10,328,575; 10,328,578; 10,330,440; 10,331,129; 10,334,050; 10,334,164; 10,334,906; 10,335,004; 10,336,543; 10,338,391; 10,338,594; 10,352,693; 10,353,388; 10,353,532; 10,354,441; 10,358,057; 10,359,783; 10,360,799; 10,362,057; 10,363,657; 10,363,826; 10,365,656; 10,365,716; 10,366,289; 10,366,508; 10,368,249; 10,369,974; 10,372,132; 10,372,721; 10,375,289; 10,375,517; 10,377,040; 10,377,375; 10,379,007; 10,379,539; 10,382,889; 10,382,975; 10,384,351; 10,386,857; 10,389,037; 10,391,632; 10,394,246; 10,395,117; 10,395,434; 10,397,802; 10,398,520; 10,399,443; 10,401,852; 10,401,864; 10,402,731; 10,406,687; 10,408,613; 10,409,284; 10,410,328; 10,411,356; 10,414,052; 10,414,395; 10,416,668; 20020005614; 20020012611; 20020016647; 20020022927; 20020073101; 20020184236; 20020198623; 20020198697; 20030093187; 20030199944; 20030208302; 20040006422; 20040006566; 20040013295; 20040019402; 20040030448; 20040030449; 20040030450; 20040030451; 20040030570; 20040030571; 20040030741; 20040068351; 20040068415; 20040068416; 20040077090; 20040103740; 20040107021; 20040128028; 20040130442; 20040133168; 20040134336; 20040134337; 20040162638; 20040242953; 20040267442; 20050005266; 20050065649; 20050071043; 20050125099; 20050131581; 20050149251; 20050183569; 20050187677; 20050191670; 20050192727; 20050215764; 20050237188; 20050240253; 20050240307; 20050249667; 20050251291; 20050273218; 20060064202; 20060095171; 20060097683; 20060142657; 20060161218; 20060161405; 20060167784; 20060184272; 20060229801; 20060241368; 20060241718; 20070007384; 20070010898; 20070018890; 20070027612; 20070039831; 20070055662; 20070063875; 20070070072; 20070087756; 20070100780; 20070124024; 20070150565; 20070159924; 20070219933; 20070220637; 20070239315; 20070250119; 20070262860; 20080009772; 20080027591; 20080059015; 20080072139; 20080167771; 20080226498; 20080228239; 20080270097; 20080300777; 20080312561; 20090000626; 20090000627; 20090012531; 20090012532; 20090037033; 20090043504; 20090073034; 20090087029; 20090148035; 20090152391; 20090178597; 20090306741; 20090312808; 20090326604; 20100017046; 20100042258; 20100056900; 20100076631; 20100076737; 20100106356; 20100114633; 20100149917; 20100161232; 20100235285; 20100268382; 20100286791; 20100286824;

20100312387; 20100312388; 20100317420; 20110002194; 20110004513; 20110022230; 20110077775; 20110082717; 20110118855; 20110130114; 20110231016; 20110231050; 20110288684; 20120069131; 20120072023; 20120075072; 20120084839; 20120101680; 20120109150; 20120130632; 20120149353; 20120166024; 20120173018; 20120182392; 20120185094; 20120209432; 20120215354; 20120274775; 20120290152; 20120310112; 20120316725; 20130079693; 20130131985; 20130165070; 20130166195; 20130166202; 20130166387; 20130196300; 20130212420; 20130238183; 20130252586; 20130274986; 20130279392; 20130279393; 20130279491; 20130303847; 20130320212; 20130335273; 20140039298; 20140067188; 20140100693; 20140100697; 20140155087; 20140155098; 20140156806; 20140163664; 20140187913; 20140193040; 20140214259; 20140244035; 20140263989; 20140264047; 20140266939; 20140268601; 20140273858; 20140275850; 20140275852; 20140275854; 20140276119; 20140278220; 20140278229; 20140278634; 20140288390; 20140288391; 20140288392; 20140288435; 20140288436; 20140288438; 20140297217; 20140297218; 20140303486; 20140305204; 20140316305; 20140316570; 20140347265; 20140356817; 20140358012; 20140374480; 20140378999; 20150010437; 20150016777; 20150019013; 20150019124; 20150025393; 20150025394; 20150032164; 20150032252; 20150037437; 20150051519; 20150073646; 20150081156; 20150081444; 20150094096; 20150106427; 20150118756; 20150122018; 20150127141; 20150158182; 20150168939; 20150173631; 20150192682; 20150196256; 20150201853; 20150201854; 20150202770; 20150223708; 20150230735; 20150234477; 20150235088; 20150235370; 20150235441; 20150235447; 20150241458; 20150241705; 20150241959; 20150242575; 20150242943; 20150243100; 20150243105; 20150243106; 20150247723; 20150247975; 20150247976; 20150248169; 20150248170; 20150248787; 20150248788; 20150248789; 20150248791; 20150248792; 20150248793; 20150256401; 20150268355; 20150273242; 20150273691; 20150276775; 20150286221; 20150290453; 20150290454; 20150301072; 20150308839; 20150309263; 20150309264; 20150314166; 20150332213; 20150343238; 20150353206; 20150355207; 20150355211; 20150360057; 20160018816; 20160023762; 20160025500; 20160025502; 20160026253; 20160036118; 20160039540; 20160039553; 20160039621; 20160042151; 20160045841; 20160051169; 20160054135; 20160066844; 20160070436; 20160081575; 20160082597; 20160084869; 20160086108; 20160109954; 20160129592; 20160132059; 20160136284; 20160143500; 20160148433; 20160167582; 20160170414; 20160171884; 20160171893; 20160183818; 20160187166; 20160201933; 20160201934; 20160212402; 20160216117; 20160236582; 20160253844; 20160260322; 20160282126; 20160283774; 20160288905; 20160291593; 20160292403; 20160292696; 20160292869; 20160292872; 20160297429; 20160299506; 20160302706; 20160313739; 20160325143; 20160332748; 20160375592; 20160375779; 20160377381; 20160377508; 20160378111; 20160378117; 20160378861; 20160379074; 20170011210; 20170021497; 20170021502; 20170027523; 20170031369; 20170038579; 20170039764; 20170039859; 20170045893; 20170045894; 20170069214; 20170084983; 20170086698; 20170087301; 20170087381; 20170090478; 20170097506; 20170097507; 20170100837; 20170102711; 20170105592; 20170108871; 20170111223; 20170112392; 20170112407; 20170113352; 20170116477; 20170127652; 20170129603; 20170132931; 20170148213; 20170160398; 20170169713; 20170182657; 20170182664; 20170188864; 20170188893; 20170203446; 20170212511; 20170215086; 20170215381; 20170223034; 20170223037; 20170223046; 20170225321; 20170225332; 20170225334; 20170225336; 20170227965; 20170235316; 20170239719; 20170239720; 20170239721; 20170239752; 20170239891; 20170239892; 20170248966; 20170257162; 20170257778; 20170270361; 20170277193; 20170277194; 20170277195; 20170287337; 20170291093; 20170300540; 20170305015; 20170309069; 20170318360; 20170318477; 20170323563; 20170329347; 20170337826; 20170341231; 20170343695; 20170352192; 20170357270; 20170366751; 20170368684; 20170372618; 20180001476; 20180004213; 20180015347; 20180021097; 20180032949; 20180039287; 20180041907; 20180042526; 20180043547; 20180052276; 20180052277; 20180052320; 20180052451; 20180052501; 20180059297; 20180059304; 20180059672; 20180060764; 20180060765; 20180061243; 20180068255; 20180068358; 20180068567; 20180071949; 20180075649; 20180077902; 20180081439; 20180082308; 20180084242; 20180104829; 20180109223; 20180113468; 20180116898; 20180119534; 20180120856; 20180123291; 20180126460; 20180126461; 20180126462; 20180126649; 20180126650; 20180133801; 20180139364; 20180144558; 20180153084; 20180157336; 20180158236; 20180165974; 20180170392; 20180172450; 20180173242; 20180174357; 20180178376; 20180178382; 20180178663; 20180180421; 20180186067; 20180186080; 20180186081; 20180186082; 20180204111; 20180207791; 20180211263; 20180211441; 20180215039; 20180218619; 20180225597; 20180231972; 20180232668; 20180233054; 20180233856; 20180238164; 20180249343; 20180251135; 20180251234; 20180252535; 20180255465; 20180259976; 20180261023; 20180263170; 20180273296; 20180273297; 20180273298; 20180276891; 20180278920; 20180281191; 20180282065; 20180282066; 20180284735; 20180284736; 20180284737; 20180284741; 20180284742; 20180284743; 20180284744; 20180284745; 20180284746; 20180284747; 20180284749; 20180284752; 20180284753; 20180284754; 20180284755; 20180284756; 20180284757; 20180284758; 20180284786; 20180288303; 20180288586; 20180293536; 20180299878; 20180299882; 20180300835; 20180304468; 20180306587; 20180306589; 20180306591; 20180307241; 20180307941; 20180311822; 20180312824; 20180321666; 20180321667; 20180321672; 20180322197; 20180322779; 20180329425; 20180330293; 20180348761; 20180348764; 20180361586; 20180362158; 20180362190; 20180364724; 20180365603; 20180370046; 20180373320; 20180374266; 20190001492; 20190011921; 20190011932; 20190015167; 20190020530; 20190023438; 20190025805; 20190025806; 20190025812; 20190025813; 20190033845; 20190033846; 20190033847; 20190033848; 20190033849; 20190033888; 20190034728; 20190034729; 20190034730; 20190034839; 20190041223; 20190041835; 20190041836; 20190041840; 20190041841; 20190041842; 20190041843; 20190041844; 20190041845; 20190041846; 20190041852; 20190049968; 20190051178; 20190051198; 20190056693; 20190064791; 20190064792; 20190073760; 20190077510; 20190079509; 20190079523; 20190079524; 20190079526; 20190079528; 20190080266; 20190080515; 20190080516; 20190082985; 20190086919; 20190086925; 20190086930; 20190086932; 20190086934; 20190086938; 20190088133; 20190092179; 20190092183; 20190092184; 20190094870; 20190094981; 20190097443; 20190100196; 20190104919; 20190105200; 20190107845; 20190113351; 20190113918; 20190113919; 20190113920; 20190113927; 20190116758; 20190120639; 20190120967; 20190121333; 20190121338; 20190121339; 20190121340; 20190121341; 20190121342; 20190121343; 20190121344; 20190121345; 20190121346; 20190121347; 20190121348; 20190121349; 20190121350; 20190121365; 20190125126; 20190125361; 20190125454; 20190125455; 20190125456; 20190125457; 20190125458; 20190125459; 20190128390; 20190129404;

20190129405; 20190129406; 20190129407; 20190129408; 20190129409; 20190129410; 20190130182; 20190135296; 20190137985; 20190137986; 20190137987; 20190137988; 20190137989; 20190143412; 20190145239; 20190145765; 20190145784; 20190146451; 20190146472; 20190146473; 20190146474; 20190146475; 20190146476; 20190146477; 20190146478; 20190146479; 20190146480; 20190146481; 20190146482; 20190146515; 20190147253; 20190147254; 20190147255; 20190147260; 20190149725; 20190155263; 20190155272; 20190155295; 20190155296; 20190156128; 20190159848; 20190160675; 20190161274; 20190163206; 20190170521; 20190171187; 20190171912; 20190176328; 20190176329; 20190178638; 20190179290; 20190179300; 20190179301; 20190179329; 20190179976; 20190180499; 20190187680; 20190187681; 20190187682; 20190187683; 20190187684; 20190187685; 20190187686; 20190187687; 20190187688; 20190187689; 20190187690; 20190187703; 20190187715; 20190188632; 20190188895; 20190193276; 20190193629; 20190196472; 20190196480; 20190196485; 20190200844; 20190200977; 20190201037; 20190201038; 20190201040; 20190201042; 20190201046; 20190201127; 20190201136; 20190204201; 20190206045; 20190206562; 20190206565; 20190212106; 20190213212; 20190213390; 20190213418; 20190213421; 20190213441; 20190213523; 20190213534; 20190213535; 20190213545; 20190213546; 20190213752; 20190215424; 20190219409; 20190219995; 20190219996; 20190220012; 20190220863; 20190222986; 20190227536; 20190227537; 20190228266; 20190228495; 20190228573; 20190229802; 20190231162; 20190232498; 20190232992; 20190235486; 20190235498; 20190235505; 20190235512; 20190235516; 20190235531; 20190236531; 20190238638; 20190240840; 20190243370; 20190247050; 20190247122; 20190248002; 20190248007; 20190248013; 20190248014; 20190248016; 20190250000; 20190254753; 20190254754; 20190258251; 20190258878; 20190261565; 20190261566; 20190265366; 20190265705; 20190266418; 20190269353; 20190270197; 20190274716; 20190277869; 20190277962; 20190278276; 20190278284; and 20190278290.

All patents and other publications; including literature references, issued patents, and published patent applications; cited throughout this application are expressly incorporated herein by reference for all purposes, including, but not limited to, describing and disclosing, for example, the methodologies described in such publications that might be used in connection with the technology described herein. Citation or identification of any reference herein, in any section of this application, shall not be construed as an admission that such reference is available as prior art to the present application, and shall be treated as if the entirety thereof forms a part of the disclosure hereof. Such references are provided for their disclosure of technologies to enable practice of the present invention, provide a written description of the invention, to provide basis for claim language, to make clear applicant's possession of the invention with respect to the various aggregates, combinations, and sub-combinations of the respective disclosures or portions thereof (within a particular reference or across multiple references). The citation of references is intended to be part of the disclosure of the invention, and not merely supplementary background information. The incorporation by reference does not extend to teachings which are inconsistent with the invention as expressly described herein, and is evidence of a proper interpretation by persons of ordinary skill in the art of the terms, phrase and concepts discussed herein, without being limiting as the sole interpretation available.

The technology described herein is further illustrated by the following examples which in no way should be construed as being further limiting. However, the scope of the invention is to be interpreted in any case as including technological implementation beyond mere mental or manual steps, abstract ideas, and algorithms.

SUMMARY OF THE INVENTION

An augmented reality-driven, negotiation-based (ARN) framework is provided for human-robot collaboration (HRC) problems, where ARN for the first time enables spatially-distant, human-robot teammates to iteratively communicate preferences and constraints toward effective collaborations. An AR-driven interface is provided for HRC, where the human can directly visualize and interact with the robots' planned actions.

As encompassed herein, a robot is an automated system, either physically or virtually implemented according to physical constraints, that is controlled to perform a useful task.

The AR-based framework that inherits the benefits of spatial information from the projection-based systems while alleviating the proximity requirement and enabling bi-directional communication. The ARN framework supports bi-directional communication between man and machine toward effective collaborations.

The system typically supports a human user to visualize the robot's sensory information, and planned trajectories, while allowing the robot to prompt information as well as asking questions through an AR interface (Muhammad et al. 2019; Cheli et al. 2018). In comparison to features available from the work of Muhammad and Cheli, the ARN framework supports human multi-robot collaboration, where the robots collaborate with both robot and human teammates or coworkers. Note that the robots may also be competitive with other robots or humans on other teams or performing other tasks, and therefore all robots and humans need not be seeking to achieve the same goals.

The present system preferably provides robots equipped with the task (re)planning capability, which enables the robots to respond to human feedback by adjusting their task completion strategy. The robots' task planning capability enables negotiation and collaboration behaviors within human-robot teams.

The AR interface of ARN enables the human teammate to visualize the robots' current status (e.g., their current locations) as well as the planned motion trajectories. For instance, a human user might "see through" a heavy door (via AR) and find a robot waiting for him/her to open the door. Moreover, ARN also supports people giving feedback to the robots' current plans. For instance, if the user is too busy to help on the door, he/she can indicate "I cannot open the door for you in three minutes" using ARN. Accordingly, the robots may incorporate such human feedback for re-planning, and see if it makes sense to work on something else and come back after three minutes. The AR interface is particularly useful in environments with challenging visibility, such as the indoor environments of offices, warehouses, and homes, because the human might frequently find it impossible to directly observe the robots' status due to occlusions.

Thus, a feature of a preferred embodiment is an automated processing associated with the robot of future planning and scheduling, to coordinate with other resources, constraints, or requirements. Further, where multiple robots are available, the planning may be collaborative to achieve group or task efficiency rather than seeking to maximize individual efficiency. Indeed, in HRC, often it is the human efficiency that is a paramount concern, and therefore one or more robots will sacrifice its own efficiency in favor of the human.

On the other hand, in a competitive environment, there is typically a goal, and planning is centered around competing for the highest reward in view of the goal. In this case, human efficiency may be less important than achieving the goal. In a competition, there are often rules or constraints to render the competition "fair" or legal, and the rules or constraints will set bounds on the plan as well. Depending on the nature of penalties or sanctions for violation of rules or constraints, the robot may consider plans that violate rules or constraints, even while accepting plans that consistently fall within the rules or constraints. For example, the planning may involve a statistical process for precision, accuracy, or reliability, with an accepted risk that the precision, accuracy or reliability constraint will be accepted. Further, with acceptance of statistical or other risks of non-compliance, fuzzy logic or other imperfect heuristics may be employed. For example, the HRC may face a combinatorial optimization problem (np complete or np hard), which cannot feasibly be computed in real time. Therefore, the automated control may implement a simplified process to estimate a reasonable plan within the time and resources available, accepting the risk that the estimate and reasonableness may fail.

ARN has been implemented on and evaluated with a human-robot collaborative delivery task in an indoor office environment. Both human participants and robots are assigned non-transferable tasks. Experimental results suggest that ARN significantly reduced people's task completion time and cognitive load, while increasing the efficiency of human-robot collaboration in overall task completion time.

In the context of the delivery task, competition might take the form of multiple HRC teams competing for the same doorway. In such a scenario, while the HRC teams are competing at a low level, in the real-world cooperation ("coopetition") may be the best strategy, so that the competing HRC teams may collaborate to coordinate tasks, even if one team does not directly benefit from the interaction.

Multi-agent systems require the agents, including humans and robots, to extensively communicate with each other, because of the inter-dependency among the agents' actions. The inter-dependency can be in the form of state constraints, action synergies, or both. The augmented reality-driven, negotiation-based (ARN) framework is introduced to enable bidirectional communication between human and robot teammates, and iterative "negotiation" toward the most effective joint plans.

There are a variety of robot platforms that have been developed for very different purposes. A sample of examples are, among others, warehouse robots, indoor service robots, military robots, and rescue robots. Despite their capabilities of accomplishing complex tasks in the real world, these robots rarely collaborate with people. One of the main challenges in human-robot collaboration is the significant communication cost. More precisely, effective human-robot collaboration requires extensive communications on intentions in the form of planned future actions. Natural language is the most common communication channel in human community, but is less effective for human-robot interaction due to the limited bandwidth and ubiquitous ambiguity. Therefore, there is the need of creating novel technologies for efficient, accurate human-robot communication toward effective collaborations within human-robot teams. In repetitive tasks or stable HRC, a task or user profile may be developed, as a rule base, statistical compilation, or artificial intelligence/machine learning paradigm (e.g., neural networks or deep neural networks), so that explicit communication of plans may be minimized and rather expectations of the plan utilized, with feedback employed to correct the expectation. Note that the feedback may be from human to robot, or robot to human, or both.

This technology may significantly reduce the communication cost within human-robot teams, and is generally applicable to the above-mentioned robot application domains.

Effective human-robot collaboration requires communication within human-robot teams of at least the following properties: high bandwidth, low ambiguity, low latency, and minimum training. Current technologies, such as vision-based, language-based, and motion-based, do not meet such communication requirements.

The present technology may be used in such markets as industrial robots (e.g., those on assembly lines), military robots (e.g., drones), and warehouse robots. For instance, Amazon warehouses have separate areas for robots and people, and robot zones are completely forbidden to people, except for those who wear special vests. The "special vests" force robots to stop in close proximity. With the present technology, people can easily perceive robot intention and potentially achieve effective human-robot collaborations.

An aspect of various embodiments of this technology enables people to use an Augmented Reality (AR) interface to visualize robots' planned actions. To achieve this functionality, the framework includes the following components:
1) an augmented reality (AR) interface,
2) a task planner, and
3) an action restrictor.

1) The AR interface is for visualizing the planned actions of a robot team. Trajectories and movements of robot avatars are employed to show the robots' planned actions. Further, the AR interface supports the visualization of action effects, such as a tool being taken by a robot in an augmented layer. The other functionality of this AR interface is to allow people giving feedback to robots' planned actions. For instance, a person seeing a robot going to take a tool (say screwdriver) can "tell" the robot not to take this tool by "selecting" this tool through the AR interface.

2) The team of robots need the capability of multi-robot task planning for computing sequences of actions; one for each robot. An approach based on Answer Set Programming (ASP) may be employed.

3) The action restrictor is for converting human feedback into a form that can be directly processed by the multi-robot task planner. Given that ASP is used for multi-robot task planning, the human feedback (provided through the AR interface) may be converted into a set of ASP constraints, and the constraints are then directly incorporated into the ASP program to account for human feedback in re-planning for the robot team.

The technology may be used to support human-robot teams, and may be implemented as a system, including multiple autonomous robots, AR devices (glasses, tablets, etc.), and the software that enables people to communicate with their robot teammates. The technology also provides methods of controlling the robots, providing an AR interface for the users, and various architectures for integrating the system.

In comparison to other channels for human-robot communication, the AR-based technology can provide high bandwidth, low latency, and low ambiguity. Moreover, this technology may be intuitive, and the training effort (to new human users) is minimum in comparison to traditional Human-Compute Interaction (HCI) technologies.

There is the cost needed to set up the whole system for a new domain, although this is a one-time process, and may in some cases be automated. The implementation may employ existing AR devices, such as AR glasses and tablets, as well as AR software libraries, such as ARCore (Google) and ARKit (Apple).

See U.S. Pat. Nos. 10,417,829; 10,391,408; 10,339,721; 10,332,245; 10,325,411; 10,304,254; 10,296,080; 10,290,049; 10,262,437; 10,217,488; 10,078,921; 10,062,177; 10,026,209; 10,008,045; 10,002,442; 9,985,786; 20190272348; 20190255434; 20190253835; 20190253580; 20190236844; 20190228854; 20190223958; 20190213755; 20190212901; 20190208979; 20190197788; 20190191125; 20190189160; 20190188917; 20190188913; 20190188788; 20190188766; 20190164346; 20190162575; 20190130637; 20190118104; 20190101394; 20190089760; 20190060741; 20190051054; 20180335502; 20180296916; 20180096495; 20180091869; 20180091791; and 20180075302.

The AR interface allows communication through radio frequency communications, and local and wide area communication networks, and the Internet. Therefore, there is no effective spatial limitation on the human and robot. The AR interface may be used, for example, to supports viewing status of robots that are a few minutes of traveling away from people. Potentially, it even can be applied to warehouse domains, and human-multi-UAV collaboration. While the preferred user interface comprises augmented reality (AR), the interface is not so limited, and may be modified reality (MR), or artificial (e.g., virtual reality, VR). The user interface need not be visual, and may be presented through other senses, such as auditory or tactile, for example for use by blind persons.

The present system preferably comprises a task planning system that supports computing a sequence of actions for each robot within a robot team, e.g., using declarative knowledge.

It is therefore an object to provide a method for human-automaton collaboration, comprising: generating a symbolic plan for the automaton, comprising a sequence of actions to be performed; presenting the symbolic plan as a visualizable trajectory through a visual user interface for a human user; receiving feedback from the human user to the automaton; and altering the symbolic plan in dependence on the received feedback.

The trajectory may be a static representation, or include both position and time, for example.

It is also an object to provide a method for human-automaton collaboration, comprising: generating a plan for the automaton, comprising a sequence of actions to be performed; presenting the plan as through a user interface for a human user; receiving feedback from the human user to the automaton; and altering the plan in dependence on the received feedback.

It is also an object to provide an automaton control system, comprising: a planner configured to generate a symbolic plan for the automaton, comprising a sequence of actions to be performed; a visualizer, configured to present the symbolic plan as a visualizable trajectory through a visual user interface; an input, configured to receive feedback from the human user; and a restrictor configured to process the received feedback and present it to the planner as a constraint to alter the symbolic plan.

A further object provides an automaton control system, comprising: a planner configured to generate a plan for the automaton, comprising a sequence of actions to be performed; a user interface, configured to present the plan; an input, configured to receive feedback from the human user; and a restrictor configured to process the received feedback and present it to the planner as a constraint to alter the plan.

Another object provides a method for human-automaton collaboration, comprising: automatically generating a proposed plan for the automaton, comprising a proposed sequence of actions to be performed by the automaton; presenting the proposed plan through a human computer interface for a human user; receiving feedback from the human user through the human computer interface relating to the proposed plan; and automatically altering the proposed plan to produce a plan comprising a sequence of actions to be performed by the automaton, in dependence on the received feedback.

The automaton may be a robot. The method may further comprise receiving the feedback from the human user while the robot is performing actions as a predicate to the proposed sequence of actions. The sequence of actions may be performed by the automaton in the real world; and the proposed plan may be overlayed as a visualizable time-space trajectory on a representation of the real world in an augmented reality interface for the human user. The human computer user interface may be a 3D visual user interface. The plan may comprise a time sequence of physical movement. The plan may comprise a series of tasks, wherein alteration of the proposed plan may comprise rescheduling the series of tasks to synchronize the automaton with a planned human activity. The proposed plan may comprise a coordinated set of physical activities and interactions of a plurality of automatons.

The method may further comprise automatically coordinating tasks involving a contested resource between the plurality of automatons and presenting the automatically coordinated tasks involving the contested resource to the human user through the human computer interface comprising an augmented reality interface.

The method may further comprise automatically coordinating tasks involving the plurality of automatons interacting with at least one human, and presenting the automatically coordinated tasks to the human user through the human computer interface comprising an augmented reality interface.

The method may further comprise automatically coordinating tasks involving the plurality of automatons with a distributed automated control system.

The automaton may comprise a plurality of automatons configured to operate as independent agents, further comprising automatically negotiating between the plurality of automatons configured to operate as independent agents to optimize efficiency of a human-involved task, and including a result of the automatic negotiation in the proposed plan.

It is another object to provide a control planning system for an automaton, comprising: an automated planner configured to automatically generate a plan for the automaton, comprising a sequence of actions to be performed by the automaton to perform a task limited by a set of constraints; a user interface, configured to present the plan to a human user; an input, configured to receive feedback from the human user relating to the presented plan; and a restrictor configured to automatically process the received feedback and present it to the automated planner as a constraint to update the set of constraints, wherein the automated planner is further configured to alter the plan for the automaton selectively dependent on the updated set of constraints.

The automaton may be a robot and the feedback may be received from the human while the robot is performing actions as a predicate to the proposed sequence of actions and as part of the task.

The sequence of actions may be performed in the real world; and user interface may be configured to overlay the plan as a visualizable time-space trajectory on a representation of the real world in an augmented reality interface for the human user. The user interface may be a 2D or 3D visual user interface.

As used herein, an augmented reality interface is one in which existing physical objects or environment is presented to the user with projections of computer-generated images or objects that are linked to the existing physical objects or environment.

See, en.wikipedia.org/wiki/Augmented_reality; en.wikipedia.org/wiki/Artificial_Reality Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. A heads-up display is often employed. See en.wikipedia.org/wiki/Head-mounted_display. AR can be defined as a system that fulfills three basic features: a combination of real and virtual worlds with 3D registration of virtual and real objects. In this application, a requirement for real-time interaction is not required, since the interface provides a plan, i.e., future action, and not necessarily real time control. However, where the human in involved in a task, and uses the AR interface, integration of both real-time information and future planning is preferred. In virtual reality (VR), the users' perception of reality is completely based on virtual information. In augmented reality (AR) the user is provided with additional computer-generated information that enhances their perception of reality.

Note that the plan may be simple, such as a time for a robot to traverse a linear unobstructed and available trajectory, or a complex optimization with multiple interactions. Such simple and complex planning are well known in the art. See, en.wikipedia.org/wiki/Markov_decision_process; en.wikipedia.org/wiki/Motion_planning; en.wikipedia.org/wiki/Robot_navigation; en.wikipedia.org/wiki/Optimal_control; Kehoe, Ben, Sachin Patil, Pieter Abbeel, and Ken Goldberg. "A survey of research on cloud robotics and automation." IEEE Transactions on automation science and engineering 12, no. 2 (2015): 398-409; Patil, Sachin, Gregory Kahn, Michael Laskey, John Schulman, Ken Goldberg, and Pieter Abbeel. "Scaling up gaussian belief space planning through covariance-free trajectory optimization and automatic differentiation." In Algorithmic foundations of robotics XI, pp. 515-533. Springer, Cham, 2015; Bien, Zeungnam, and Jihong Lee. "A minimum-time trajectory planning method for two robots." IEEE Transactions on Robotics and Automation 8, no. 3 (1992): 414-418; Jouaneh, Musa K., Zhixiao Wang, and David A. Dornfeld. "Trajectory planning for coordinated motion of a robot and a positioning table. I. Path specification." IEEE Transactions on Robotics and Automation 6, no. 6 (1990): 735-745; Hwangbo, Jemin, Joonho Lee, Alexey Dosovitskiy, Dario Bellicoso, Vassilios Tsounis, Vladlen Koltun, and Marco Hutter. "Learning agile and dynamic motor skills for legged robots." Science Robotics 4, no. 26 (2019); Hirose, Noriaki, Fei Xia, Roberto Martín-Martín, Amir Sadeghian, and Silvio Savarese. "Deep visual MPC-policy learning for navigation." IEEE Robotics and Automation Letters 4, no. 4 (2019): 3184-3191; Moreno, Francisco-Angel, Javier Monroy, Jose-Raul Ruiz-Sarmiento, Cipriano Galindo, and Javier Gonzalez-Jimenez. "Automatic Waypoint Generation to Improve Robot Navigation Through Narrow Spaces." Sensors 20, no. 1 (2020): 240; and Kamali, Kaveh, Ilian A. Bonev, and Christian Desrosiers. "Real-time Motion Planning for Robotic Teleoperation Using Dynamic-goal Deep Reinforcement Learning." In 2020 17th Conference on Computer and Robot Vision (CRV), pp. 182-189. IEEE, 2020.

The plan may comprise a series of physical tasks, and the plan may be altered to reschedule the series of physical tasks to synchronize the automaton with a planned human activity based on the received feedback.

The automaton may comprise a plurality of collaborative automatons, each collaborative automaton being configured to automatically negotiate with another collaborative automaton to coordinate aspects of the task within the set of constraints.

The automaton may comprise a plurality of automatons, and at least one of the planner and the restrictor may be configured to automatically coordinate tasks involving a contested resource between the plurality of automatons within the plan before receipt of the human input.

The automaton may comprise a plurality of automatons, each representing independent agents, and at least one of the planner and the restrictor may be further configured to employ a result of an automatic negotiation between the plurality of automatons representing independent agents to optimize efficiency of a human-involved task.

Another object provides a non-transitory computer readable medium, storing instructions for controlling an automaton, comprising: instructions for generating a plan for the automaton, comprising a sequence of actions to be performed by the automaton; instructions for presenting the plan through a human computer user interface for a human user; instructions for receiving feedback from the human user relating to the plan comprising sequence of actions to be performed by the automaton; and instructions for altering the plan in dependence on the received feedback from the human user.

A still further object provides a non-transitory computer readable medium, storing instructions for controlling an automaton, comprising: instructions for generating a plan for the automaton, comprising a sequence of actions to be performed; instructions for presenting the plan through a user interface for a human user; instructions for receiving feedback from the human user to the automaton; and instructions for altering the plan in dependence on the received feedback.

The user interface is a visual user interface, an augmented reality user interface, or an augmented reality visual user interface, for example.

The plan may be presented symbolically in an augmented reality user interface, as a visualizable trajectory in a visual user interface, as a visualizable time-space trajectory in a visual user interface, as a visualizable time-space trajectory in an augmented reality user interface, for example.

The plan may be presented within a virtual reality user interface. The visual user interface may be a 2D or 3D interface.

The automaton may be a robot. Alternately, the automaton may lack physical movement actuators, and serve an automated control or layout function, for example.

The sequence of actions may be performed in the real world; and the symbolic plan overlayed as a visualizable trajectory on a representation of the real world in an augmented reality interface for the human user.

The visualizable trajectory may comprise a time sequence of movement.

The symbolic plan may comprise a series of tasks, wherein said altering the symbolic plan comprises rescheduling the series of tasks to synchronize the automaton with a planned human activity.

The automaton comprises a plurality of automatons or robots. Tasks may be automatically coordinated involving a contested resource between the plurality of automatons. Tasks involving the human may be automatically coordinated between the plurality of automatons to resolve competition for limited resources before the human involvement. Tasks involving the plurality of automatons may be automatically coordinated according to a distributed control system.

The automaton may comprise a plurality of automatons acting as independent agents, further comprising automatically negotiating between the plurality of automatons to optimize efficiency of a human-involved task.

The symbolic plan may comprise a series of tasks, which is altered to reschedule the series of tasks to synchronize the automaton with a planned human activity based on the received feedback.

The automaton may comprise a plurality of collaborative automatons or collaborative robots. The planner or restrictor may be configured to automatically coordinate tasks involving a contested resource between the plurality of automatons. The planner or restrictor may be configured to automatically coordinate tasks involving the human between the plurality of automatons to resolve competition for limited resources before the human involvement. The planner or restrictor may be further configured to automatically coordinate tasks involving the plurality of automatons according to a distributed control algorithm.

The automaton may comprise a plurality of automatons acting as independent agents, and the planner or restrictor may be further configured to automatically negotiate between the plurality of automatons to optimize efficiency of a human-involved task.

It is a further object to provide a non-transitory computer readable medium, storing instructions for controlling an automaton, comprising: instructions for generating a symbolic plan for the automaton, comprising a sequence of actions to be performed; instructions for presenting the symbolic plan as a visualizable trajectory through a visual user interface for a human user; instructions for receiving feedback from the human user to the automaton; and instructions for altering the symbolic plan in dependence on the received feedback.

It is also an object to provide a method for human-automaton collaboration, comprising: automatically generating a symbolic plan, comprising a sequence of actions to be performed by the automaton; presenting the symbolic plan as a visualizable time-space trajectory through a visual user interface for a human user; receiving feedback from the human user which limits the symbolic plan; and altering the symbolic plan in dependence on the received feedback.

It is a further object to provide a method for human-automaton collaboration, comprising: automatically generating a plan, comprising a sequence of actions to be performed by the automaton; presenting the plan through a user interface for a human user; receiving feedback from the human user which limits the plan; and altering the plan in dependence on the received feedback.

The visual user interface may provide bidirectional communication between the user and the automaton. The visual user interface may also provide real-time bidirectional communication between the user and the automaton. The visual user interface may further provide communication of sensory information from the automaton to the user. The visual user interface may present at least one query from the automaton to the user, or from the user to the automaton. The visual user interface may present a concurrent real-world image not otherwise visible to the user.

The user interface may be a visual user interface, an augmented reality visual user interface, or a virtual reality interface.

The plan may be presented symbolically in an augmented reality user interface. The plan may be presented as a visualizable time-space trajectory in a visual user interface or in an augmented reality user interface. The plan may be presented within a virtual reality user interface.

The planner may support swarm planning. The symbolic plan alteration may comprise negotiating with the user and/or task rescheduling.

DETAILED DESCRIPTION OF THE PREFERRED EMBODIMENTS

Figure 1:
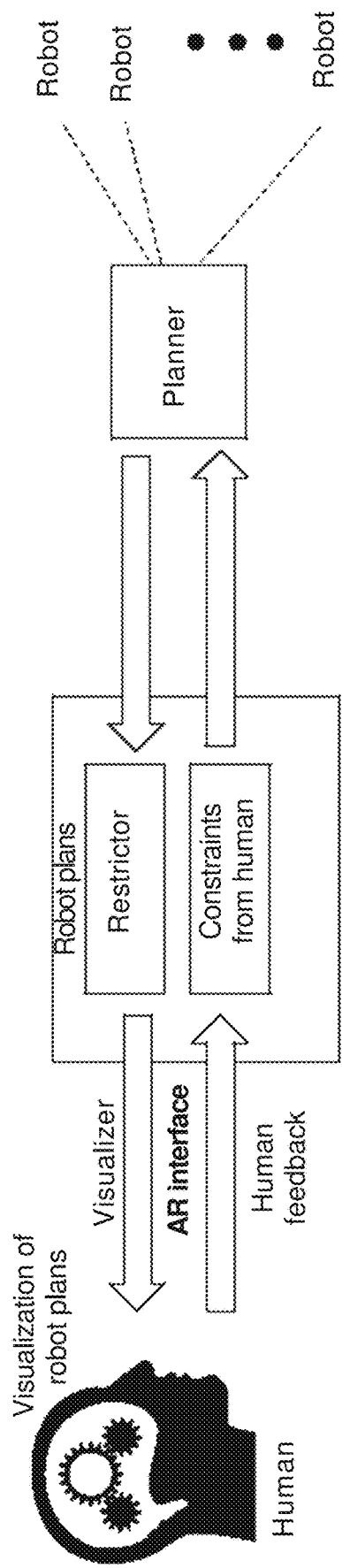
FIG. 1 shows components of the ARN framework

FIG. 1 shows an overview of ARN for multi-turn bidirectional communication toward effective HRC. The core system consists of the following components:

Planner generates a symbolic plan for each robot. This symbolic plan includes a sequence of actions to be performed by the robots. The symbolic plan, in the form of an action sequence, is used by the robots to generate a sequence of motion trajectories. The set of all these generated motion plans for N robots is passed on to a Visualizer component.

Visualizer converts these robot plans into visualizable trajectories that are overlaid in the real world. The human can visualize these trajectories with the help of AR interface. The AR interface also allows the human to share its feedback. This feedback shared by the human counterpart is initially passed on to a Restrictor component.

Restrictor processes human feedback and passes it as constraints to a Planner component. The constraints (the symbolic form of human feedback) are then used for computing plans for the robots. For example, if the robots require human help, the constraint here is the availability of human teammate for door-opening actions. The changes in human or robot's intention are constantly communicated between the human and robot through the AR interface.

Negotiation: The term of "negotiation" is used to refer to the process of the agents iteratively considering other agents' plans, and (accordingly) adjusting their own plans. For example, consider the robots have a computed plan (P) at time step $t_1$ which involves the set of actions that the robot needs to take to accomplish the goals. P is communicated with the human and human visualizes the robot plans with the help of the AR interface. The human shares his/her feedback (H) with the robot teammates at time step $t_2$. The feedback from human may lead to re-computation of plans for some of the robot teammates. In the case of re-computation, the human is updated with the newly recomputed plans. This re-computation takes place based on the state of all the robots and human feedback. All the communication that takes place between the human and robots is a part of the entire negotiation which results in a recomputed plan of better quality.

Planner

An Answer Set Programming (ASP) based planner is used to generate plans for the team of robots (Gelfond and Kahl 2014; Lifschitz 2008). ASP is a popular general knowledge representation and reasoning (KRR) language that has gained recent attention for a variety of planning problems (Lifschitz 2002; Yang et al. 2014; Erdem, Gelfond, and Leone 2016), including robotics (Erdem and Patoglu 2018).

There are the five actions in the domain: approach, opendoor, gothrough, load, and unload. The following shows some of their definitions.

opendoor open(D,I+1):- opendoor(D,I).

The above rule means that executing the action opendoor (D) at time step I causes the door to be open at time step I+1.

load loaded(O,I+1):- load(O,I).

The above rule implicates that executing the action load (O) at time step I causes the object O to be loaded at time step I+1.

unload

-loaded(O,I+1):- unload(O,I).

The above rule implicates that executing the action unload (O) at time step I causes the object O to be unloaded or in ASP terms as not loaded at time step I+1.

The ASP planner also takes in a set of constraints together with the set of human-defined tasks as input, and produces a plan (P), in the form of a sequence of actions (A) to be performed to complete those tasks. For ASP-based planners, a constraint is a logical rule with the empty head. For instance:

:- opendoor(D,I), not facing(D,I).

The above constraint means that it is impossible to execute the opendoor(D) action if there is no evidence that the robot is facing door D at step I.

Planner generates an action sequence for the team of robots. These actions are passed on at the semantic level and hence these actions are converted into immediate goals in the 2D space. The robot continues to follow the sequence of actions unless it gets a modified action sequence from the Planner. Consider an example scenario, where robot is at room R1 and wants to go to room R2, given that the rooms R1 and R2 are connected with a door D1. Here Planner generates the following symbolic plan for the robot:

approach(D1,0).
opendoor(D1,1).
gothrough(D1,2).

The above generated symbolic plan indicates that the robot should approach the door D1 at time step I=0. At time step I=1, the robot should open the door D1 and as mentioned above, the opendoor action opens the door at time step I+1, the robot can go through the door D1 at time step I=2.

Visualizer

The human can use a phone, or a tablet to use the AR capabilities of the system. The AR interface constantly casts the information being passed from the robot to the human and also the other way around. Casting here refers to the conversion of information into a readable form for the counterpart (human or robot).

Visualizer receives a set of motion plans along with the live locations of the individual robots as input. These plans contain a list of 2D coordinates that are a result of robots motion planner. The live locations of robots are the robots' x and y coordinates specifying their current location in the environment. These motion plans and the live locations are not useful to the human and would make no sense unless they are converted to something that the human counterpart can perceive. Visualizer converts these plans and live locations to spatially visualizable objects in the augmented environment.

Figure 2A:
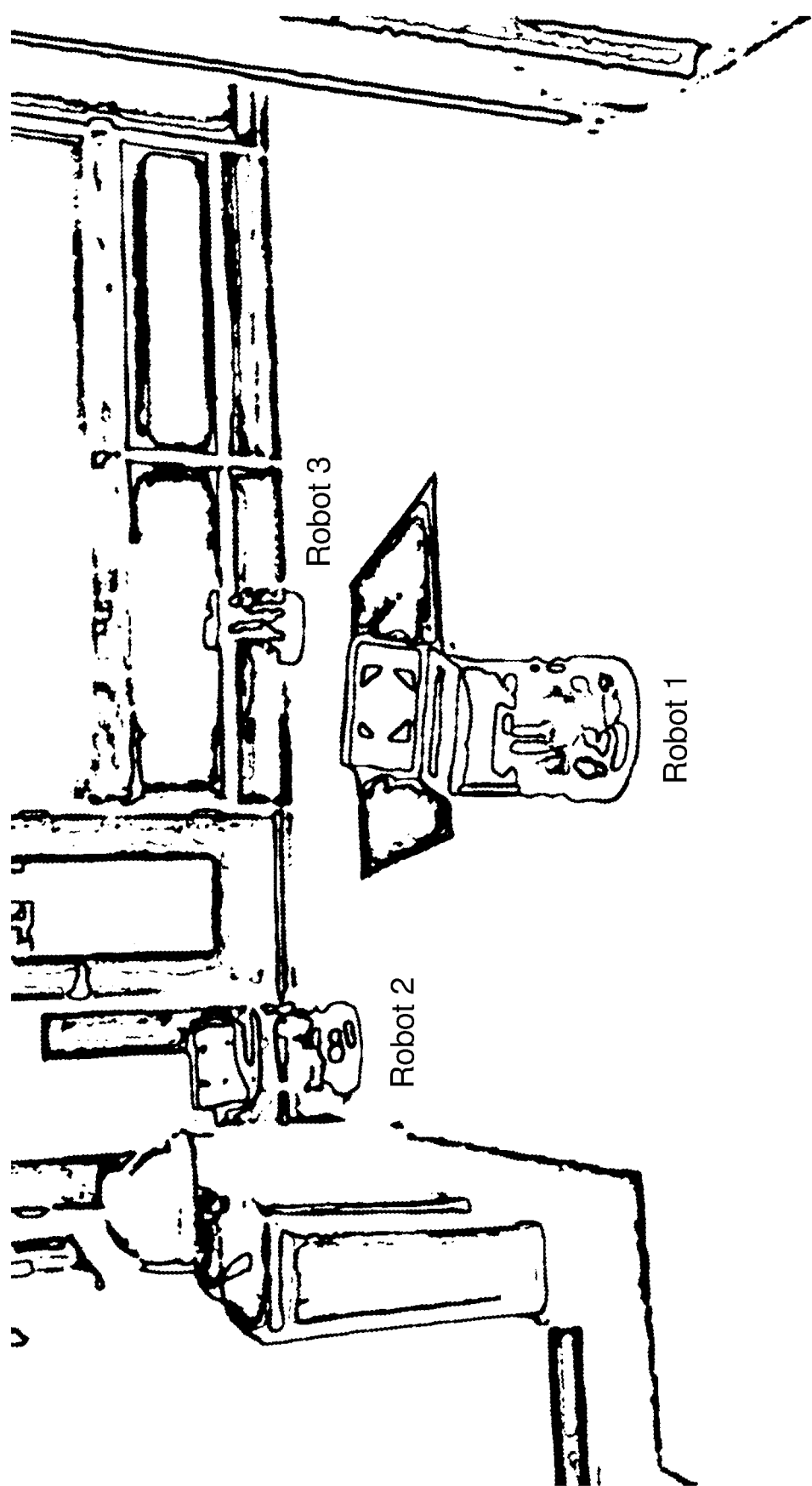
FIGS. 2A, 2B and 2C show (2A) a human participant working on the task of Jigsaw puzzle on the left, while keeping an eye on the status of the robots through a mobile AR interface on the right; (2B) the status of three mobile robots, where two are waiting outside for the human to open the door, and one is arriving; and (2C) a screenshot of AR interface showing the three robots waiting to come inside after human opened the door with their planned trajectories in different colors, a marker showing the access point of the robots to the door, and two buttons for human feedback
Figure 2B:
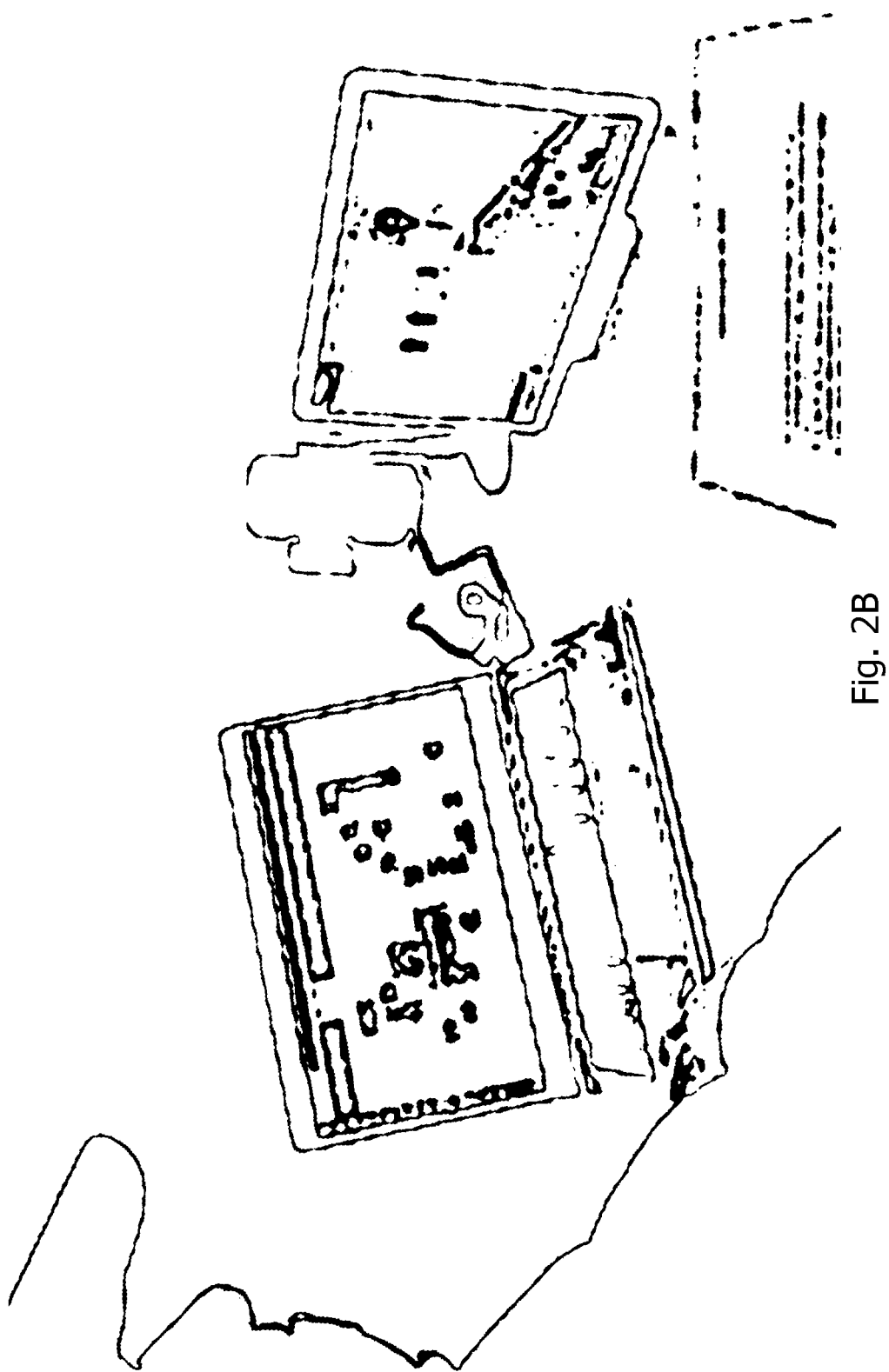
Figure 2C:
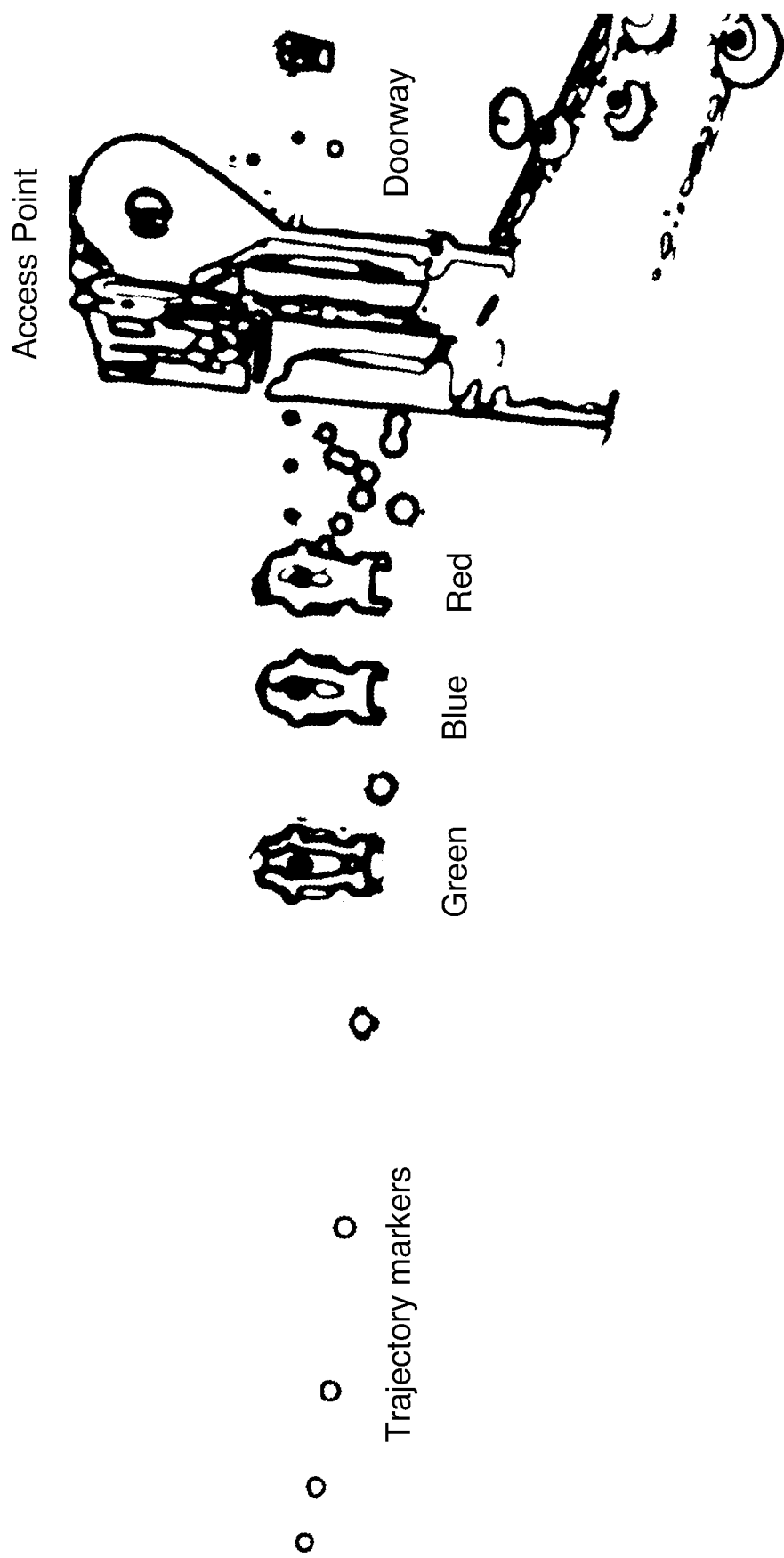
Figure 3:
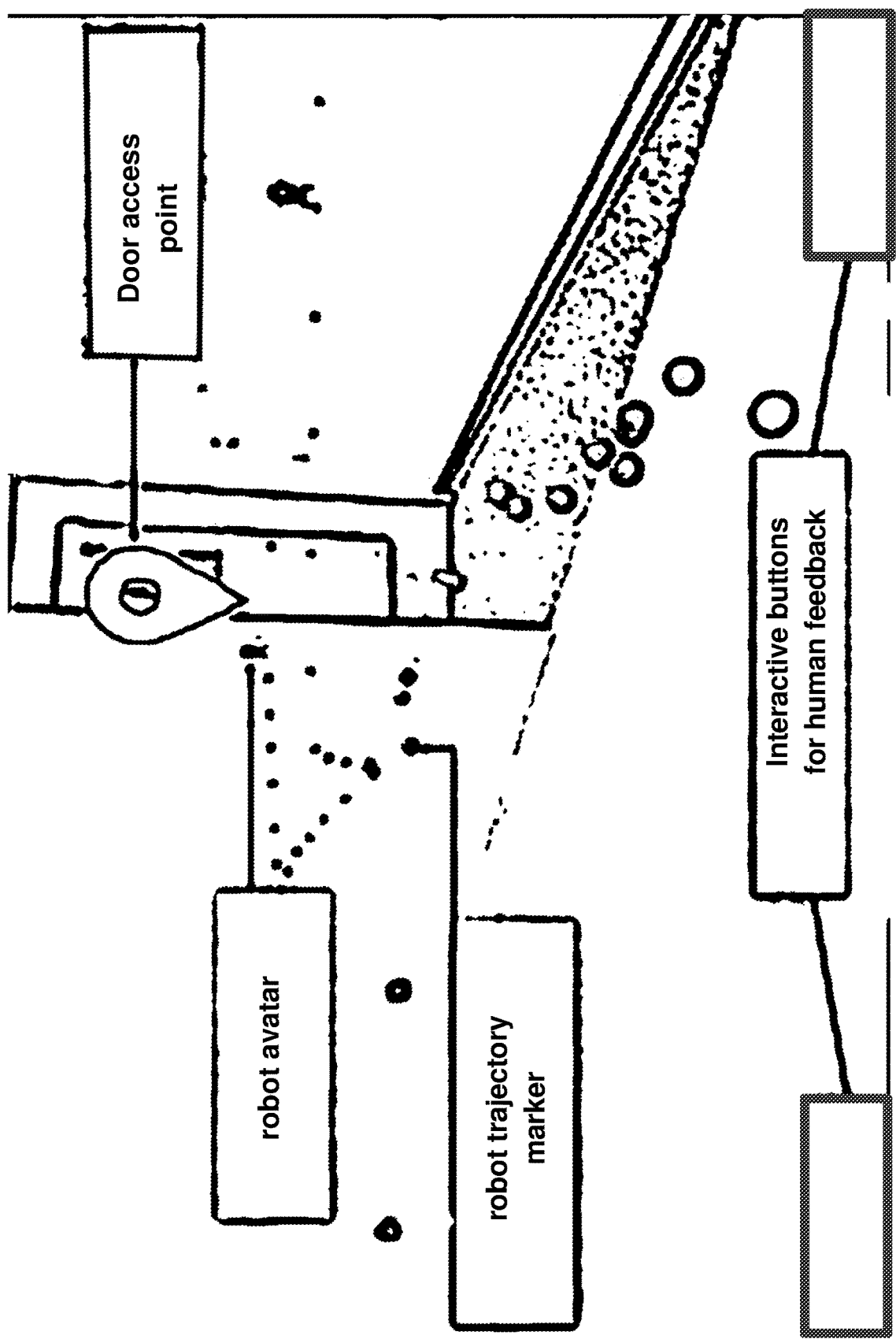
FIG. 3 shows an AR interface on a mobile device.

FIG. 2 shows the live locations of the three robots from a third person view. Visualizer augments these live locations as robot avatars. There are three robot avatars with the colors blue, green and red, which show the live locations of the three robots. FIG. 3 shows the trajectory markers that represent the motion plans of the three different robots. The AR interface distinguishes the trajectories of different robots using different colors to help people keep track of different robots.

Restrictor

Restrictor allows humans to share their feedback using the AR interface. FIG. 3 shows the buttons (2-min and 4-min) which can be used by humans to communicate their feedback to the robots. Consider an example where robots and humans share a common resource, e.g., a screwdriver, which is required by both the human and robot counterparts for accomplishing their tasks. If the human wants to halt a common resource for a specific time, the human can convey this information to the robots, then the Planner can utilize this information to re-plan based on this human feedback. The Restrictor converts the human feedback, which in its original form cannot be interpreted by the Planner, into a format that can be processed by the Planner.

Two categories of tasks are considered, long-duration tasks ($\Delta^L$) and short duration tasks ($\Delta^S$) and each of the tasks falls into one of the categories. This duration is assigned to each task beforehand and hence whenever a new task is assigned, they are categorized as either $\Delta^L$ or $\Delta^S$. It should be noted that robot tasks in $\Delta^L$ and $\Delta^S$ require help from human counterpart and hence depend largely on human availability. If the human clicks the 2-min button to specify that he expects to be available in two minutes, then the tasks from $\Delta^L$ are eliminated from the goal specification. Similarly, if the 4-min button is clicked, the tasks from $\Delta^S$ AS are eliminated from the goal specification.

Consider there are two tasks of picking object O1 and O2 where picking object O1 is a long duration task and picking O2 is a short duration task. So, if the goal of the robot is to pick up both the objects and store them into base_station, then the goal specification for the Planner can be given as follows:

:- not located(O1,base station,n−1).
:- not located(O2,base station,n−1).

The Planner will generate a symbolic plan based on the goal specification. If the human clicks the 4-min, the Restrictor passes on a new goal specification with just the tasks in $\Delta^L$ as follows:

:- not located(O1,base station,n−1).

Since human expects to be available in four minutes, the tasks from $\Delta^S$ will require the robot to wait for human counterpart. Such waiting reduces the efficiency of overall human-robot teams. Hence the elimination of tasks ensures that the robot plans do not involve tasks that contradict human feedback. The tasks in $\Delta^S$ are only added to the goal specification once the time specified by the human feedback has elapsed, which in this case is four minutes.

Algorithms of ARN

ARN framework generates plans for all the robots based on human feedback and ensures that all the robots have optimal plans at any given instant of time. Multithreading is used to ensure that the robots execute their plans in parallel. Table 1 lists the global variables that are used in the algorithms.

---
Algorithm 1 ARN Framework
---

Input: S, a set of N states, and, G, a set of N goals (N > 1)
Output: P : [$p_1, p_2, ... , p_N$]
1:    Initialize human feedback H as ∅
2:    F = M(H), where F is global array that stores the constrained resources interpreted from H.
3:    for each i ∈ {0, 1, ... , N−1} do
4:       P[i]= p, where $s_i \xrightarrow{p} g_i$ and P is a global array, and P[i] stores the plan for $(i+1)^{th}$ robots
5:    end for
6:    Thread ConstraintChecker = checkResourceConstraints( )
7:    for each i ∈ {0, 1, ... , N−1} do
8:       Thread $T_i$ = executePlans($p_i$)
9:    end for Algorithm 1 considers the current states (C) and goal states (G) of all the robots as input. The output of Algorithm 1 is a list of symbolic plans stored in P, where pi corresponds to the plan of $i^{th}$ robot and i∈{1, 2, · , N}. Firstly, the human feedback (H) is initialized as ∅. His then used to populate F, which is a global array that stores the constrained resources interpreted from H. It should be noted that the operation of M at Line 2 considers Has input, and outputs a set of constrained resources that are stored in F. Then a for-loop is entered that runs from 0 to N−1, where N corresponds to the number of robots. This for-loop is responsible for generating initial plans for N robots. The initial plans are generated by considering C and G of all the robots. In Line 6 a thread is started which is termed as ConstraintChecker which executes the procedure of Algorithm 2. A for-loop is then started that runs from 0 to N−1. This for-loop is responsible to start N threads for running the plan execution of N robots in parallel. Every thread runs an instance of executePlans procedure (Algorithm 3).

---
Algorithm 2 Procedure checkResourceConstraintst( )
---

1:   while Robots still have pending tasks do
2:      Check if new human feedback (H) is obtained.
3:      if H is not NULL then ---
Algorithm 2 Procedure checkResourceConstraintst( )
---

4:         F = M(H), where F stores the constrained resources interpreted from H.
5:      end if
6:   end while

TABLE 1

Global variables used in ARN for multi-threading

| Variable name | Description |
|---|---|
| P | An array that stores the plans of N robots. |
| F | An array to store the constrained resources. |

Algorithm 2 runs in the background until all the robots have completed their tasks to process human feedback as received. When the human provides the feedback through the AR interface, ConstraintChecker uses the operation of M and input of H to update F.

Algorithm 3 is executed on separate threads, one for each robot. This algorithm runs a for-loop that iterates over the set of constrained resources F. For each constrained resource $F_j \in F$, a plan $\hat{p}_i$ is generated which is a result of the C operation. The C operation takes the current plan of the robot $p_i$, the plan of other robot teammates (P), and $F_j$ as input and generates optimal plan $\hat{p}_i$. It should be noted that the operation of argmin requires a symbolic task planner for computing a sequence of actions while minimizing the overall plan cost. This algorithm constantly checks if the plan executed by the robots is optimal. To understand how the plans are optimal, a closer look at the Lines 3-7 of Algorithm 3 are in order. In Line 3, the algorithm checks if is $\hat{p}_i$ equal to $p_i$ where $\hat{p}_i$ and $p_i$ are the newly generated plan and the original plan respectively for the $i^{th}$ robot. If the $\hat{p}_i$ is not equal to $p_i$, then $p_i$ is replaced with $\hat{p}_i$ in Line 4. Otherwise, if $\hat{p}_i$ is equal to $p_i$, then it signifies that the constrained resources have no effect on the current plan and hence the robots carry out the actions from the original plan $p_i$ as per Line 6 of Algorithm 3.

This shows how that the system employs re-planning to keep the robot plans updated based on human feedback. Such kind of re-planning capability allows human-robot teams to adjust their plans in a much better way to achieve higher levels of efficiency. All the above algorithms are indeed a part of the entire negotiation strategy which is put forward for quick convergence to efficient plans for a team of robots in human-robot shared environments.

---
Algorithm 3 Procedure execute Plans($p_i$)
---

Figure 4:
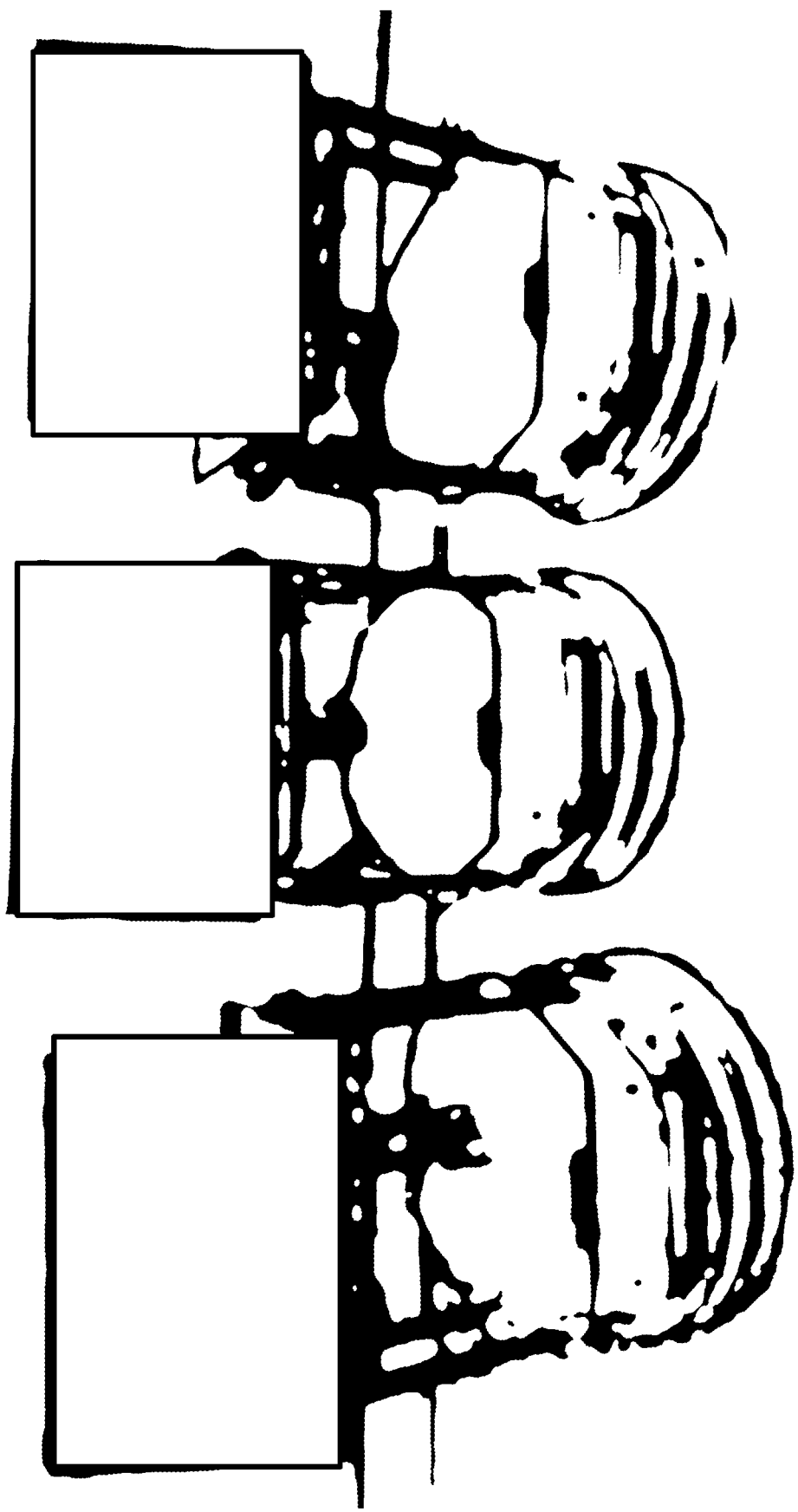
FIG. 4 shows the turtlebot-2 platforms used for the experiments.
Figure 5:
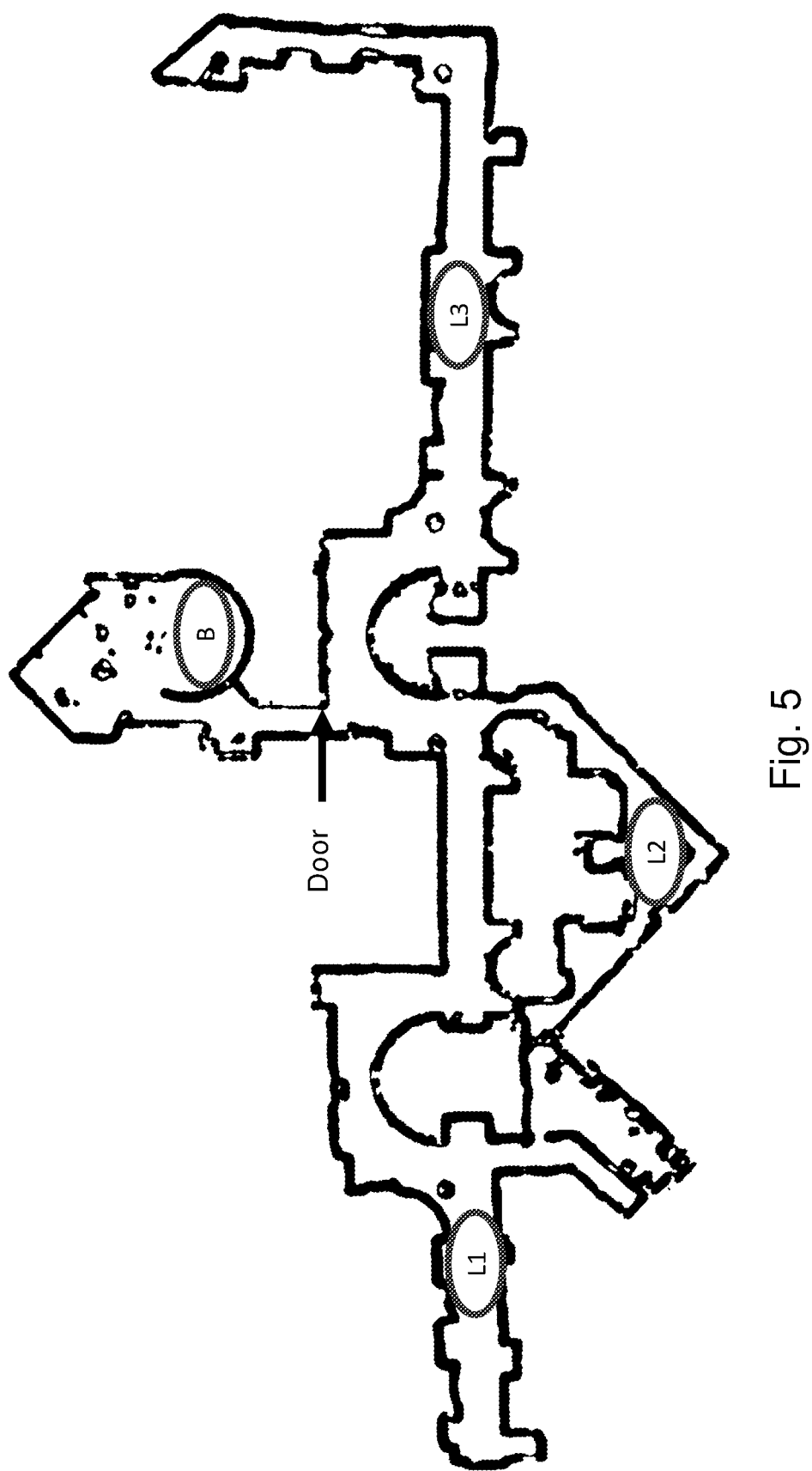
FIG. 5 shows map showing locations L1, L2 and L3 and B as base station.

1:   for each constrained resource $F_j \in F$, where $j \in \{0, 1, \ldots, j\}$ and F is global array that stores constrained resources, do
2:       $\hat{p}_i = \text{argmin}_{p_i}(C(p_i, P, F_j))$, where si $\xrightarrow{p_i} g_i$ and P is the global array that stores plans of all robot teammates.
3:       if $\hat{p}_i \mathrel{!=} \hat{p}_i$ then
4:           Replace $p_i$ with $\hat{p}_i$
5:       else
6:           Robot carries out actions from plan $p_i$
7:       end if
8:   end for Experimental Setup Experiments have been conducted with ten human participants using a team of three Turtlebot-2 platforms (FIG. 4) in an office environment. The Turtlebots have Kinect RGB-D camera for navigation and sensing and a laptop that runs Robot Operating System (ROS). FIG. 5 shows the pre-generated map of the floor where the experiments were conducted. L1, L2, and L3 are the three different locations that the robots have to visit as part of their task. B is the base station.

The objective of the experiments was to evaluate two hypotheses:
1. Using the AR-driven system can significantly improve the collaboration efficiency in human-robot systems compared to the baseline of audio signals from robot; and
2. Users prefer an AR-driven system compared to the baseline.

Ten participants of ages 20-30 volunteered to participate in an experiment where they worked in collaboration with robots to complete their task in the least possible time. The participants used both the baseline system and the AR-based system for two different trials. The allocation of the system (AR or baseline) for each trial was random. In each trial, the goal of the human participant was to complete a Jigsaw puzzle (FIG. 6) in the least possible time while helping the robot. The robots worked on delivery tasks, where each robot had to move three objects from three different locations (L1, L2, and L3) to a specified room. After picking every object, the robot had to visit the room where human was located (base station) and then again move on to pick up the next object, until the robot picked up all the three objects. Here the robots required the human counterpart to help them by opening the door to the base station.

Human Subject Study: At the end of the experiment, participants were required to fill out a survey form indicating their qualitative opinion including the following items. The response choices were 1 (Strongly disagree), 2 (Somewhat disagree), 3 (Neutral), 4 (Somewhat agree), and 5 (Strongly agree). The questions include: 1, The tasks were easy to understand; 2, It is easy to keep track of robot status; 3, I can focus on my task with minimal distraction from robot; 4, The task was not mentally demanding (e.g., remembering, deciding, thinking, etc.); 5, I enjoyed working with the robot and would like to use such a system in the future.

To evaluate Hypothesis-I the evaluation metrics used consist of human task completion time ($T^H$), individual robots' task completion timings ($T^{R1}$, $T^{R2}$, $T^{R3}$). These completion times are compared with the baseline and back the hypothesis with the observations from the experimental results. For evaluation of Hypothesis-II, the answers from the survey form are used for both the systems (AR and baseline).

Figure 6:
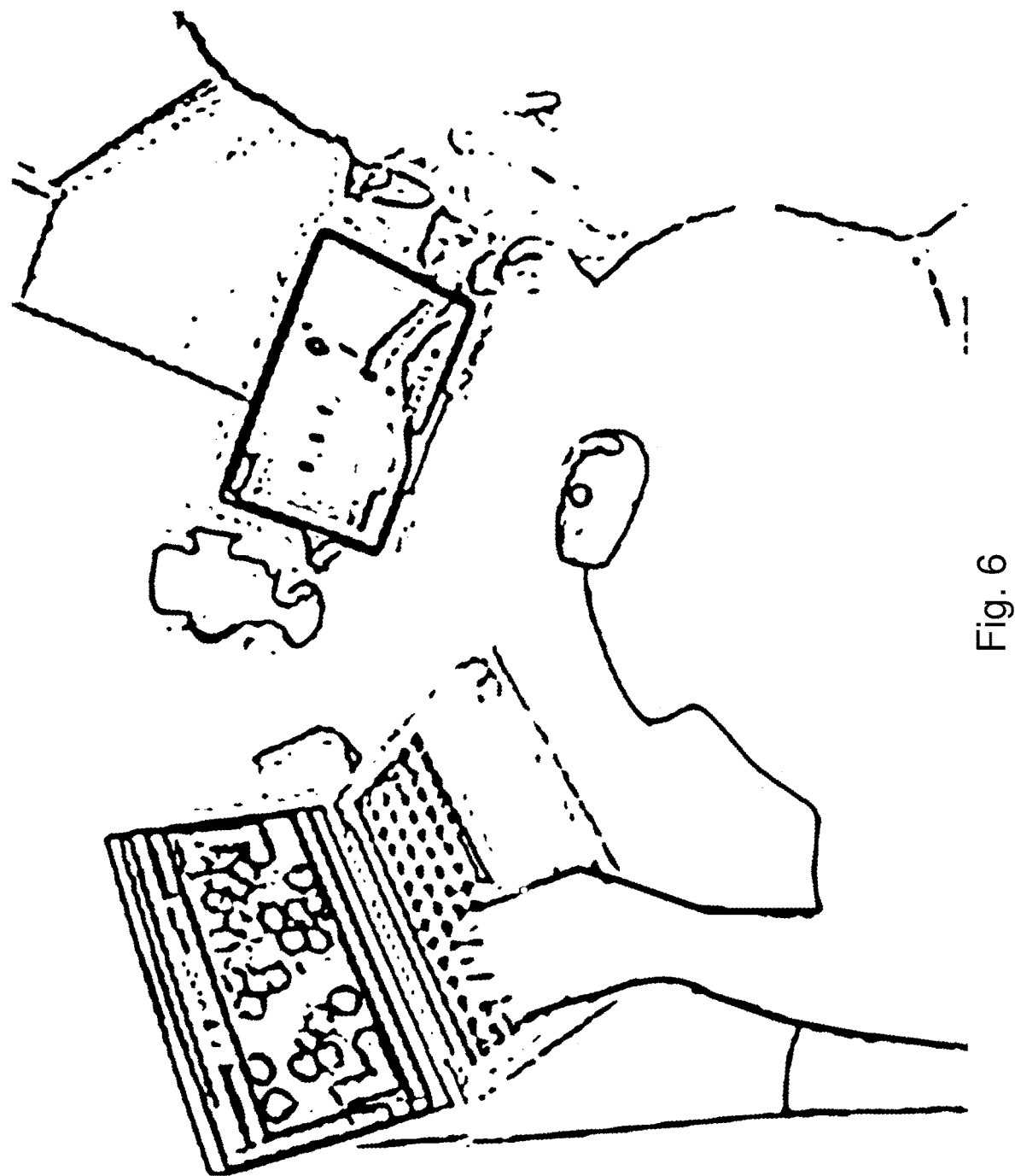
FIG. 6 shows a top view of human looking at AR device while solving the Jigsaw.

In ARN experimental trials, the participants were given a ten-inch tablet as an AR device to observe the current status of all the robots. The AR interface empowered the participant to observe the live location of all the three robots in a spatial representation with the visualization of real-time trajectories of the robot. Through the device, the participant could track if the robots have arrived at the door. After visiting every location, the robot(s) wait outside the door for the human to open the door (FIG. 5). Multiple robots could wait for the participant to open the door. Such kind of action synergy allowed the robots to execute a coordinated plan, in turn reducing the number of required door opening actions. Also, since a mobile device was used for the AR interface, the participants had the flexibility of viewing the current status by moving the device around. A simple device holder is used to keep the mobile device on the desk where the human participant solved the Jigsaw puzzle (FIG. 6).

Baseline: The goal of ARN is to enable efficient collaboration between humans and robots by facilitating seamless communication based on visual cues (non-verbal). Therefore, ARN is evaluated for the baseline of verbal communication using audio notifications. The audio notifications were sent to the participant when any of the robots arrive at the door. For instance, when Robot 2 arrived at the door, the participant would get the audio notification, "Robot 2 arrived at the door". The notifications helped the participant to get the current status of the robots waiting for the participant to open the door. This baseline is used since it allows the human to know the status of the robots waiting for the door, without having to know the status of other robots that are moving outside the door. No other notifications were sent to the human, to avoid cognitive overhead by pushing unnecessary notifications.

Illustrative Trial

An ARN is shown using an example of delivery tasks for three robots. Robots were randomly assigned to deliver objects from three different locations L1, L2, and L3 (FIG. 5). The participant was made to sit on a desk at the base station with a laptop to solve Jigsaw which was chosen to mimic the task of assembly. The tablet is also placed on the desk for the participant to check the status of the robot using AR (FIG. 6).

The robots start to navigate to their designated object locations to pick the objects. The human starts solving the Jigsaw at the same moment as the robots start to navigate to the object locations. At this instant, the timer is started for the robots as well as the human. The robots pick up the objects and return to the base station to drop the objects.

Figure 7A:
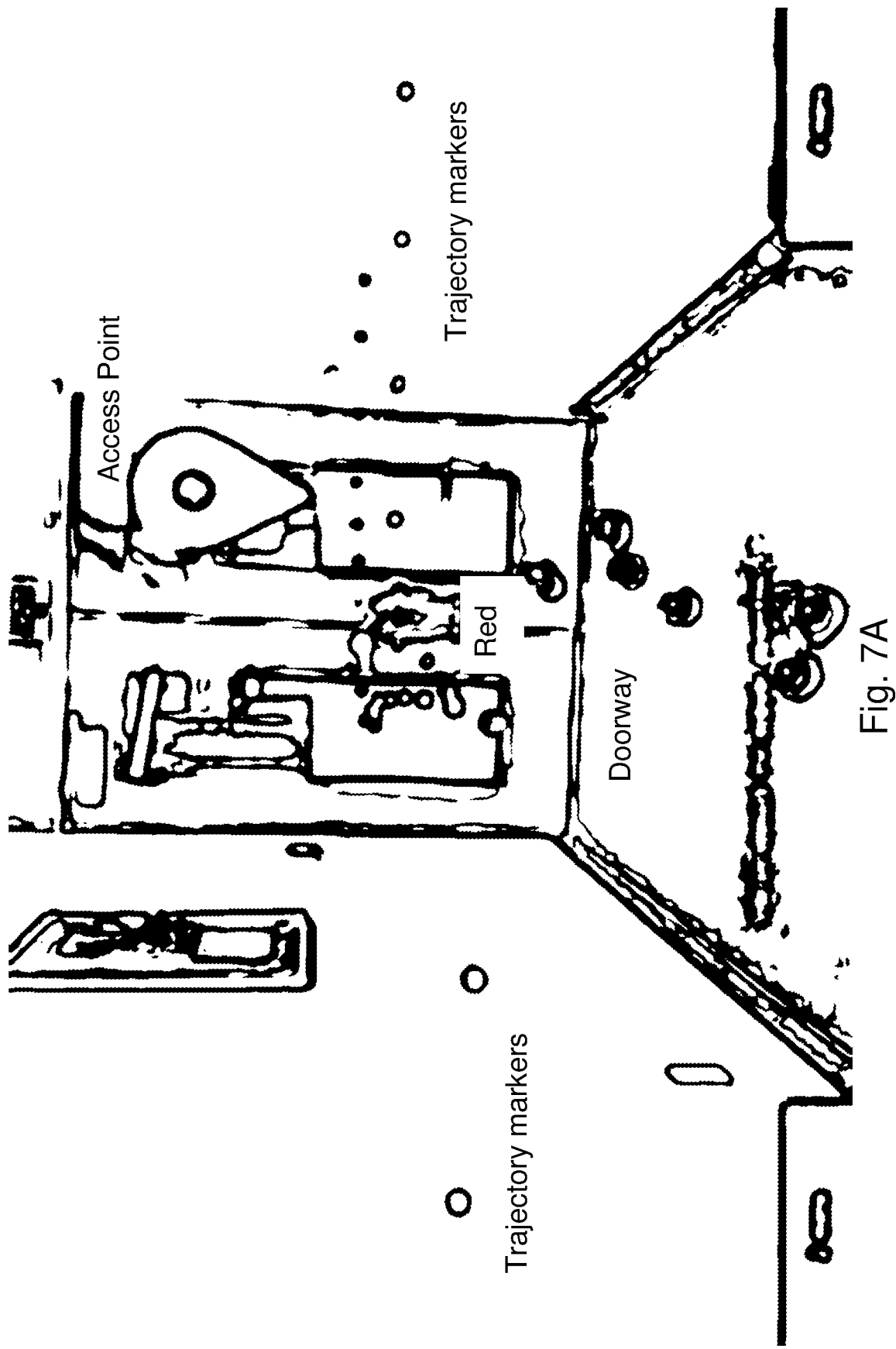
FIGS. 7A, 7B and 7C show (7A) one robot waiting with red robot arriving at the door first, (7B) two robots waiting blue robot arriving second and waiting near red robot, and (7C) three robots waiting green robot arrives, and joins the queue.
Figure 7B:
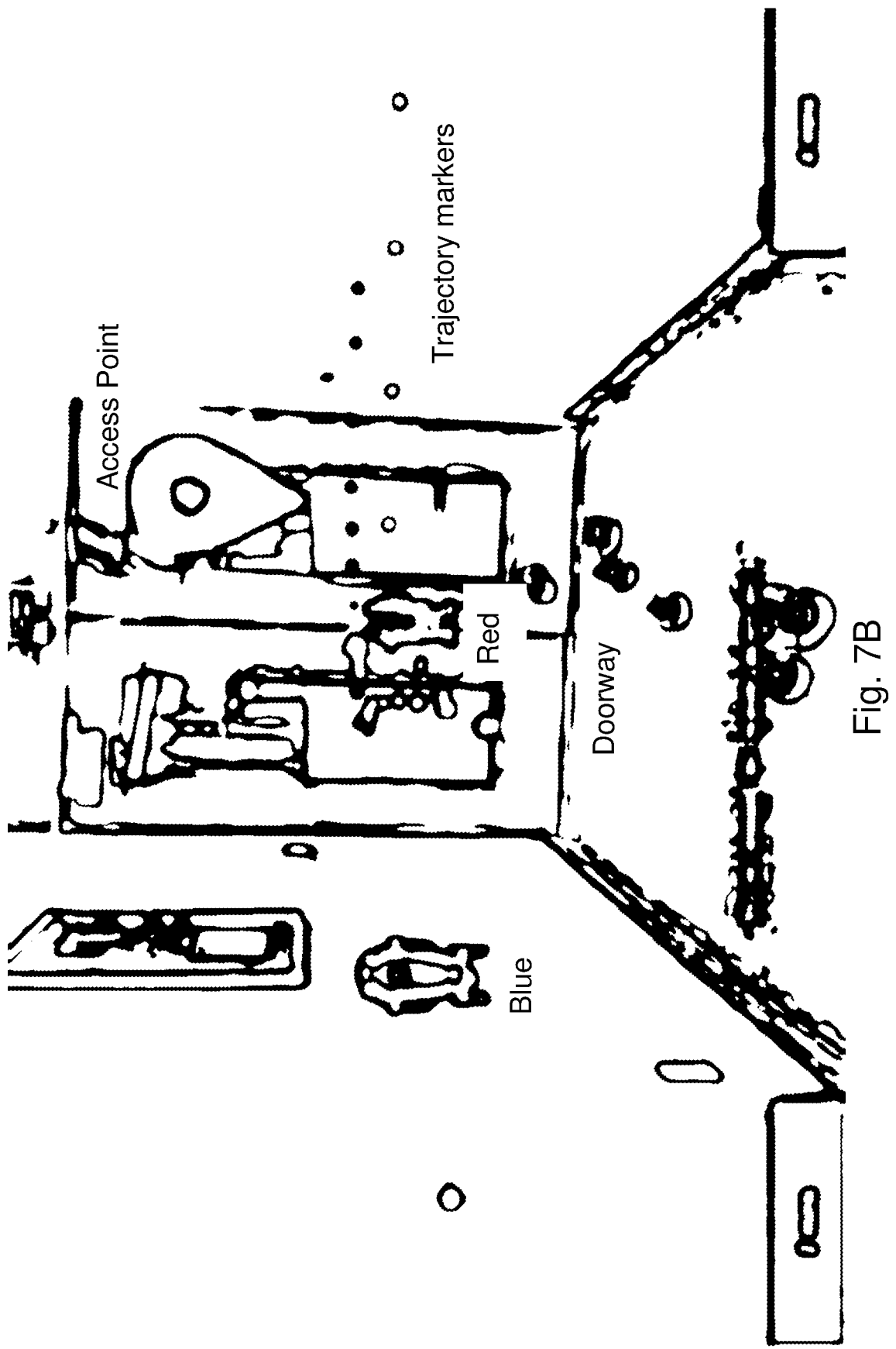
Figure 7C:
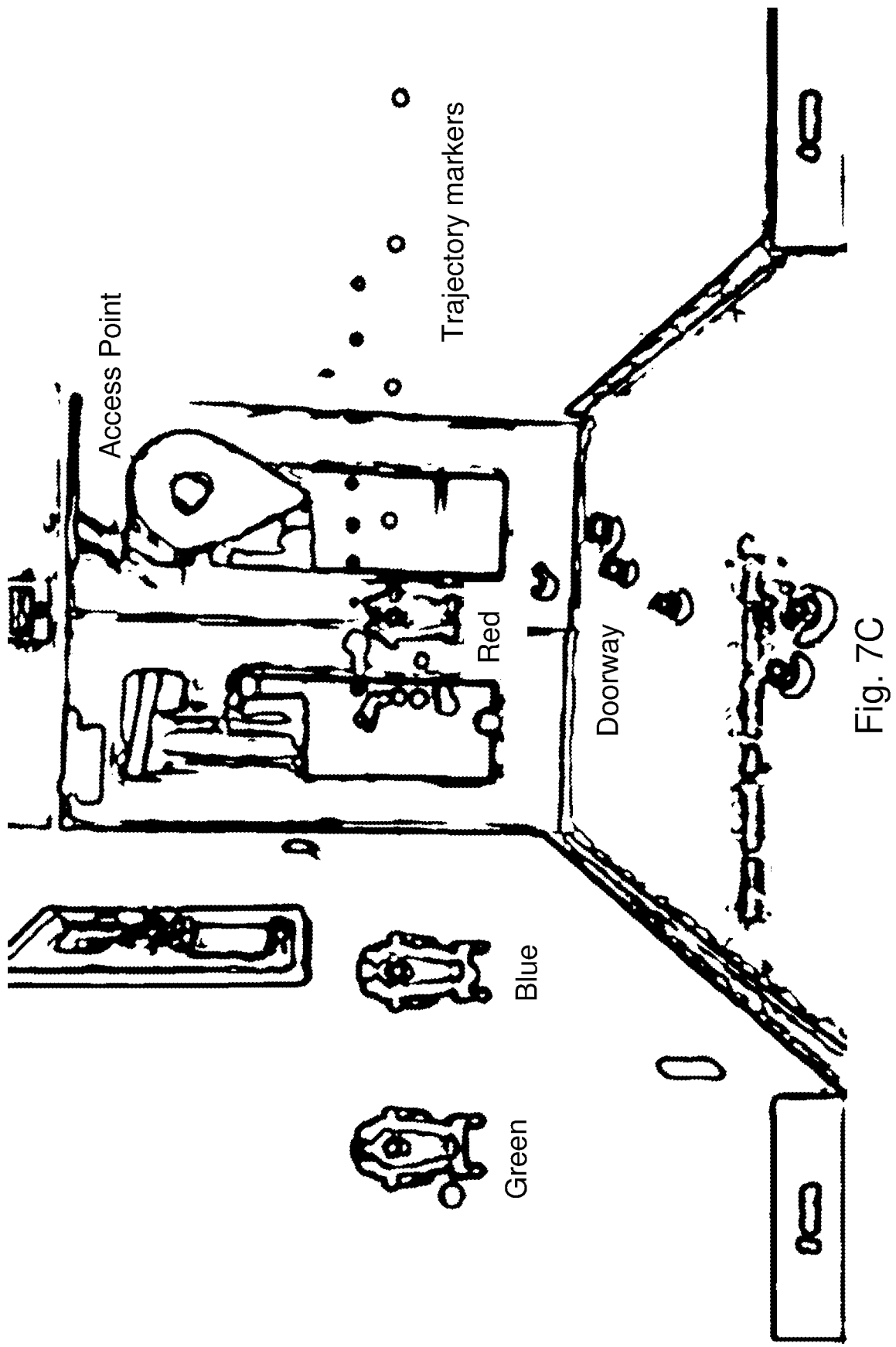

The robots arrive one after the other at the base station. The robot that arrives first takes the lead and waits at the door, in this case, the red robot, which can be seen in FIG. 7. After some time, the blue robot arrives and waits near the red robot in the queue for going inside the base station). Finally, the green robot arrives at the door and joins the queue after the blue robot). At this moment the participant was still solving the Jigsaw. As soon as the participant noticed that the AR device shows three robots waiting outside the door, the participant got up to open the door for the robots.

The red robot that is leading constantly monitors if the door is open or not. Once the door was opened, the red robot entered the base station. Once the red robot entered the base station it signaled the blue robot which followed the red robot to the base station. Similarly, the green robot entered the base station. The robots waited for some designated time at the base station and started navigating to their next object locations.

The above illustration depicts how the trial looked for one delivery task of the robots and how the human and robots collaborated using the ARN framework. (See, bit.ly/2yK8YsSARRobotics, a video of this trial).

Experimental Results

A first hypothesis is that ARN improves the collaboration efficiency of human-robot teams. Accordingly, the experiments were conducted as mentioned above which focuses on evaluating the efficiency of ARN compared to the baseline. The metric used here is the overall time needed for the task completion of robots and the participant.

Figure 8:
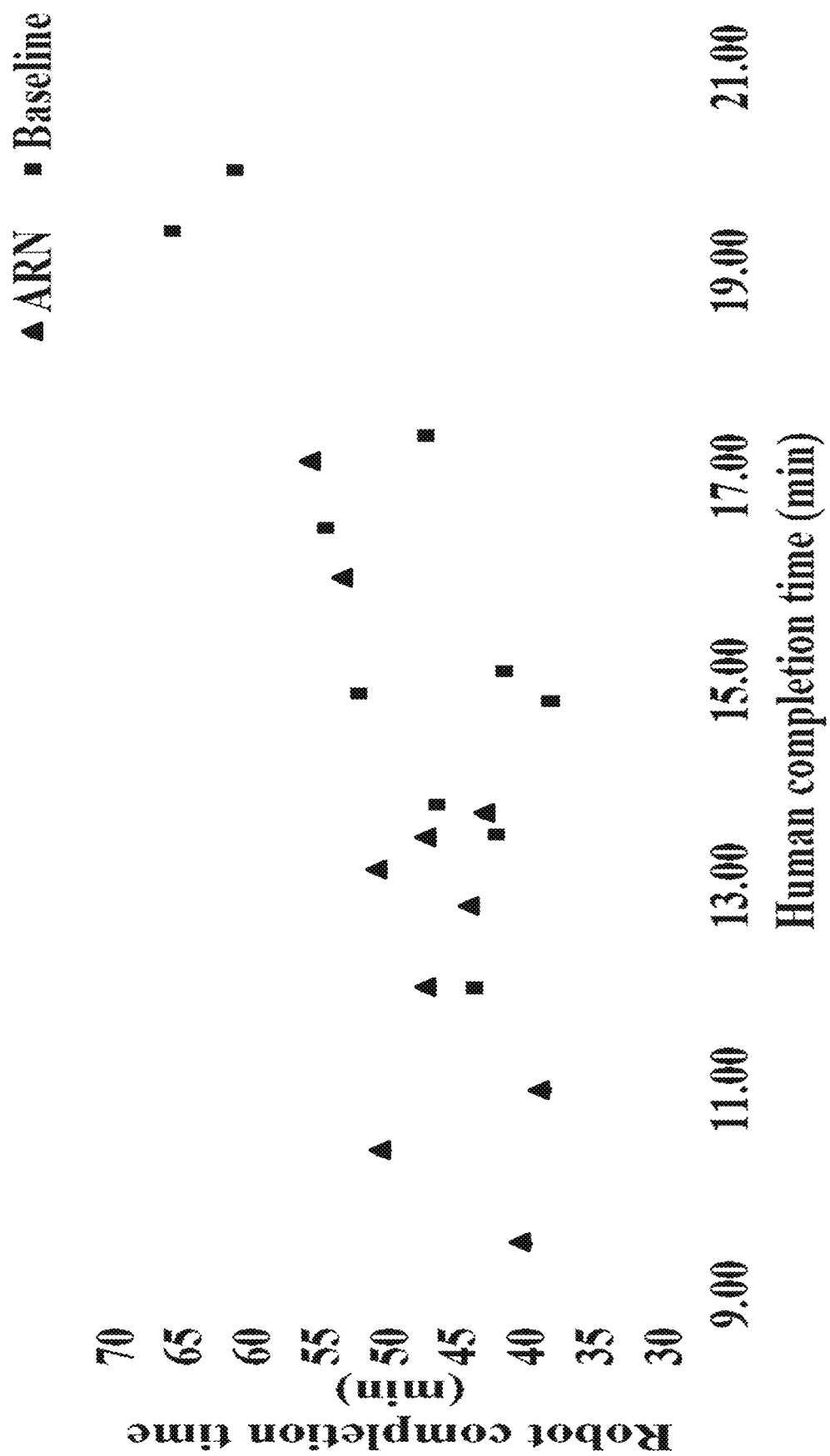
FIG. 8 shows a plot for human vs robot completion time.

FIG. 8 shows the overall performance of ARN compared to the baseline. The points that correspond to the human task completion time are plotted along the x-axis and the three robots task completion time which is along y-axis $T^{R1}+T^{R2}+T^{R3}$. The lowest completion time was observed in the trials that used ARN, while the baseline has some of the highest completion times. Most of the plots of ARN are near to the origin, with two points being away (trials which took more time to complete). The plots for baseline are scattered far from the axes manifesting the high completion times of the trials.

The total time of each trial was calculated as $T^{all}=T^H+T^{R1}+T^{R2}+T^{R3}$. The overall time required for the completion of tasks using ARN was less than the baseline. The average Trial$_t$ was 60 minutes for ARN and it turned out to be 65 minutes and 6 seconds for the baseline. All of the above support Hypothesis-I.

A p-value of 0.02 was observed for all the human task completion times ($T^H$). This shows that ARN performs significantly better than the baseline in human task completion time. Also for the three robots, the average completion time was less in ARN than the baseline while the improvement was not statistically significant.

TABLE 2

Results of human participant experiment

|  | Q1 | Q2 | Q3 | Q4 | Q5 |
|---|---|---|---|---|---|
| Baseline | 4.4 | 2.0 | 2.6 | 2.0 | 2.7 |
| ARN | 4.8 | 4.6 | 4.3 | 4.2 | 4.6 |

Figure 9:
FIG. 9 shows results of survey from participants in a survey that consisted of five statements with Likert-scale responses.
Figure 9:
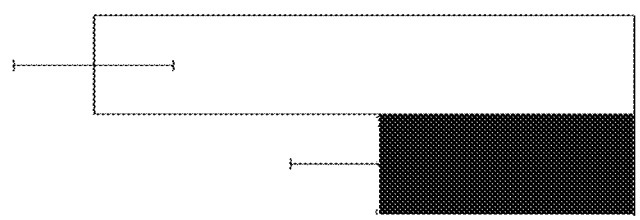
Figure 9:
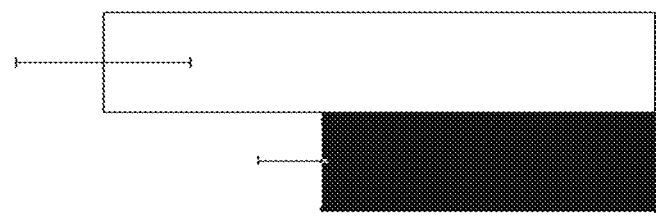
Figure 9:
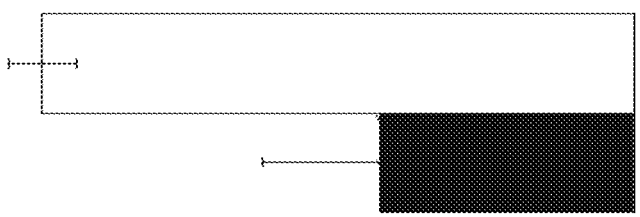
Figure 9:
Figure 9:

FIG. 9 shows the average scores from the human participant survey. The scores given out by participants were between 1-5. The scores are on the higher side for all the questions for the ARN framework compared to the baseline (Table 2). Q1 is a general question aiming at confirming if the participants understood the tasks, the difference is not large between ARN and the baseline. Apart from the average points of the individual questions, the p-values are also calculated. Apart from Q1, the p-values of all the other questions are discussed below.

In Q2, a significant difference is seen compared to the baseline. The interpretation from Q2 was that it was significantly easy to keep track of robot status using ARN. This was one of the objectives to enable effective bi-directional communication between the human and the robot. Such statistical significance with a value of 1.5474e-07 portrays that the ARN proved very effective in helping the participant in keeping track of the robots' status. Similar to Question 2, significant improvements are observed in Questions 3-5.

CONCLUSION

An augmented reality-driven, negotiation-based framework, called ARN, for efficient human-robot collaboration is provided. The human and robot teammates work on non-transferable tasks, while the robots have limited capabilities and need human help at certain phases for task completion. ARN enables human-robot negotiations through visualizing robots' current and planned actions while incorporating human feedback into robot replanning. Experiments with human participants show that ARN increases the overall efficiency of human-robot teams in task completion, while significantly reducing the cognitive load of human participants, in comparison to a baseline that supports only verbal cues. AR is applied to negotiation-based human-robot collaboration, where the negotiation is realized through the human visualizing robots' (current and planned) actions, human providing feedback to the robot teammates, and robots replanning accordingly.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Each reference cited herein is expressly incorporated herein in its entirety. Such references provide examples representing aspects of the invention, uses of the invention, disclosure of the context of the invention and its use and application. The various aspects disclosed herein, including subject matter incorporated herein by reference, may be employed, in combination or subcombination and in various permutations, consistent with the claims.

REFERENCES (EACH OF WHICH IS EXPRESSLY INCORPORATED HEREIN BY REFERENCE)

Amor, H. B.; Ganesan, R. K.; Rathore, Y.; and Ross, H. 2018. Intention projection for human-robot collaboration with mixed reality cues. In Proceedings of the 1st International Workshop on Virtual, Augmented, and Mixed Reality for HRI (VAM-HRI).

Azuma, R.; Baillot, Y.; Behringer, R.; Feiner, S.; Julier, S.; and MacIntyre, B. 2001. Recent advances in augmented reality. Technical report, NAVAL RESEARCH LAB WASHINGTON DC.

Azuma, R. T. 1997. A survey of augmented reality. Presence: Teleoperators & Virtual Environments 6(4): 355-385.

Chadalavada, R. T.; Andreasson, H.; Krug, R.; and Lilienthal, A. J. 2015. That's on my mind! robot to human intention communication through on-board projection on shared floor space. In Mobile Robots (ECMR), 2015 European Conference on, 1-6. IEEE.

Chai, J. Y.; She, L.; Fang, R.; Ottarson, S.; Littley, C.; Liu, C.; and Hanson, K. 2014. Collaborative effort towards common ground in situated human-robot dialogue. In Proceedings of the 2014 ACM/IEEE international conference on Human-robot interaction, 33-40. ACM.

Cheli, M.; Sinapov, J.; Danahy, E.; and Rogers, C. 2018. Towards an augmented reality framework for k-12 robotics education. In $1^{st}$ International Workshop on Virtual, Augmented and Mixed Reality for Human-Robot Interaction (VAMHRI).

Erdem, E., and Patoglu, V. 2018. Applications of asp in robotics. KI-Künstliche Intelligenz 32(2-3):143-149.

Erdem, E.; Gelfond, M.; and Leone, N. 2016. Applications of answer set programming. AI Magazine 37(3): 53-68.

Gelfond, M., and Kahl, Y. 2014. Knowledge representation, reasoning, and the design of intelligent agents: The answer-set programming approach. Cambridge University Press.

Green, S. A.; Billinghurst, M.; Chen, X.; and Chase, J. G. 2007. Augmented reality for human-robot collaboration. In Human Robot Interaction.

Hedayati, H.; Walker, M.; and Szafir, D. 2018. Improving collocated robot teleoperation with augmented reality. In Proceedings of the 2018 ACM/IEEE International Conference on Human-Robot Interaction, 78-86.

Ivanov, S. H.; Webster, C.; and Berezina, K. 2017. Adoption of robots and service automation by tourism and hospitality companies.

Lifschitz, V. 2002. Answer set programming and plan generation. Artificial Intelligence 138(1-2):39-54.

Lifschitz, V. 2008. What is answer set programming?. In AAAI, volume 8, 1594-1597.

Matuszek, C.; Herbst, E.; Zettlemoyer, L.; and Fox, D. 2013. Learning to parse natural language commands to a robot control system. In Experimental Robotics, 403-415. Springer.

Milgram, P.; Zhai, S.; Drascic, D.; and Grodski, J. 1993. Applications of augmented reality for human-robot communication. In Proceedings of 1993 IEEE/RSJ International Conference on Intelligent Robots and Systems (IROS '93), volume 3, 1467-1472 vol. 3.

Muhammad, F.; Hassan, A.; Cleaver, A.; and Sinapov, J. 2019. Creating a shared reality with robots. In Proceedings of the 14th ACM/IEEE International Conference on Human-Robot Interaction.

Nickel, K., and Stiefelhagen, R. 2007. Visual recognition of pointing gestures for human-robot interaction. Image and vision computing 25(12):1875-1884.

Park, J., and Kim, G. J. 2009. Robots with projectors: An alternative to anthropomorphic hri. In Proceedings of the $4^{th}$ ACM/IEEE International Conference on Human Robot Interaction.

Reinhart, G.; Vogl, W.; and Kresse, I. 2007. A projection-based user interface for industrial robots. In 2007 IEEE Symposium on Virtual Environments, Human-Computer Interfaces and Measurement Systems, 67-71.

Stone, P., and Veloso, M. 2000. Multiagent systems: A survey from a machine learning perspective. Autonomous Robots 8(3):345-383.

Tellex, S.; Kollar, T.; Dickerson, S.; Walter, M. R.; Banerjee, A. G.; Teller, S.; and Roy, N. 2011. Understanding natural language commands for robotic navigation and mobile manipulation. In Twenty-Fifth AAAI Conference on Artificial Intelligence.

Thomason, J.; Zhang, S.; Mooney, R. J.; and Stone, P. 2015. Learning to interpret natural language commands through human-robot dialog. In Twenty-Fourth International Joint Conference on Artificial Intelligence.

Waldherr, S.; Romero, R.; and Thrun, S. 2000. A gesture based interface for human-robot interaction. Autonomous Robots 9(2):151-173.

Walker, M.; Hedayati, H.; Lee, J.; and Szafir, D. 2018. Communicating robot motion intent with augmented reality. In Proceedings of the International Conference on Human-Robot Interaction.

Watanabe, A.; Ikeda, T.; Morales, Y.; Shinozawa, K.; Miyashita, T.; and Hagita, N. 2015. Communicating robotic navigational intentions. In IEEE/RSJ International Conference on Intelligent Robots and Systems (IROS).

Wooldridge, M. 2009. An introduction to multiagent systems. John Wiley & Sons.

Wurman, P. R.; D'Andrea, R.; and Mountz, M. 2008. Coordinating hundreds of cooperative, autonomous vehicles in warehouses. AI magazine 29(1):9.

Yang, F.; Khandelwal, P.; Leonetti, M.; and Stone, P. H. 2014. Planning in answer set programming while learning action costs for mobile robots. In 2014 AAAI Spring Symposium Series.

Yang, H.-D.; Park, A.-Y.; and Lee, S.-W. 2007. Gesture spotting and recognition for human-robot interaction. IEEE Transactions on robotics 23(2):256-270.

What is claimed is:

1. A method for human-automaton collaboration, comprising:
   automatically generating a proposed motion plan for a respective automaton, comprising a proposed sequence of actions and motion trajectory to be performed by the respective automaton;
   presenting the proposed plan comprising the proposed sequence of actions and motion trajectory through a human computer interface for a human user;
   receiving feedback from the human user through the human computer interface relating to the proposed plan; and
   automatically altering the proposed plan to produce a modified plan comprising a rescheduled sequence of actions and motion trajectory to be performed by the respective automaton, in dependence on the received feedback and at least one predicted waiting period.

2. The method according to claim 1, wherein the respective automaton is a robot, further comprising performing at least one alternate action while waiting for at least one action by the human user while the robot is performing the modified sequence of actions.

3. The method according to claim 1, wherein the sequence of actions to be performed by the respective automaton is to be performed in the real world; and the proposed plan is overlayed as a visualizable time-space trajectory on a representation of the real world in an augmented reality interface for the human user.

4. The method according to claim 1, wherein the human computer user interface is a 3D visual user interface.

5. The method according to claim 1, wherein the plan comprises a time sequence of physical movement of the respective automaton, subject to waiting for a predicate action to occur.

6. The method according to claim 1, wherein the plan comprises a series of tasks, wherein said automatically altering the proposed plan comprises rescheduling the series of tasks to synchronize the respective automaton with a planned human activity while optimizing a predicted efficiency of the automaton.

7. The method according to claim 1, wherein the proposed plan comprises a coordinated set of physical activities and interactions of a plurality of automatons comprising the respective automaton, and said presenting comprises distinctly presenting the proposed motion plan for each of the plurality of automatons.

8. The method according to claim 7, further comprising automatically coordinating tasks involving a contested resource between the plurality of automatons and presenting the automatically coordinated tasks involving the contested resource to the human user through the human computer interface comprising an augmented reality interface.

9. The method according to claim 7, further comprising automatically coordinating tasks involving the plurality of automatons interacting with at least one human, and presenting the automatically coordinated tasks to the human user through the human computer interface comprising an augmented reality interface.

10. The method according to claim 7, further comprising automatically coordinating tasks involving the plurality of automatons with a distributed automated control system.

11. The method according to claim 1, wherein the plurality of automatons are configured to operate as independent agents, further comprising:
automatically negotiating between the plurality of automatons comprising the respective automaton to optimize efficiency of a human-involved task; and
including a result of the automatic negotiation in the proposed plan.

12. A control planning system for an automaton, comprising:
an automated planner configured to:
automatically generate a plan for the automaton, comprising a sequence of actions and motion trajectory to be performed by the automaton to perform a task limited by a set of constraints; and
automatically reschedule the sequence of actions and motion trajectory in dependence on a predicted waiting period to increase efficiency;
a user interface, configured to present the plan to a human user;
an input, configured to receive feedback from the human user relating to the presented plan; and
a restrictor configured to automatically process the received feedback and present it to the automated planner as a constraint to update the set of constraints,
wherein the automated planner is further configured to alter the plan for the automaton selectively dependent on the updated set of constraints.

13. The control planning system for an automaton according to claim 12, wherein the automaton is a robot and the automated planner is further configured to perform an alternate action while waiting for at least one action by the human while the robot is performing the prior sequence of actions and motion trajectory as part of the task.

14. The control planning system for an automaton according to claim 12, wherein the sequence of actions and motion trajectory are to be performed in the real world; and the user interface is configured to overlay the plan as a visualizable time-space trajectory on a representation of the real world in an augmented reality interface for the human user.

15. The control planning system for an automaton according to claim 12, wherein the user interface is a 3D visual user interface.

16. The control planning system for an automaton according to claim 12, wherein the plan comprises a series of physical tasks, and the automated planner is further configured to alter the plan to reschedule the series of physical tasks to synchronize the automaton with a planned human activity and increase efficiency, based on the received feedback.

17. The control planning system for an automaton according to claim 12, wherein the automaton is configured to interact with a plurality of collaborative automatons, each collaborative automaton being configured to automatically negotiate with another collaborative automaton and the automaton to coordinate aspects of the task within the set of constraints.

18. The control planning system for an automaton according to claim 12, wherein the automaton is configured to interact with a plurality of automatons, and at least one of the automated planner and the restrictor is configured to automatically coordinate tasks involving a contested resource between the plurality of automatons and the automaton within the plan before receipt of the human input.

19. The control planning system for an automaton according to claim 12, wherein the automaton is an independent agent configured to interact with a plurality of automatons each representing independent agents, and at least one of the automated planner and the restrictor is further configured to employ a result of an automatic negotiation between the plurality of automatons and the automaton to optimize efficiency of a human-involved task.

20. A non-transitory computer readable medium, storing instructions for controlling an automaton, comprising:
instructions for generating an efficient time-based plan for the automaton dependent on a set of constraints, comprising a sequence of actions and motion trajectory to be performed by the automaton;
instructions for presenting the plan comprising the sequence of actions and motion trajectory through a human computer user interface for a human user;
instructions for receiving feedback from the human user relating to the plan comprising sequence of actions and motion trajectory to be performed by the automaton; and
instructions for altering the set of constraints on the plan in dependence on the received feedback from the human user and at least one predicted waiting period for the automaton to perform a respective action or motion trajectory.

* * * * *